(12) United States Patent
Sagara et al.

(10) Patent No.: US 8,342,542 B2
(45) Date of Patent: Jan. 1, 2013

(54) SUSPENSION DEVICE AND METHOD FOR SUPPORTING A WHEEL

(75) Inventors: Kenji Sagara, Isehara (JP); Yusuke Kageyama, Isehara (JP); Yoshihiro Kawabe, Kamakura (JP); Masahiko Nishida, Hiratsuka (JP); Isao Watanabe, Ebina (JP); Masaya Kunitomo, Atsugi (JP); Masaki Ohta, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 231 days.

(21) Appl. No.: 12/531,033

(22) PCT Filed: Apr. 2, 2008

(86) PCT No.: PCT/IB2008/000790
§ 371 (c)(1),
(2), (4) Date: Mar. 21, 2010

(87) PCT Pub. No.: WO2008/122856
PCT Pub. Date: Oct. 16, 2008

(65) Prior Publication Data
US 2010/0201086 A1 Aug. 12, 2010

(30) Foreign Application Priority Data

Apr. 4, 2007 (JP) ................. 2007-098524
Apr. 4, 2007 (JP) ................. 2007-098527
Jun. 29, 2007 (JP) ................. 2007-171825

(51) Int. Cl.
*B62D 17/00* (2006.01)
(52) U.S. Cl. ................ 280/5.524; 280/5.522; 280/86.75
(58) Field of Classification Search ................. 280/5.52, 280/5.522, 5.523, 5.524, 86.75, 86.758
See application file for complete search history.

(56) References Cited

U.S. PATENT DOCUMENTS

| | | | | | |
|---|---|---|---|---|---|
| 3,893,701 | A | * | 7/1975 | Kroniger | ................. 280/124.131 |
| 4,157,840 | A | * | 6/1979 | Kroniger et al. | ........ 280/124.134 |
| 4,537,420 | A | * | 8/1985 | Ito et al. | ..................... 280/86.75 |
| 4,681,342 | A | | 7/1987 | Goerich | |
| 4,714,270 | A | * | 12/1987 | Rumpel | ................. 280/124.144 |
| 4,720,121 | A | * | 1/1988 | Kikuchi et al. | ......... 280/124.128 |
| 4,744,587 | A | * | 5/1988 | Veneau | ..................... 280/124.15 |
| 4,772,043 | A | | 9/1988 | Muramatsu | |
| 4,981,308 | A | * | 1/1991 | Kunert et al. | ............. 280/86.754 |
| 5,158,320 | A | * | 10/1992 | Ando et al. | ............. 280/124.142 |
| 5,380,024 | A | * | 1/1995 | Hayami | ................. 280/124.143 |

(Continued)

FOREIGN PATENT DOCUMENTS

JP 60-105216 6/1985

(Continued)

*Primary Examiner* — Drew Brown
*Assistant Examiner* — Barry Gooden, Jr.
(74) *Attorney, Agent, or Firm* — Young Basile

(57) ABSTRACT

A suspension device includes a wheel supporting member configured to rotatably support a wheel. Two links respectively link the wheel supporting member and a vehicle-body side member and are disposed substantially in parallel in a vehicle width direction. At least one projecting portion extends from at least one of the two links towards the other link, and an elastic linking portion links the projecting portion of one of the links to at least one of the other link and the projecting portion of the other link. A toe angle adjusting device is configured to input a force in a direction oriented backward in the vehicle forward-backward direction to the wheel supporting member to adjust a toe-in angle of the wheel.

27 Claims, 35 Drawing Sheets

U.S. PATENT DOCUMENTS

| | | | |
|---|---|---|---|
| 7,789,406 B2 * | 9/2010 | Matsuoka | 280/124.135 |
| 7,832,750 B2 * | 11/2010 | Gerrard | 280/124.134 |
| 2010/0078911 A1 * | 4/2010 | Kawabe et al. | 280/124.144 |

FOREIGN PATENT DOCUMENTS

| | | |
|---|---|---|
| JP | 61-247504 | 11/1986 |
| JP | 62-234705 | 10/1987 |
| JP | 09-058236 | 3/1997 |
| JP | 09-315122 | 12/1997 |
| JP | 2000-203228 | 7/2000 |
| JP | 2008-254568 | 10/2008 |
| WO | WO 2007113761 A2 * | 10/2007 |

* cited by examiner

BACKWARD IN VEHICLE
FORWARD-BACKWARD DIRECTION

UPWARD

INWARD IN VEHICLE
WIDTH DIRECTION

FORWARD IN VEHICLE
FORWARD-BACKWARD DIRECTION

OUTWARD IN VEHICLE
WIDTH DIRECTION

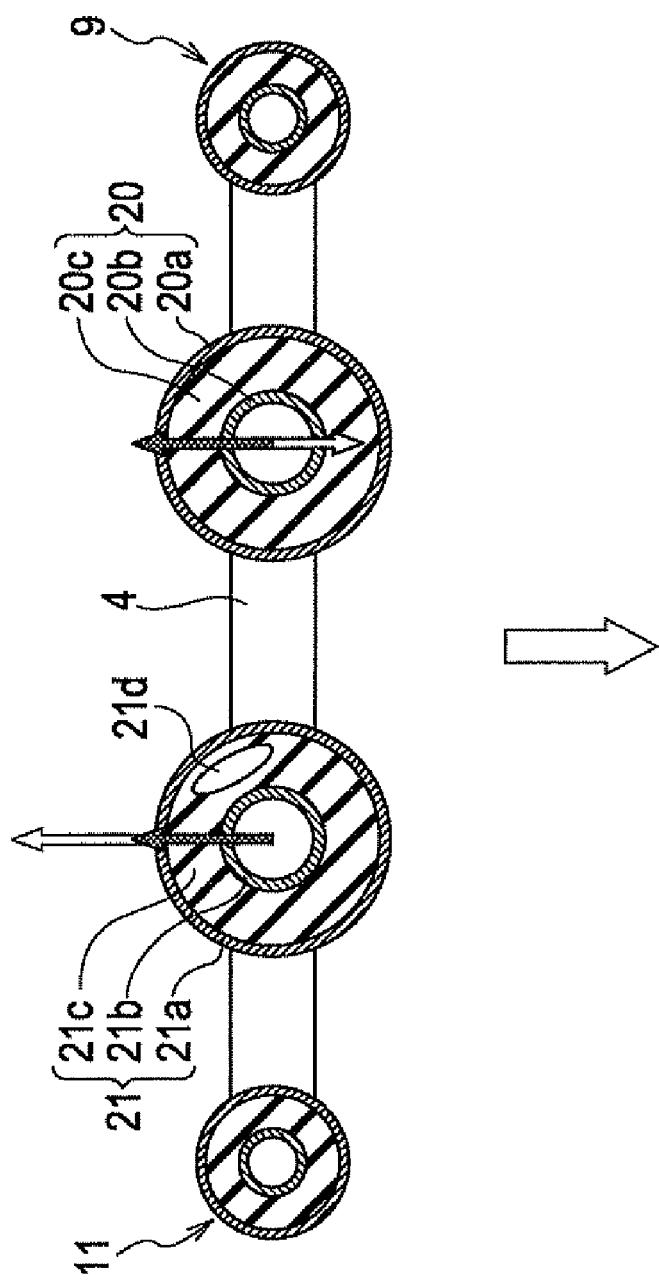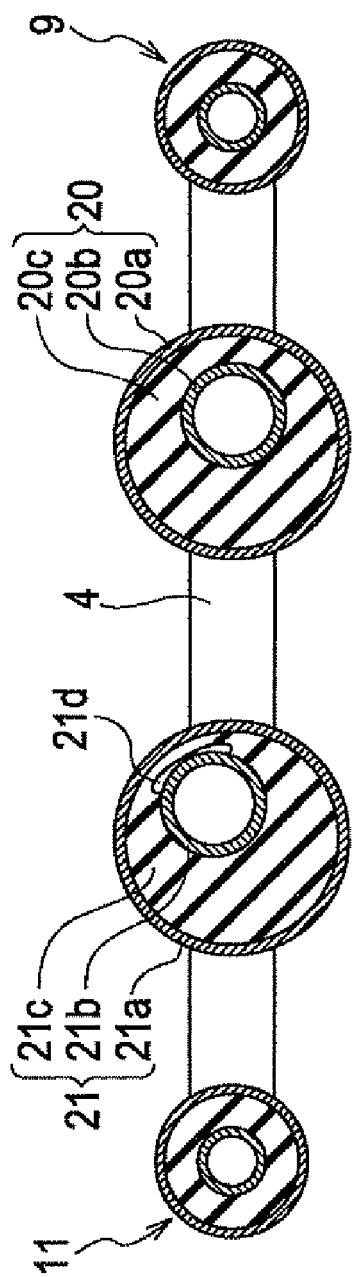
FIG. 28A
FIG. 28B

GUIDED TOWARDS OUTER SIDE OF VEHICLE BY HOLLOWS

IN TOP VIEW, ROTATES, AND TOE ANGLE OF AXLE (TIRE) CHANGES

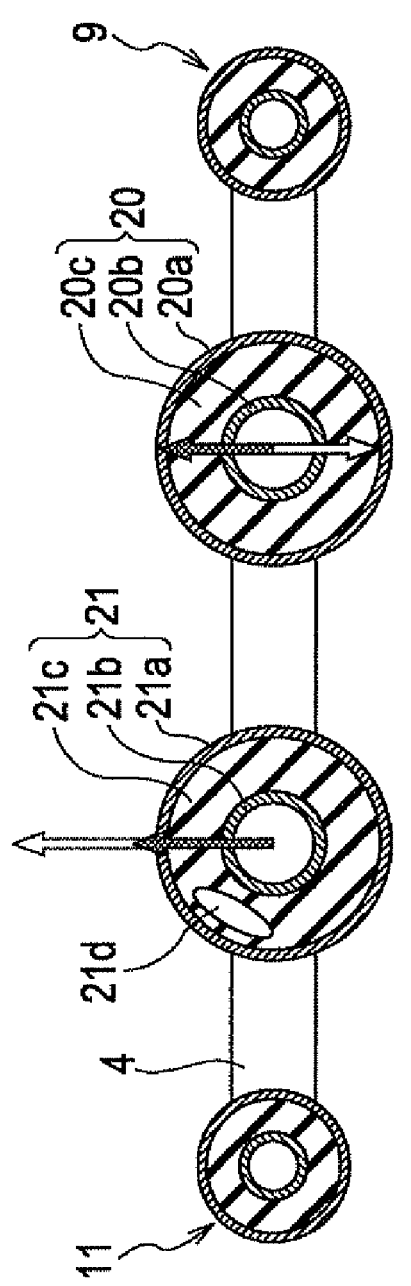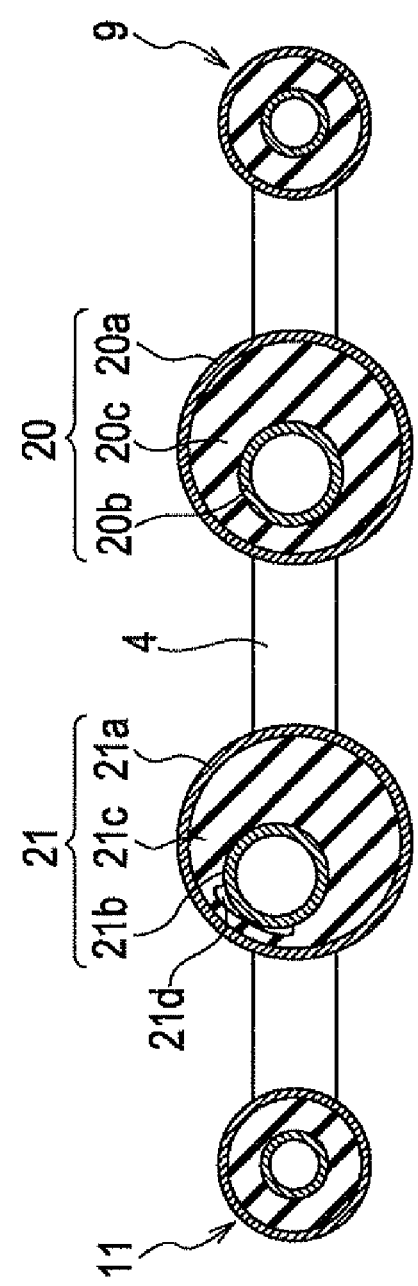

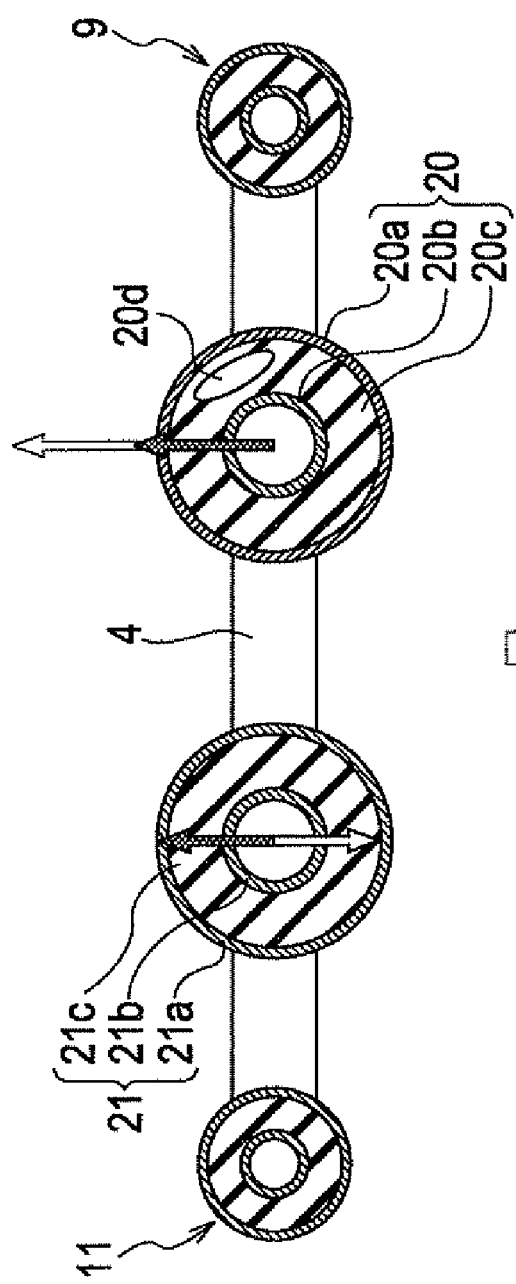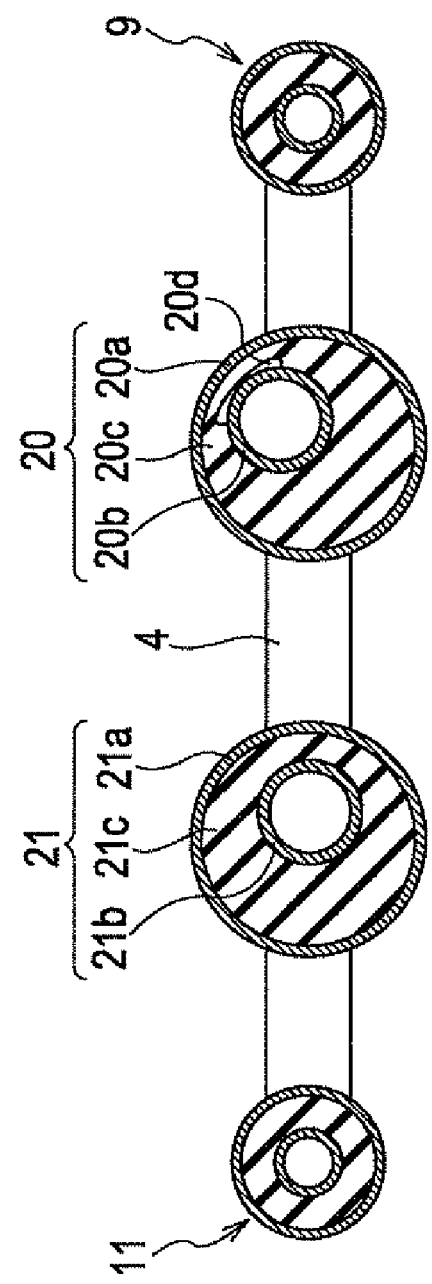

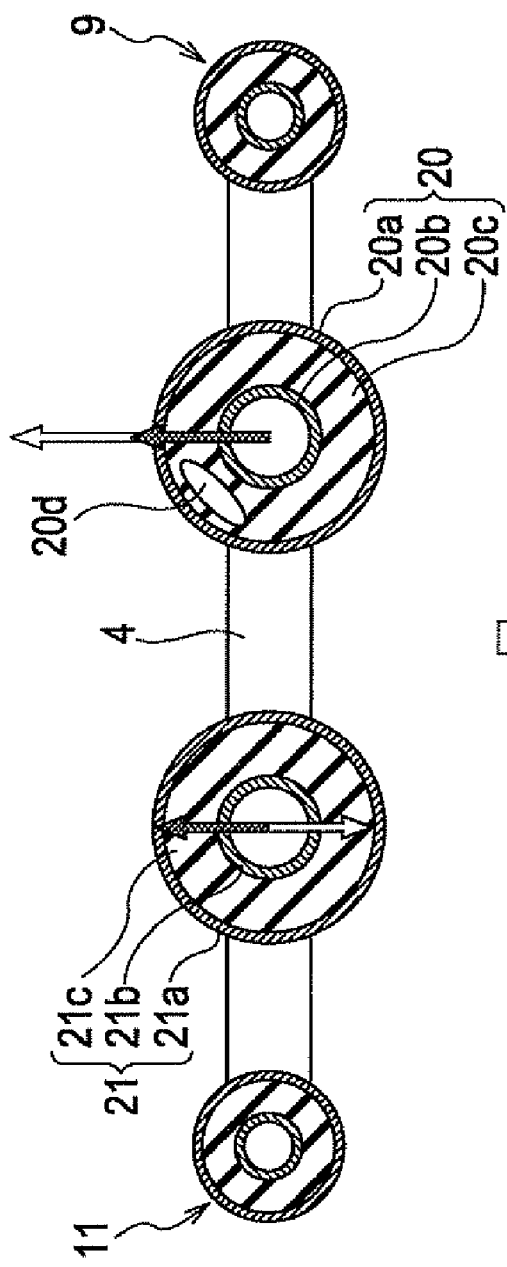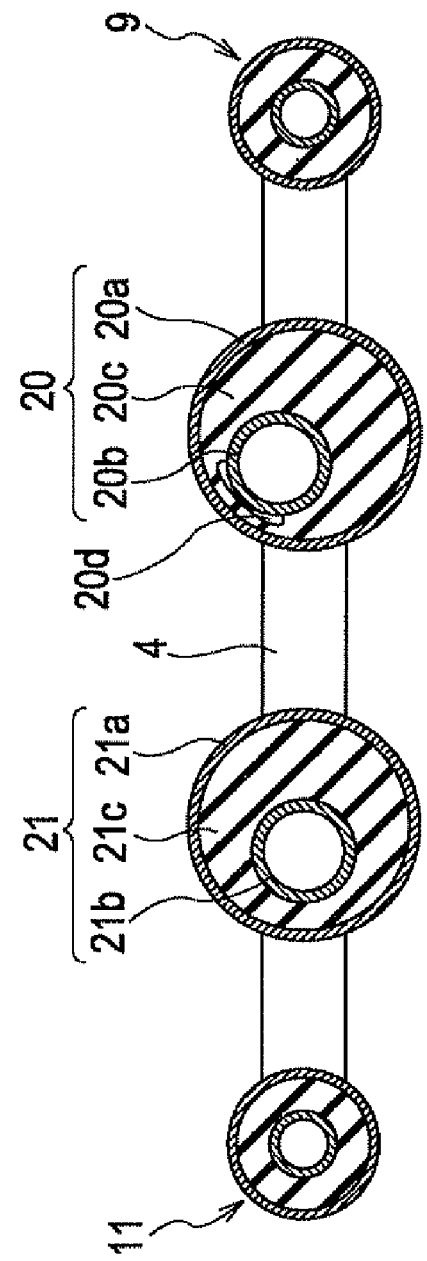
FIG. 40A
FIG. 40B

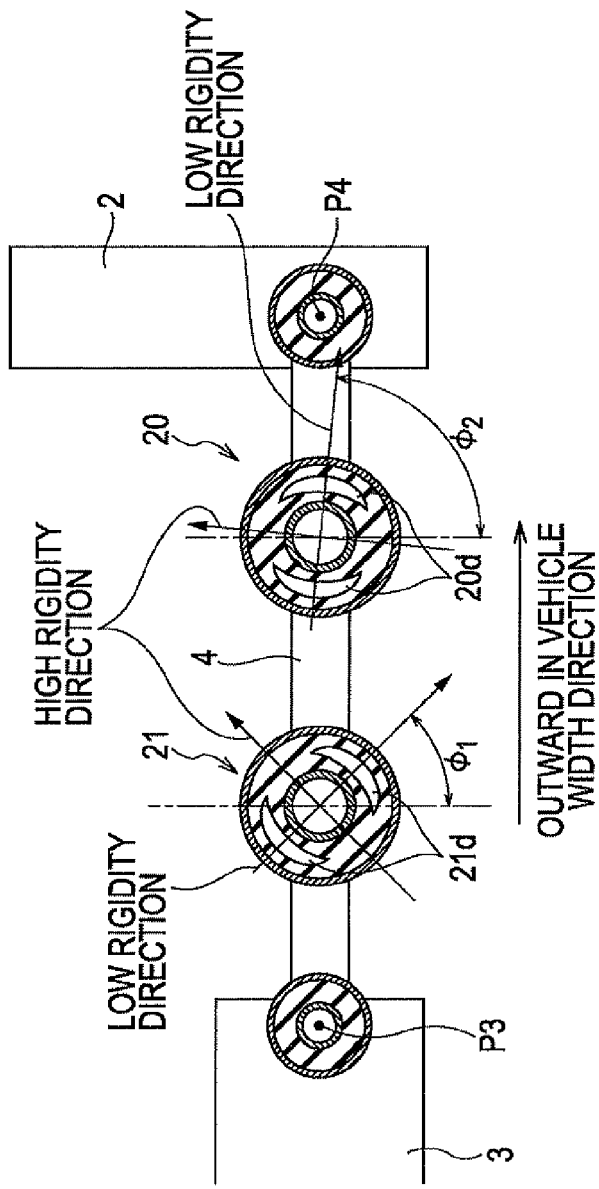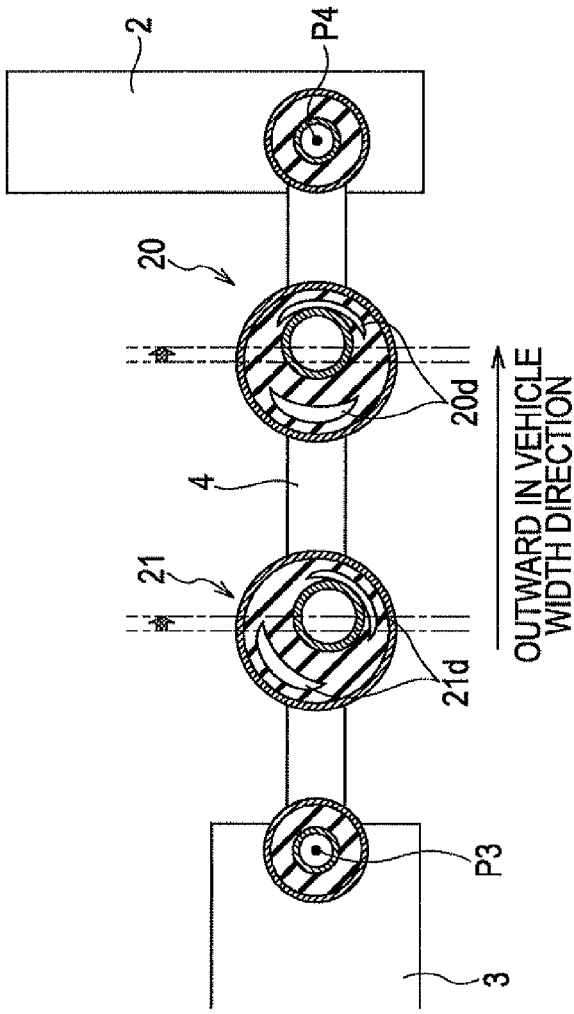

SUSPENSION DEVICE AND METHOD FOR SUPPORTING A WHEEL

CROSS-REFERENCE TO RELATED APPLICATIONS

This application claims priority from Japanese Patent Application Serial No. 2007-098524, filed Apr. 4, 2007, Japanese Patent Application Serial No. 2007-098527, filed Apr. 4, 2007 and Japanese Patent Application Serial No. 2007-171825, filed Jun. 29, 2007, each of which is incorporated herein in its entirety by reference.

TECHNICAL FIELD

The present invention relates to a suspension device and a method for supporting a wheel on a vehicle.

BACKGROUND

A related suspension device for rear wheels is discussed in, for example, Japanese Unexamined Patent Application Publication No. 62-234705. This device comprises a pair of rigid arms (lower arms) and a linking member. The pair of rigid arms links a vehicle-body side member and a lower area of a wheel supporting member, and the rigid arms are disposed apart from each other in a vehicle forward-backward direction. The linking member is provided between the pair of rigid arms and is rigidly linked to the pair of rigid arms. The linking member is formed of a flat steel plate whose thickness direction is oriented in a vehicle height direction. The linking member is deformable in a direction perpendicular to a plane defined by a plurality of linking portions that connects the rigid arms to the vehicle-body side member and the wheel supporting member.

Including a flexible linking member allows a forward-backward rigidity of the suspension device to be reduced and a toe characteristic to be adjusted. Reducing the forward-backward rigidity improves ride quality.

BRIEF SUMMARY

The present invention provides a suspension device and method for suspending wheels. According to one embodiment of a suspension device taught herein, a wheel supporting member is configured to rotatably support a wheel, two links respectively link the wheel supporting member and a vehicle-body side member and are disposed substantially in parallel in a vehicle width direction and at least one projecting portion extends from at least one of the two links towards the other links. In this example, a toe angle adjusting device is configured to input a force in a direction oriented backward in the vehicle forward-backward direction to the wheel supporting member to adjust a toe angle of the wheel.

In another embodiment, a suspension device for a wheel supporting member configured to rotatably support a wheel includes first and second linking means for linking the wheel supporting member and a vehicle-body side member, with the second linking means disposed behind the first linking means in a vehicle forward-backward direction. Elastic linking means link the first and second linking means. Relative displacement increasing means increases a relative displacement between the first and second linking means. Toe angle adjusting means adjusts a toe angle of the wheel by applying a force oriented towards a back in the vehicle forward-backward direction to the wheel supporting member.

In another embodiment, a method of suspending a wheel rotatably supported by a wheel supporting member includes displacing two links in accordance with a displacement of the wheel supporting member in a vehicle forward-backward direction. The two links link the wheel supporting member and a vehicle-body side member relative to each other, and the links are disposed substantially in parallel in a vehicle width direction. An elastic force is generated in accordance with the relative displacement, and the toe angle of the wheel is adjusted by applying a force oriented towards a back in the vehicle forward-backward direction to the wheel supporting member.

BRIEF DESCRIPTION OF THE DRAWINGS

FIGS. 28A and 28B are sectional views illustrating a suspension device for a vehicle wheel according to a tenth embodiment in which vehicle-body side connect bushes are anisotropic;

FIGS. 32A and 32B are sectional views illustrating the suspension device for rear wheels according to a second example of the tenth embodiment;

FIGS. 38A and 38B are sectional views illustrating the suspension device for a vehicle wheel according to a fifth example of the tenth embodiment;

FIGS. 40A and 40B are sectional views illustrating the suspension device for a vehicle wheel according to a sixth example of the tenth embodiment;

FIGS. 46A and 46B are sectional views of a different example in which the vehicle-body side connect bush is anisotropic.

DETAILED DESCRIPTION OF EMBODIMENTS OF THE INVENTION

In the related art, the rigidity of the suspension device is reduced by flexing the entire linking member in the plate thickness direction. There is no structure that restricts the amount of flexing and deformation of the linking member, and the larger the amount by which the rigidity of the linking member is reduced in order to reduce the forward-backward rigidity of the suspension device, the more difficult it becomes to maintain the orientation of wheels. As a result, it becomes difficult to adjust the toe characteristic of the wheel.

Embodiments of the suspension device taught herein allow the toe of the wheels of the vehicle to be controlled.

Figure 1:
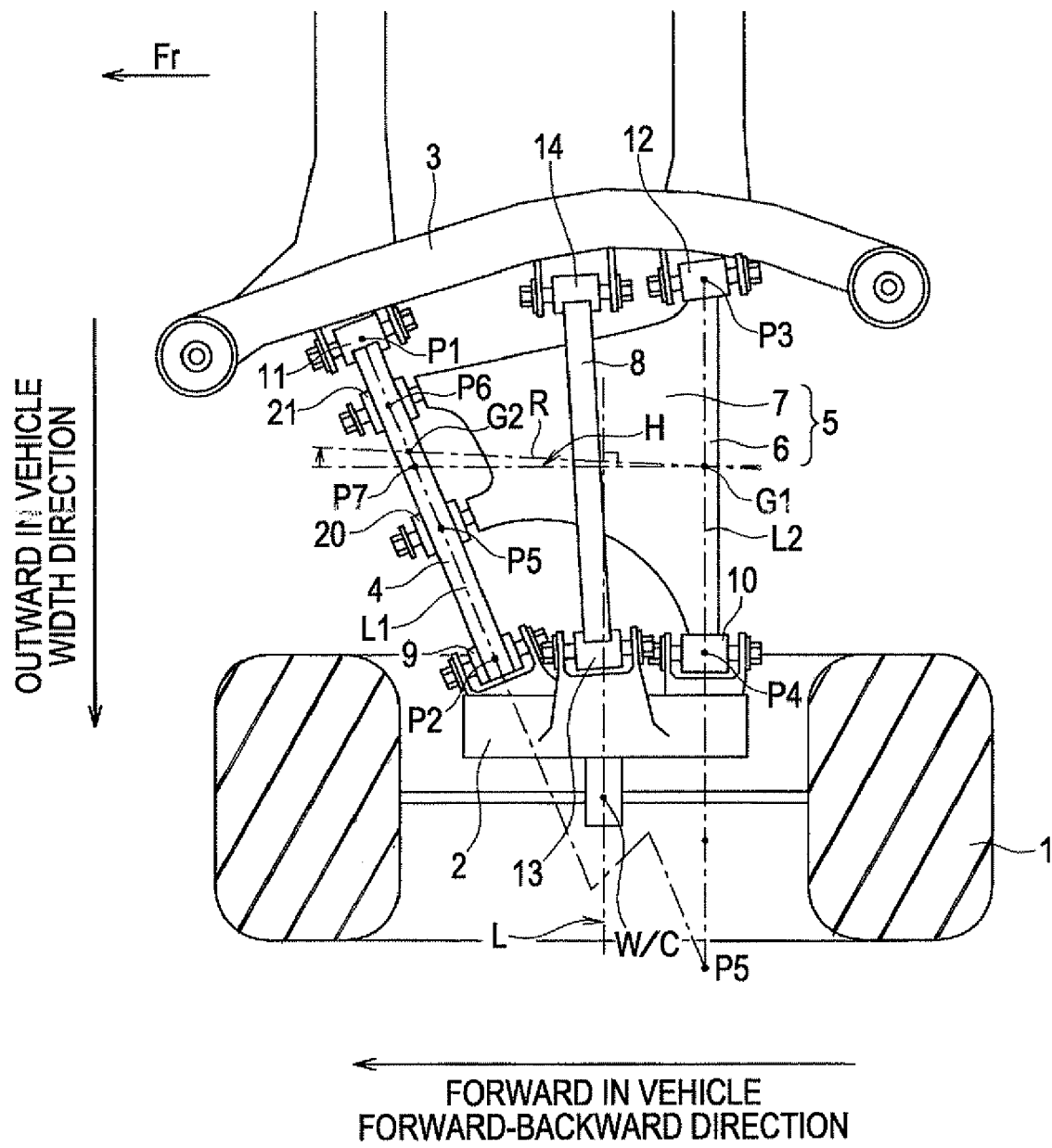
FIG. 1 is a top view of a suspension device for a vehicle wheel according to various embodiments of the invention.
Figure 2:
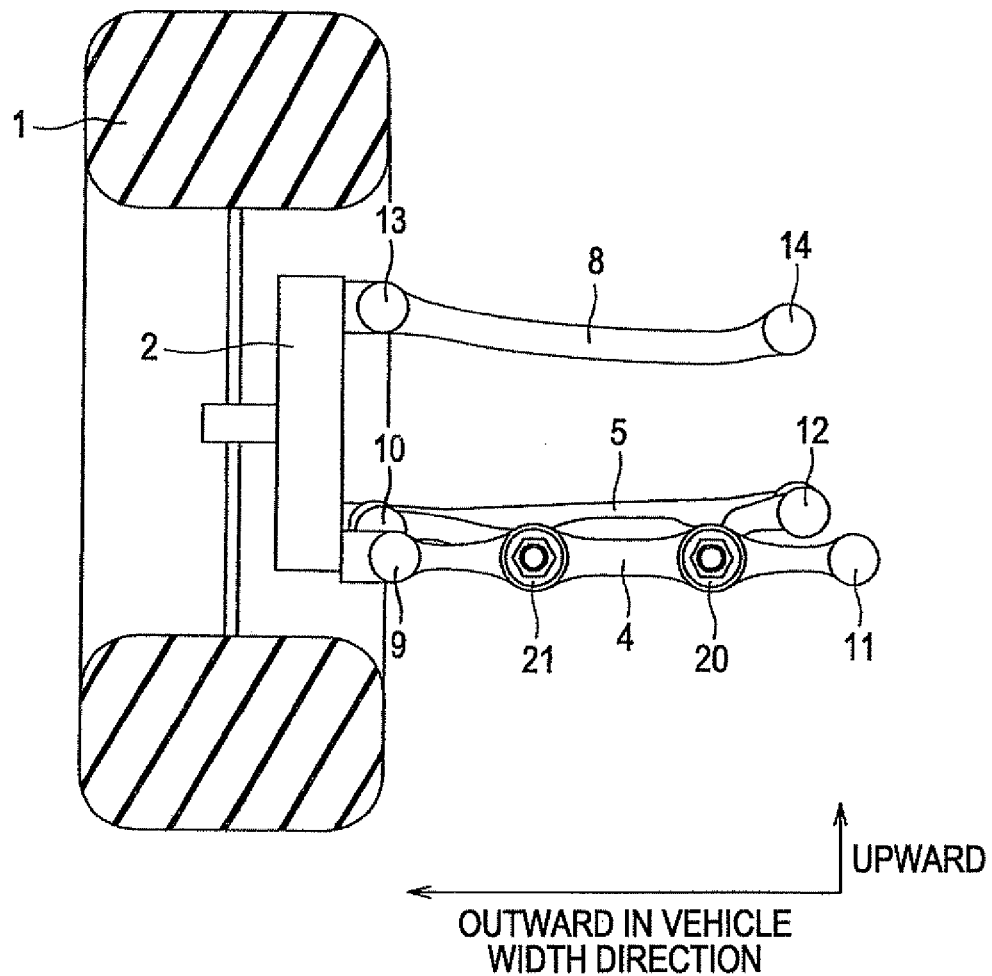
FIG. 2 is a schematic view, as seen from the front of a vehicle, of a disposition and structure of links in the suspension device for a vehicle wheel according to a first embodiment.

FIG. 1 is a top view of a suspension device for rear wheels according to a first embodiment. FIG. 2 is a schematic view illustrating a disposition of links as seen from the front side of a vehicle.

The suspension device comprises two lower links 4 and 5 and an upper link 8. The lower links 4 and 5 link a lower area of an axle 2, which rotatably supports a wheel 1, and a suspension member 3, which is a vehicle-body side member. The upper link 8 links an upper area of the axle 2 and the suspension member 3.

The two lower links 4 and 5 are mounted to the axle 2 by one elastic-member bush 9 and one elastic-member bush 10, respectively, so that the lower links 4 and 5 are swingable vertically relative to the axle 2. The two lower links 4 and 5 are linked to the suspension member 3 through one elastic-member bush 11 and one elastic-member bush 12, respectively, so that the lower links 4 and 5 are swingable vertically relative to the suspension member 3. The upper link 8 is mounted to the axle 2 by one elastic-member bush 13 so as to be swingable vertically relative to the axle 2, and is linked to the suspension member 3 by one elastic-member bush 14 so as to be swingable vertically relative to the suspension member 3.

The two lower links 4 and 5 are disposed substantially in parallel in a vehicle width direction. Here, when the two lower links 4 and 5 are to be distinguished in the description, the lower link 4 at the front side in the vehicle forward-backward direction will be called the "front lower link 4," and the lower link 5 at the rear side in the vehicle forward-backward direction will be called the "rear lower link 5."

The elastic-member bushes 9 to 14 comprise elastic members, formed of rubber, inserted between outer cylinders and respective inner cylinders and disposed in a nesting state. In the embodiment, the outer cylinders are secured to ends of the links 4, 5 and 8, and the inner cylinders are mounted to the suspension member 3 or the axle 2 through bolts.

The front lower link 4 is a rod member extending linearly along a link axial line L1, and the elastic-member bushes 9 and 11 are provided at mounting portions at the respective ends of the front lower link 4.

The rear lower link 5 comprises a link body 6 and a projecting portion 7. The link body 6 extends along a link axial line L2. The projecting portion 7 is integrated with the link body 6 and projects towards the front in the vehicle forward-backward direction, from the link body 6 towards the front lower link 4. The projecting portion 7 is a plate member that has a substantially trapezoidal shape in top view.

An end of the projecting portion 7 is linked to the front lower link 4 through two elastic-member bushes 20 and 21 disposed in an offset manner in a vehicle width direction. In the embodiment, the elastic-member bushes 20 and 21 are, in top view, disposed with the axes being oriented in substantially the vehicle forward-backward direction. The outer cylinders of the bushes 20 and 21 are secured to the front lower link 4, and the inner cylinders of the bushes 20 and 21 are secured to the projecting portion 7 through mounting bolts. Accordingly, the front lower link 4 and the rear lower link 5 are, by the elastic-member bushes 20 and 21 (which are linking portions), linked to each other so as to be swingable three-dimensionally. In addition, the swinging amounts thereof are restricted to certain amounts due to, for example, the span between the outer and inner cylinders and the rigidity of the elastic members.

In addition, in top view, the lower links 4 and 5 are disposed so that the span in the vehicle forward-backward direction between mounting points of the respective lower links 4 and 5 to the axle 2 (hereunder simply referred to as "wheel-side mounting points P2 and P4") is less than the span in the vehicle forward-backward direction between mounting points of the respective lower links 4 and 5 to the suspension member 3 (hereunder simply referred to as "vehicle-body side mounting points P1 and P3"). That is, in top view, an intersection P5 of the axial line L1 (connecting the wheel-side mounting point P2 and the vehicle-body side mounting point P1 of the lower link 4) and the axial line L2 (connecting the wheel-side mounting point P4 and the vehicle-body side mounting point P3 of the lower link 5) is further outward than the axle 2 in the vehicle width direction, that is, further outward than the wheel-side mounting points P2 and P4 of the respective lower links 4 and 5 in the vehicle width direction. In the embodiment shown in FIG. 1, in top view, an offset amount of the wheel-side mounting point P2 towards the back in the vehicle forward-backward direction with respect to the vehicle-body side mounting point P1 in the lower link 4 is larger than an offset amount (substantially zero in FIG. 1) of the wheel-side mounting point P4 towards the back in the vehicle forward-backward direction with respect to the vehicle-body side mounting point P3 in the rear lower link 5. In addition, the tilting of the link axial line L1 of the front lower link 4 towards the back in the vehicle forward-backward direction is larger than the tilting of the link axial line L2 of the rear lower link 5 towards the back in the vehicle forward-backward direction. Due to such a disposition, in top view, the shape defined by connecting four points, that is, the wheel-side mounting points P2 and P4 and the vehicle-body side mounting points P1 and P3 of the respective lower links 4 and 5, is substantially trapezoidal.

Accordingly, as a result of setting the offset amount of the wheel-side mounting point P2 of the front lower link 4 with respect to the vehicle-body side mounting point P1 of the front lower link 4 towards the back in the vehicle forward-backward direction greater than the offset amount of the wheel-side mounting point P4 of the rear lower link 5 with respect to the vehicle-body side mounting point P3 of the rear lower link 5 towards the back in the vehicle forward-backward direction, the intersection P5 of the link axial lines L1 and L2 of the respective lower links 4 and 5 is, in top view, disposed behind a center of the wheel 1 (wheel center W/C) in the vehicle front-backward direction.

The elastic-member bushes 20 and 21, which constitute the linking portions that swingably link the front lower link 4 and the projecting portion 7 to each other, are called "connect bushes 20 and 21." The elastic-member bushes 9 to 12, which link the lower links 4 and 5 to the axle 2 and the suspension member 3, are called "mounting bushes 9 to 12."

In addition, the two connect bushes 20 and 21 have anisotropic properties in which the vertical rigidity is relatively lower than the rigidity in the vehicle width direction, and the bush axes are oriented in substantially the vehicle forward-backward direction as mentioned above.

Figure 3:
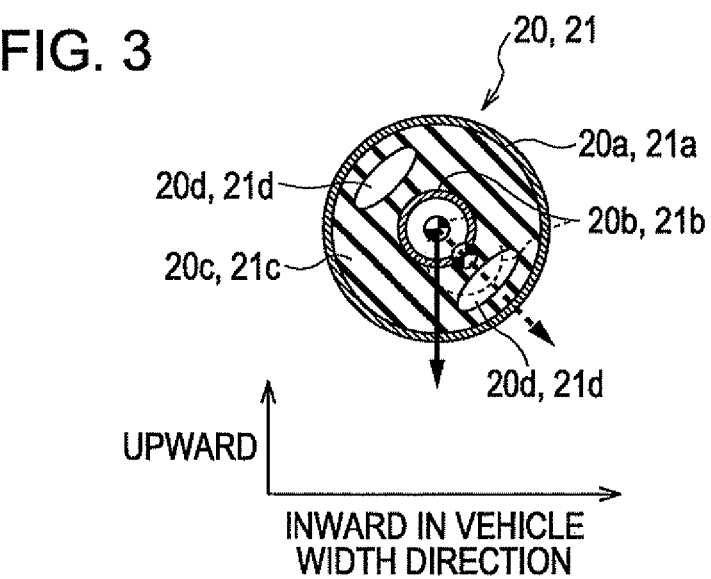
FIG. 3 illustrates, as seen from the back of the vehicle, a connect bush according to various embodiments.

The two connect bushes 20 and 21 have anisotropic properties in which a rigidity oriented obliquely downward towards the inner side in the vehicle width direction as seen from the back of the vehicle is lower than other vertical rigidities. For example, as shown in FIG. 3, the anisotropic properties are achieved by forming hollows 20d and 21d in elastic members 20c and 21c interposed between inner cylinders 20b and 21b and outer cylinders 20a and 21a of the respective connect bushes 20 and 21. The hollows 20d and 21d are positioned obliquely above the respective inner cylinders 20b and 21b at the wheel side and obliquely below the respective inner cylinders 20b and 21b at the vehicle-body side. Alternatively, instead of the hollows 20d and 21d or in addition to the hollows 20d and 21d, intermediate plates (not shown) that are harder than the elastic members 20c and 21c can be inserted obliquely below the inner cylinders 20b and 21b at the wheel side and obliquely above the inner cylinders 20b and 21b at the vehicle-body side to achieve the anisotropic properties.

Here, the axle 2 constitutes a wheel supporting member, the suspension member 3 constitutes a vehicle-body side member, the connect bushes 20 and 21 constitute elastic-member bushes, the rear lower link 5 constitutes a first lower link, the front lower link constitutes a second lower link, and the hollows 20d and 21d constitute a toe angle adjusting component.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

The two lower links 4 and 5 are linked to each other, but can only swing within a predetermined range because the connect bushes 20 and 21 prevent swinging beyond the predetermined swinging range in the vehicle width direction with respect to an input to the wheels 1 in the vehicle forward-backward direction.

Figure 4:
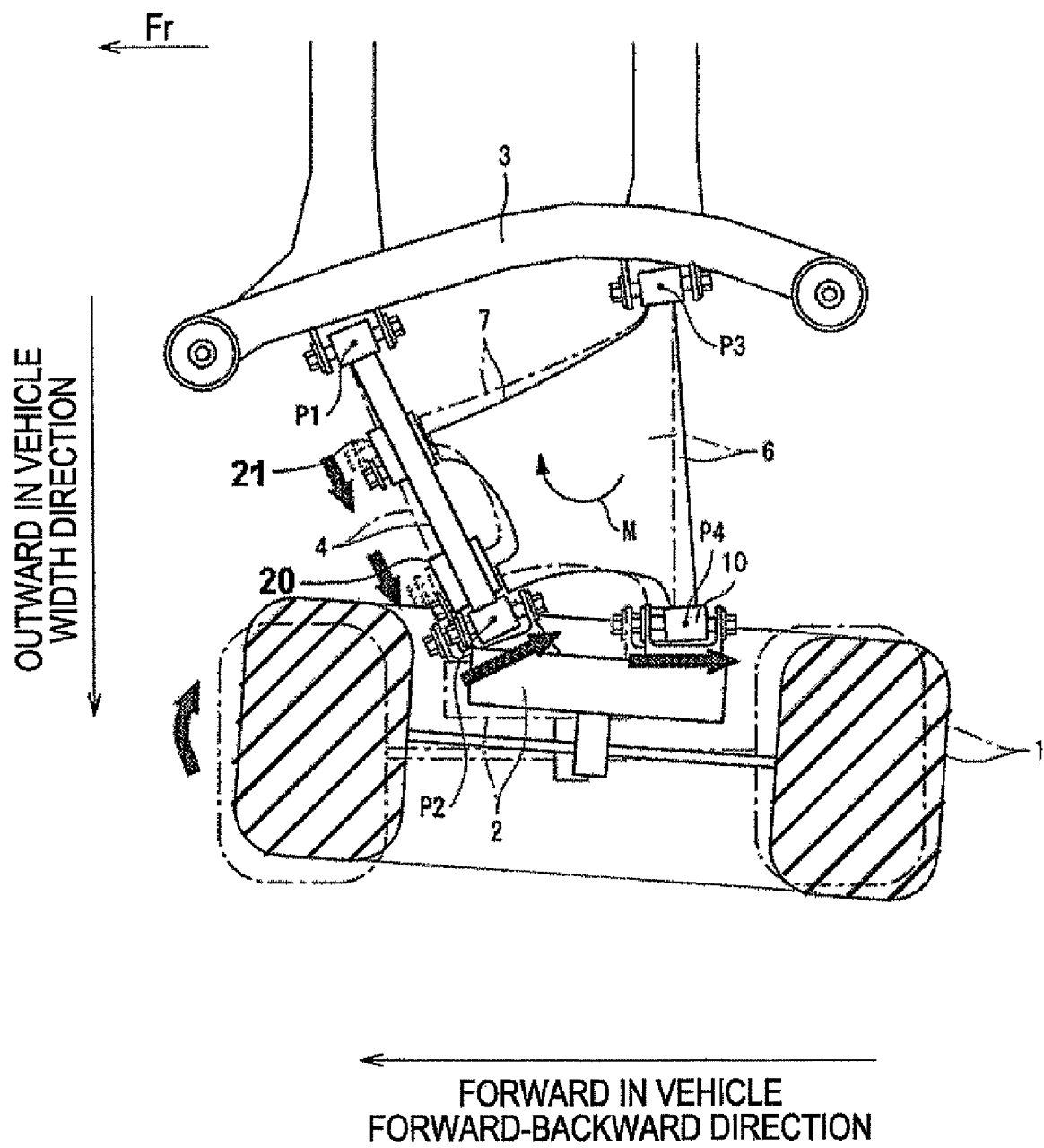
FIG. 4 is a top view of a behavior with respect to an input in a vehicle forward-backward direction.

As a result, the elastic members of the connect bushes 20 and 21 (linking portions) flex with respect to the input to the wheel 1 in the forward-backward direction (forward-backward input to the wheel center W/C) due to an irregular road surface so that, as shown in FIG. 4, the inner cylinders 20b and 21b are swung and displaced in the vehicle width direction while being swung slightly in the vehicle forward-backward direction relative to the outer cylinders 20a and 21a. This causes the substantially trapezoidal shape in which the four points (that is, the wheel-side mounting points P2 and P4 of the respective two lower links 4 and 5 and the vehicle-body side mounting points P1 and P3 of the respective two lower links 4 and 5) are connected to be changed as seen in top view, so that the rigidity in the vehicle forward-backward direction of the axle 2 supported at the two linked lower links 4 and 5 is set low. Therefore, shock when moving over a protrusion is reduced, thereby improving ride quality.

When the elastic members 20c and 21c flex by an amount greater than or equal to a predetermined amount, the connect bushes 20 and 21 cannot swing any further. Therefore, even if a different member is not provided, the connect bushes 20 and 21 are prevented from swinging more than necessary.

In addition, the connect bushes 20 and 21 flex with respect to the forward-backward direction input to absorb the input, thereby resulting in damping due to the characteristics of the rubber making up the connect bushes 20 and 21. Therefore, vibration with respect to the input in the forward-backward direction subsides properly. Further, even if the lower links 4 and 5 are designed so as to satisfy strength requirements, the rigidity in the forward-backward direction is determined by the rigidity of the connect bushes 20 and 21 so that the degree of design freedom can be increased.

Thus, the rigidity with respect to the input in the forward-backward direction can be set low as a result of the connect bushes 20 and 21 flexing with respect to the forward-backward direction input to the wheel 1, even if the two lower links 4 and 5 are connected to each other, and are made to receive the forward-backward direction input to the wheel 1 to reduce shock resulting from, for example, an irregular road surface. The rigidity of the mounting bushes 9 to 12 need not be set low. That is, the rigidity of the mounting bushes 9 to 12 of the lower links 4 and 5 can set high. Therefore, horizontal rigidity (that is, rigidity in the vehicle width direction) of the axle 2 can be made high. In addition, the high rigidity of the mounting bushes 9 to 12 increases the rigidity of a camber, so that steering stability can be increased. Since the horizontal input to the wheel 1 is applied to the two lower links 4 and 5 in substantially the directions of the link axial lines L1 and L2, even if the rigidity of the connect bushes 20 and 21 is set low, the horizontal rigidity of the axle 2 is not set low. As a result, the rigidity in the forward-backward direction can be set low and the horizontal rigidity can be set high, so that the ride quality can be improved and the steering stability can be increased.

In top view, the intersection P5 of the link axial lines L1 and L2 of the respective two lower links 4 and 5 is positioned behind the center between the wheel 1 (wheel center W/C) in the vehicle forward-backward direction so that the rotational center of the axle 2 is positioned behind the wheel center W/C. Therefore, with respect to an input in a tire horizontal direction when the vehicle is turning, a torque that causes the turning outer wheel 1 to be oriented in a toe-in direction acts, so that the stability during the turning of the vehicle is increased.

In top view, since the intersection P5 of the link axial lines L1 and L2 of the respective two linked lower links 4 and 5 is set outward of the axle 2 in the vehicle width direction, that is, since the span between the wheel-side mounting points P2 and P4 is set narrower than the span between the vehicle-body side mounting points P1 and P3 in the vehicle forward-backward direction, several advantages are provided.

First, when an input in the backward direction in the vehicle forward-backward direction is made to the ground-contact face of the wheel 1 due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction of the vehicle causes a change in toe to a toe-in direction, so that stability is increased during the braking.

Also, in the embodiment shown in FIG. 1, the link axial line L2 of the rear lower link 5 is set substantially in the vehicle width direction. The link axial line L1 of the front lower link 4 is tilted towards the back in the vehicle forward-backward direction so that its wheel side is set towards the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled further towards the vehicle than the wheel-side mounting point P4 of the rear lower link 5, so that the wheels 1 change to the toe-in direction.

Further, since the rigidity of the connect bushes 20 and 21 is anisotropic, additional operational advantages are provided for the input to the ground-contact face of the wheel 1 in the vehicle forward-backward direction.

Figure 5:
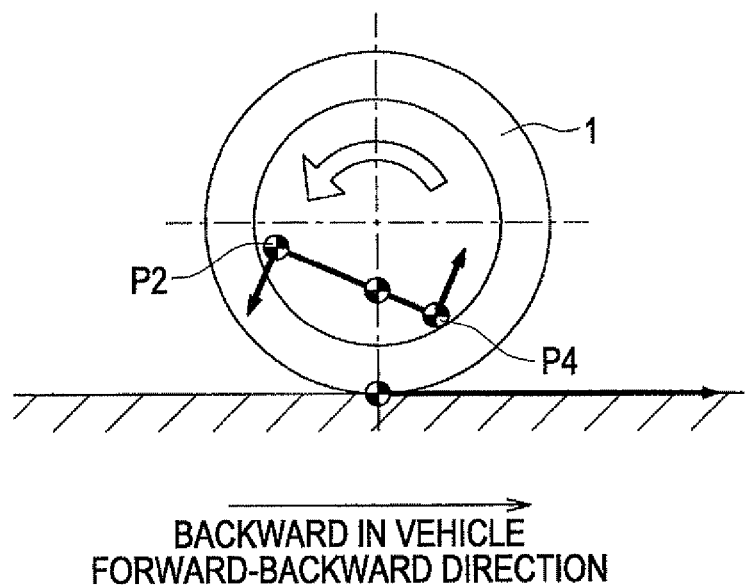
FIG. 5 is a schematic view as seen from a side of the vehicle when the forward-backward direction input is provided to a ground-contact point of the vehicle.

When a braking force in the vehicle forward-backward direction is input to the ground-contact face of each wheel 1 due to, for example, a braking operation, a moment in a wind-up direction is generated due to this input as illustrated in FIG. 5. This moment causes an upward force to act upon the link body 6 of the rear lower link 5 linked to the axle 2 and a downward force to act upon the front lower link 4, so that vertical forces are also input to the connect bushes 20 and 21 linking the lower links 4 and 5.

Focusing attention upon the rear lower link 5, the center of gravity of the rear lower link 5 is positioned between the link body 6 and an end of the projecting portion 7 mounted to the connect bushes 20 and 21 (hereinafter referred to as "the end portion side of the projecting portion 7") in the vehicle forward-backward direction. Therefore, when an upward force acts upon the link body 6, a downward force acts upon the end portion side of the projecting portion 7.

To compensate for these forces, the two connect bushes 20 and 21 shown in FIG. 3 have a low rigidity in the direction obliquely downward toward the inner side of the vehicle. Therefore, the inner cylinders 20b and 21b secured to the projecting portion 7 are pulled inward in the vehicle-width direction while being displaced downward by the downward force. Due to such displacement behavior, a rotational-direction moment M, shown in top view in FIG. 4, acts upon the rear lower link 5. This moment M causes a force acting towards the front in the vehicle forward-backward direction to act upon the wheel-side mounting point P4 of the rear lower link 5. As a result, due to the wind-up moment M, the swinging amount towards the back in the vehicle forward-backward direction of the wheel-side mounting point P4 of the rear lower link 5 is small. Therefore, steering in the toe-in direction is increased, thereby making it possible to increase vehicle stability during braking.

Although the upper link 8 comprises one rod link in the described embodiment, the upper link 8 may comprise two or more rod links, or may be one having a different form, such as an A arm.

Further, although the link axial line L2 of the rear lower link 5 is disposed in the vehicle width direction and the link axial line L1 of the front lower link 4 is tilted towards the back in the vehicle forward-backward direction to set the intersection P5 of the link axial lines L1 and L2 of the respective two lower links 4 and 5 further outward than the axle 2 in the vehicle width direction in the described embodiment, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point 4 is disposed more towards the front in the vehicle forward-backward direction than the vehicle-body side mounting point P3. With this arrangement, the intersection P5 of the link axial lines L1 and L2 of the respective two lower links 4 and 5 is still further outward than the axle 2 in the vehicle width direction.

Also, although the axes of the connect bushes 20 and 21 are disposed so as to be oriented substantially in the vehicle forward-backward direction, the invention is not limited by this feature. The axes of the connect bushes 20 and 21 may be disposed, for example, in the vehicle width direction or along the link axial lines L1 and L2.

Further, the two connect bushes 20 and 21 need not be disposed on the link axial line L1 in top view.

The number of connect bushes 20, 21 linking the two lower links 4 and 5 to each other is not limited to two, so that three or more bushes may be used, or one large bush can be used.

Further, the span in the vehicle forward-backward direction between the mounting points P1 and P3 may be equal to the span between the mounting points P2 and P4, that is, the two lower links 4 and 5 may be set parallel to each other.

The basic structure of the second embodiment is similar to that of the first embodiment. Parts, etc., similar to those of the above-described embodiment are given the same reference numerals and are not described in detail. The embodiment differs from the first embodiment in that the anisotropic properties of the rigidities of two connect bushes 20 and 21 are different from each other.

Figure 6:
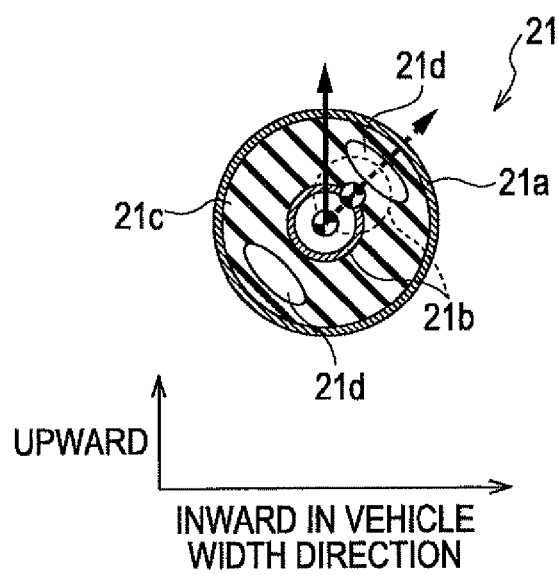
FIG. 6 illustrates, as seen from the back of the vehicle, a connect bush according to various embodiments.

That is, in the first embodiment (see FIG. 3), the rigidity of both connect bushes 20 and 21 is anisotropic in that a rigidity oriented obliquely downward towards the inner side in a vehicle-width direction is relatively low. In contrast, as illustrated in FIG. 6, the rigidity of the vehicle-body side connect bush 21 is anisotropic in that a rigidity oriented obliquely upward towards the inner side in the vehicle-width direction is relatively low.

In the second embodiment, when a braking force in the vehicle forward-backward direction is input to the ground-contact face of each wheel 1 due to, for example, a braking operation, a moment in a wind-up direction is generated. This moment imparts a force upward to the rear lower link 5 in the vehicle height direction and a downward force to the front lower link 4 in the vehicle height direction. Relative movement of the links 4 and 5 causes the inner cylinders 20b and 21b of the respective connect bushes 20 and 21 to be displaced obliquely downward so as to be pulled toward the vehicle in the vehicle-width direction relative to the outer cylinders 20a and 21a, with the wheel-side connect bush 20 displaced downward by a larger amount than the vehicle-body side connect bush 21. The relative displacement of the connect bushes 20 and 21 tilts the projecting portion 7 as shown in FIG. 4. Consequently, the projecting portion 7 generates a rotational-direction moment M illustrated in top view in FIG. 4. This moment M causes a force acting towards the front in the vehicle forward-backward direction to act upon the wheel-side mounting point P4 of the rear lower link 5. As a result, steering in the toe-in direction is increased, thereby making it possible to increase vehicle stability during braking.

Since a front lower link 4 is displaced downward by the moment in the wind-up direction, the outer cylinder 21a of the connect bush 21 is also displaced downward. As illustrated in FIG. 6, the inner cylinder 21b of the vehicle-body side bush 21 is displaced upward with respect to the outer cylinder 21a.

Thus, when a forward-backward force is input to a wheel 1 due to, for example, traveling over a protrusion, toe-in is restricted in comparison with that in the first embodiment.

The other operational advantages are the same as those of the above-described embodiment.

When three or more connect bushes linking the two lower links 4 and 5 are used, the connect bushes define an elastic center. The rigidity of a connect bush disposed closer to the wheel 1 than the elastic center has the same anisotropic property as that of the wheel-side connect bush 20, whereas the rigidity of a connect bush disposed closer to the vehicle-body than the elastic center has the same anisotropic property as that of the vehicle-body side connect bush 21.

The rigidity of the vehicle-body side connect bush 21 is also anisotropic, but the vehicle-body side connect bush 21 need not be provided with hollows.

Even when the vehicle-body side connected bush 21 does not include hollows, the vertical rigidity of the wheel-side connect bush 20 is relatively lower than the vertical rigidity of the vehicle-body side connect bush 21.

Therefore, when a downward force acts upon the front lower link side of the projecting portion 7 by a wind-up direction moment, the wheel side of the front lower link 4 is displaced downward by a larger amount than the vehicle-body side, resulting in a force that pulls inward in the vehicle-width direction at the wheel-side connect bush 21. Accordingly, in top view, the rotational-direction moment M acts upon the projecting portion 7 so that the movement of a wheel-side mounting point P4 of a link body 6 towards the back in the vehicle forward-backward direction is restricted. As a result, steering in a toe-in direction is increased, thereby making it possible to increase vehicle stability during braking.

The basic structure of a third embodiment is similar to those of the first and second embodiments, but differs in the adjustment of the rigidities of two connect bushes. Parts, etc. similar to those in the above-described embodiments are given the same reference numerals.

The rigidity of a wheel-side connect bush 20 is set lower than the rigidity of a vehicle-body side connect bush 21 so that an elastic center G2, defined by the two connect bushes 20 and 21, is positioned more towards the inner side in a vehicle width direction than the center between the connect bushes 20 and 21.

In addition, the rigidity of the vehicle-body side connect bush 21 is adjusted so as to be higher than the rigidity of the wheel-side connect bush 20 so that the elastic center G2 is positioned more towards the inner side in the vehicle-width direction than an elastic center G1, defined as the center point between a vehicle-body side mounting bush 12 and a wheel-side mounting bush 10 of the rear lower link 5.

Figure 7:
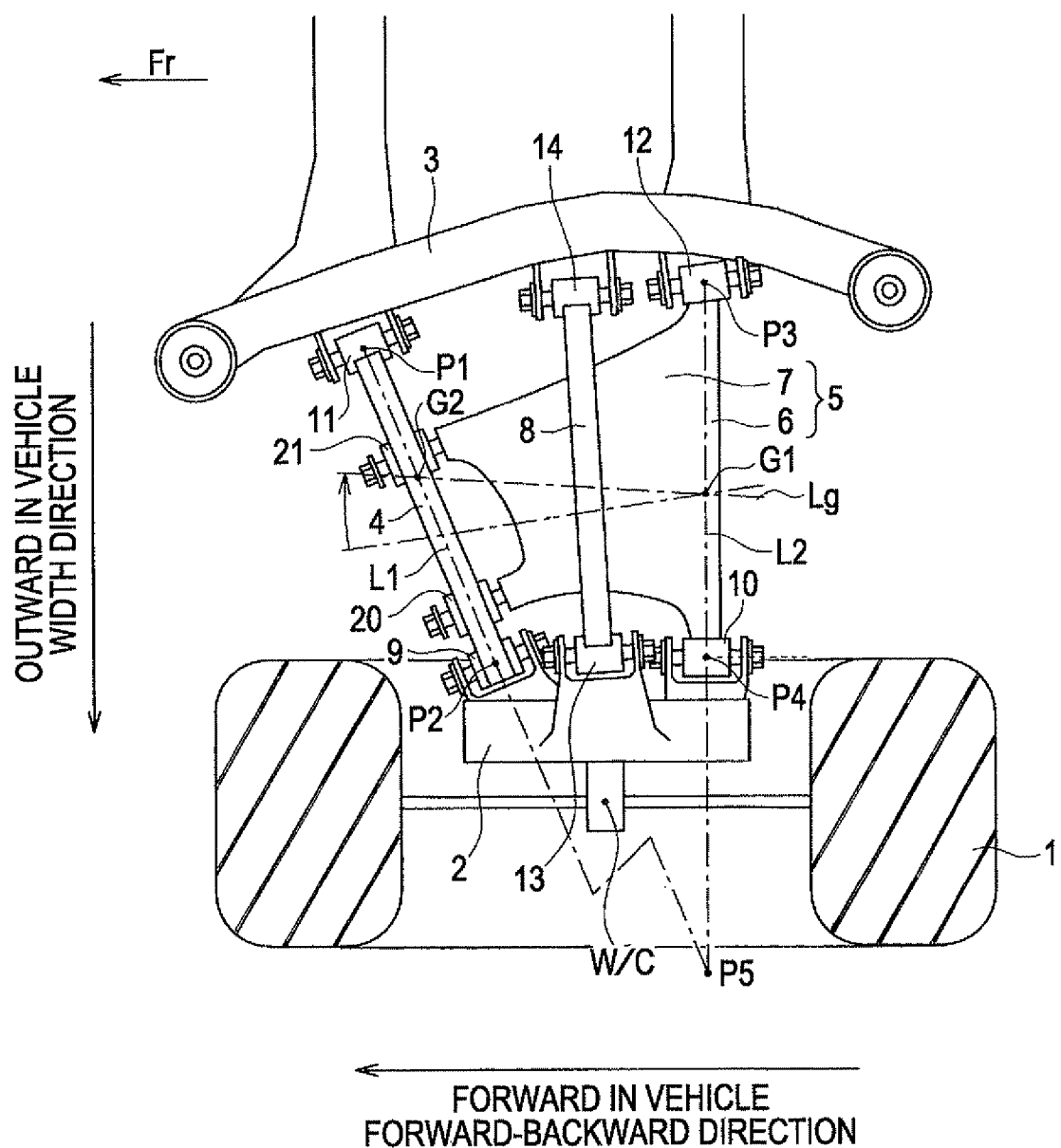
FIG. 7 is a top view illustrating a first suspension device for a vehicle wheel according to a third embodiment.

With this arrangement, in top view, an axis passing through the two elastic centers G1 and G2 becomes an elastic principal axis Lg of the rear lower link 5. This elastic principal axis Lg is tilted with respect to a vehicle forward-backward direction so that its front side is positioned at the inner side in the vehicle width direction as illustrated in FIG. 7.

When a moment in a wind-up direction causes an upward force to act upon a link body 6 and a downward force to act upon a front-lower-link side of a projecting portion 7 in the rear lower link 5, the rear lower link 5 tries to rotate around the elastic principal axis Lg or the vicinity thereof. As a result, compared to the case in which the elastic principal axis Lg is oriented in the vehicle forward-backward direction, a force that displaces a wheel-side mounting point P4 towards the front in the vehicle forward-backward direction is generated. Therefore, steering in a toe-in direction is increased, thereby making it possible to increase vehicle stability during braking.

Even if the elastic center G2 is not positioned more towards the inner side in the vehicle width direction than the elastic center G1, the elastic center G2 can be set so as to be positioned more towards the inner side in the vehicle width direction than the center between the connect bushes 20 and 21 to increase steering in the toe-in direction, compared to the case in which the elastic center G2 is positioned at the center between the connect bushes 20 and 21.

Additional operational advantages are similar to those of the above-described embodiments.

When the rigidities of the connect bushes 20 and 21 are anisotropic, the intersection of the directions of the anisotropic properties of both connect bushes 20 and 21 becomes the elastic center G2.

Although in the foregoing description the elastic principal axis Lg is adjusted so that it angles toward the vehicle when moving from back to front in the vehicle forward-backward direction by changing the relative rigidities of the two connect bushes 20 and 21, the invention is not limited thereto. Alternatively, by adjusting the mounting positions of the connect bushes 20 and 21, the elastic principal axis Lg may be adjusted so that its front side in the vehicle forward-backward direction is positioned at the inner side in the vehicle width direction.

Figure 8:
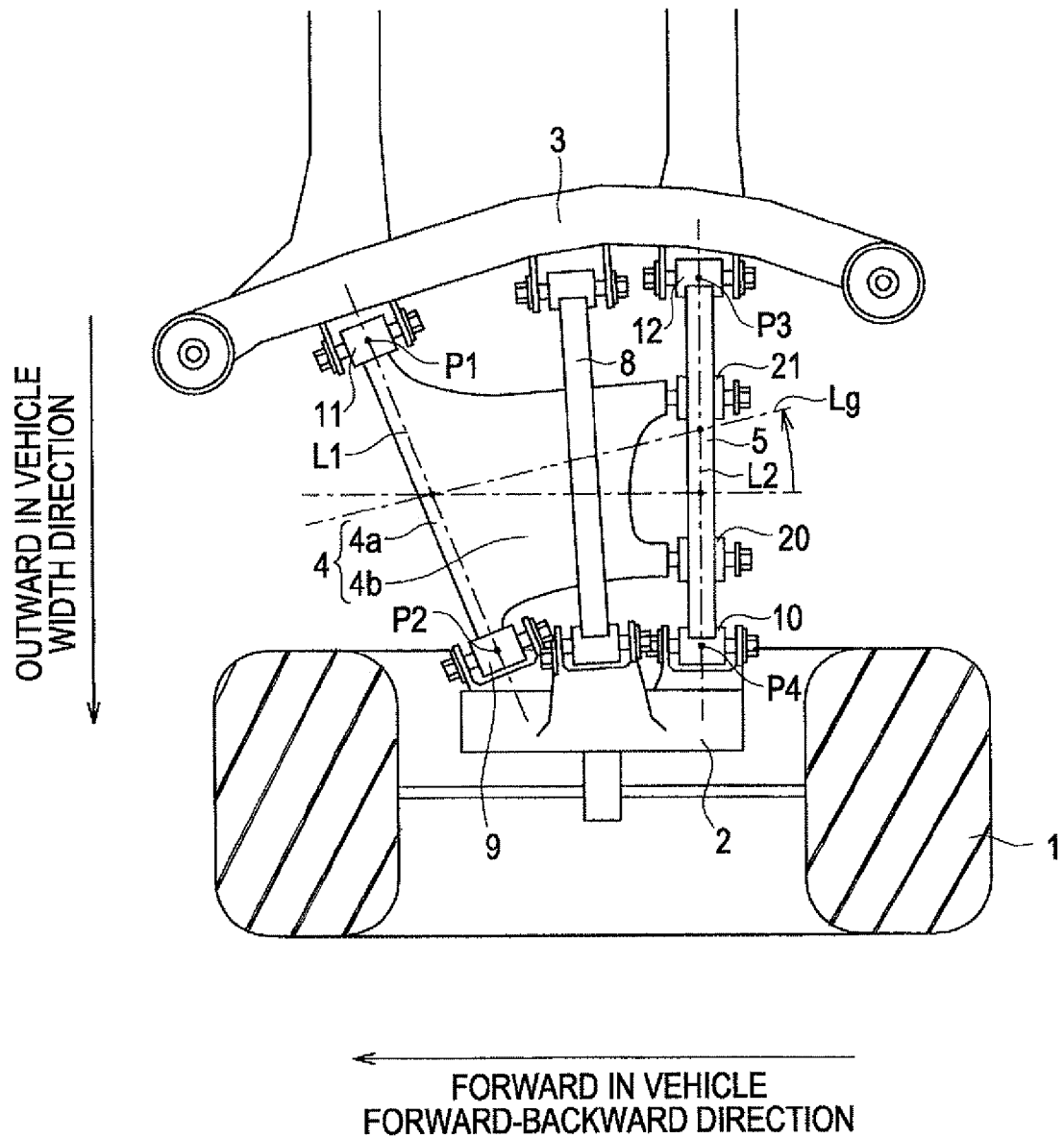
FIG. 8 is a top view illustrating a second suspension device for a vehicle wheel according to the third embodiment.

As shown in FIG. 7, the rear lower link 5 is defined as the first lower link and has the projecting portion 7. However, as shown in FIG. 8, a front lower link 4 may alternatively be the first lower link body 4a and a projecting portion 4b projecting towards the rear lower link 5.

In this case, the rigidities of connect bushes 20 and 21 are adjusted so that an elastic center G2 defined by the connect bushes 20 and 21 is positioned towards the inner side in the vehicle width direction with respect to an elastic center G1 defined as the center point between a mounting bush 11 at a vehicle-body side mounting point P1 and a mounting bush 9 at a wheel-side mounting point P1 of a link body 4a of the front lower link 4. An elastic principal axis Lg of the lower link 4 is adjusted so that its front side in the vehicle forward-backward direction is positioned at the inner side in the vehicle width direction.

When a downward force caused by a moment in the wind-up direction acts upon the link body 4a and a upward force caused by the moment in the wind-up direction acts upon a rear-lower-link side of the projecting portion 4b in the front lower link 4, the front lower link 4 tries to rotate vertically around the elastic principal axis Lg or the vicinity thereof. As a result, compared to the case in which the elastic principal axis Lg is oriented in the vehicle forward-backward direction, a force that displaces the wheel-side mounting point P2 towards the back in the vehicle forward-backward direction is generated by the wind-up direction moment. Therefore, steering in a toe-in direction is increased, thereby making it possible to increase vehicle stability during braking.

Figure 9:
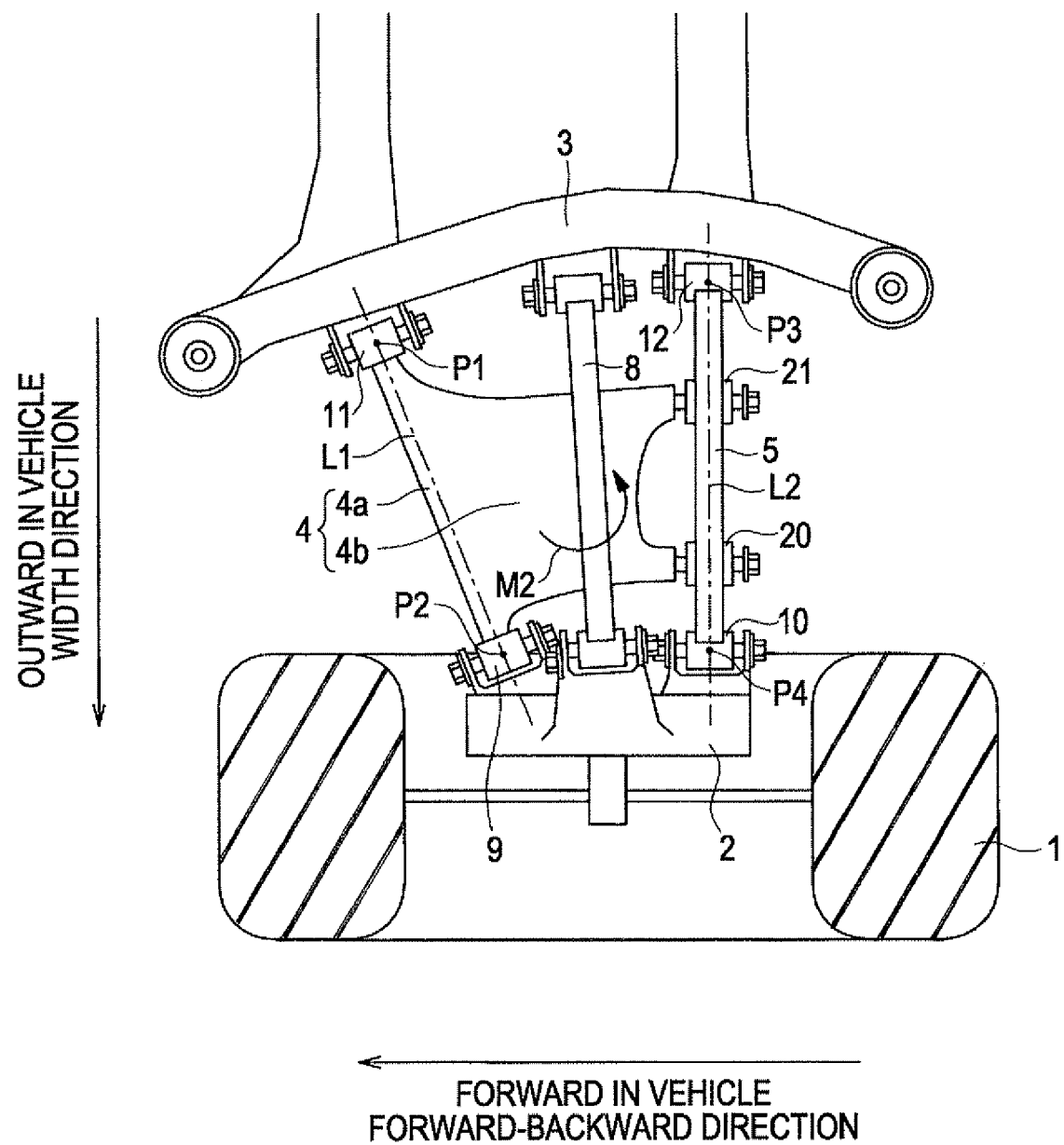
FIG. 9 is a top view illustrating a suspension device for a vehicle wheel according to a fourth embodiment.

In a fourth embodiment, as shown in FIG. 9, the basic structure comprises a front lower link 4 defined as a first lower link body 4a and a projecting portion 4b projecting towards a rear lower link 5, with two connect bushes 20 and 21 linking the projecting portion 4b and the rear lower link 5. Parts, etc. similar to those in the above-described embodiments are given the same reference numerals.

The axes of the connect bushes 20 and 21 are oriented substantially in a vehicle forward-backward direction. In addition, the connect bushes 20 and 21 have anisotropic properties in which a vertical rigidity is relatively lower than a rigidity in a vehicle width direction.

That is, the two connect bushes 20 and 21 have anisotropic properties such that, as seen from the back of the vehicle, a rigidity oriented obliquely upward towards the inner side in the vehicle width direction is lower than other vertical rigidities. For example, FIG. 6 illustrated a connect bush 21 as seen from the back of the vehicle. The anisotropic properties are achieved by forming hollows 20d and 21d in rubber elastic members 20c and 21c. The hollows 20d and 21d are interposed between inner cylinders 20b and 21b and outer cylinders 20a and 21a of the respective connect bushes 20 and 21 so that the hollows 20d and 21d are positioned obliquely below the respective inner cylinders 20b and 21b at the wheel side and obliquely above the respective inner cylinders 20b and 21b at the vehicle-body side. Alternatively, instead of the hollows 20d and 21d, or in addition to the hollows 20d and 21d, intermediate plates that are harder than the elastic members 20c and 21c can be inserted obliquely above the inner cylinders 20b and 21b at the wheel side and obliquely below the inner cylinders 20b and 21b at the vehicle-body side to make adjustments to achieve the anisotropic properties.

When a braking force in the vehicle forward-backward direction is input to a ground-contact face of each wheel 1 due to, for example, a braking operation, a moment in a wind-up direction is generated due to this input (see FIG. 5). This moment causes an upward force to act upon the rear lower link 5 linked to an axle 2 and a downward force to act upon the link body 4a of the front lower link 4 so that vertical forces are also input to the connect bushes 20 and 21 linking both the lower links 4 and 5.

Focusing attention upon the front lower link 4, in the vehicle forward-backward direction, the center of gravity of the front lower link 4 is positioned between the link body 4a and an end of the projecting portion 4b mounted to the connect bushes 20 and 21 (hereinafter referred to as "the end portion side of the projecting portion 4b"). Therefore, when a downward force acts upon the link body 4a, an upward force acts upon the end portion side of the projecting portion 4b.

Due to the anisotropic rigidity of the two connect bushes 20 and 21 as shown in FIG. 6, the rigidity of the bushes 20 and 21 oriented obliquely upward towards the inner side in the vehicle width direction is set relatively low. Therefore, the inner cylinders 20b and 21b that are secured to the projecting portion 4b are pulled inward in the vehicle width direction while being displaced upward by the upward force. The movement of the inner cylinders 20b and 21b creates a rotational-direction moment M2 shown in FIG. 9 that acts upon the link body 4a of the front lower link 4. This moment M2 causes a force towards the back in the vehicle forward-backward direction acting upon a wheel-side mounting point P2 of the front lower link 4 with a vehicle-body side mounting point P1, which acts as a pivot. As a result, the swinging amount towards the back in the vehicle forward-backward direction of the wheel-side mounting point P2 of the front lower link 4 is increased by the wind-up moment. Therefore, steering in a toe-in direction is increased, thereby making it possible to increase vehicle stability during braking.

Additional operational advantages are the same as those of the above-described embodiments.

In a fifth embodiment, similarly to the fourth embodiment, the basic structure comprises a front lower link 4 defined as a first lower link body 4a and a projecting portion 4b projecting towards a rear lower link 5, with two connect bushes 20 and 21 linking the projecting portion 4b and the rear lower link 5. Parts, etc. similar to those in the above-described embodiments are given the same reference numerals and are described.

While the basic structure of the fifth embodiment is similar to that of the fourth embodiment, the anisotropic properties of the rigidities of the two connect bushes in the embodiments differ.

That is, as in the fourth embodiment, the anisotropy of the rigidity of the wheel-side connect bush 20 is such that a rigidity oriented obliquely upward towards the inner side in a vehicle width direction is set relatively low (see FIG. 6). In contrast with the fourth embodiment, the vehicle-body side connect bush 21 of the fifth embodiment has an anisotropic property in which a rigidity oriented obliquely downward towards the inner side in the vehicle width direction as viewed from the back of a vehicle as in FIG. 3 is set relatively low.

The other structural features are the same as those of the fourth embodiment.

When a braking force in the vehicle forward-backward direction is input to the ground-contact face of each wheel 1 due to, for example, a braking operation, a moment in a wind-up direction is generated. This causes inner cylinders of the respective connect bushes 20 and 21 to be displaced obliquely upward so as to be pulled in the vehicle-width direction. The wheel-side connect bush 20 is relatively displaced upward by a larger amount than the vehicle-body side connect bush 21, so the projecting portion 4b is tilted by the relative displacement of the wheel-side connect bush 20 and the vehicle body-side connect bush 21. Tilting the projecting portion 4b creates a moment M2 that causes the link body 4a to rotate. As a result, steering in a toe-in direction is increased, thereby making it possible to increase vehicle stability during braking.

In addition, when a forward-backward force is input to a wheel due to, for example, traveling over a protrusion, toe-in is restricted in comparison with that in the first embodiment.

Additional operational advantages are the same as those of the above-described embodiments.

When three or more connect bushes linking the two lower links 4 and 5 are used, the connect bushes define an elastic center. The rigidity of a connect bush disposed closer to the wheel 1 than the elastic center has the same anisotropic property as that of the wheel-side connect bush 20, whereas the rigidity of a connect bush disposed closer to the vehicle body than the elastic center has the same anisotropic property as that of the vehicle-body side connect bush 21.

The rigidity of the vehicle-body side connect bush 21 is also anisotropic, but the vehicle-body side connect bush 21 need not be provided with hollows.

Even when the vehicle-body side connected bush 21 does not include hollows, the vertical rigidity of the wheel-side connect bush 20 is relatively lower than the vertical rigidity of the vehicle-body side connect bush 21.

Therefore, when an upward force acts upon the rear lower link side of the projecting portion 4b as a result of a wind-up direction moment, the wheel side of the end portion side of the projecting portion 4b is displaced upward by a larger amount than the vehicle-body side, resulting in a force that pulls inward in the vehicle-width direction at the wheel-side connect bush 21. Accordingly, the rotational-direction moment M2 acts upon the projecting portion 4b as illustrated in the top view of FIG. 9 so that the movement of a wheel-side mounting point P2 of the link body 4a towards the back in the vehicle forward-backward direction is increased. As a result, steering in a toe-in direction is increased, thereby making it possible to increase vehicle stability during braking.

Figure 10:
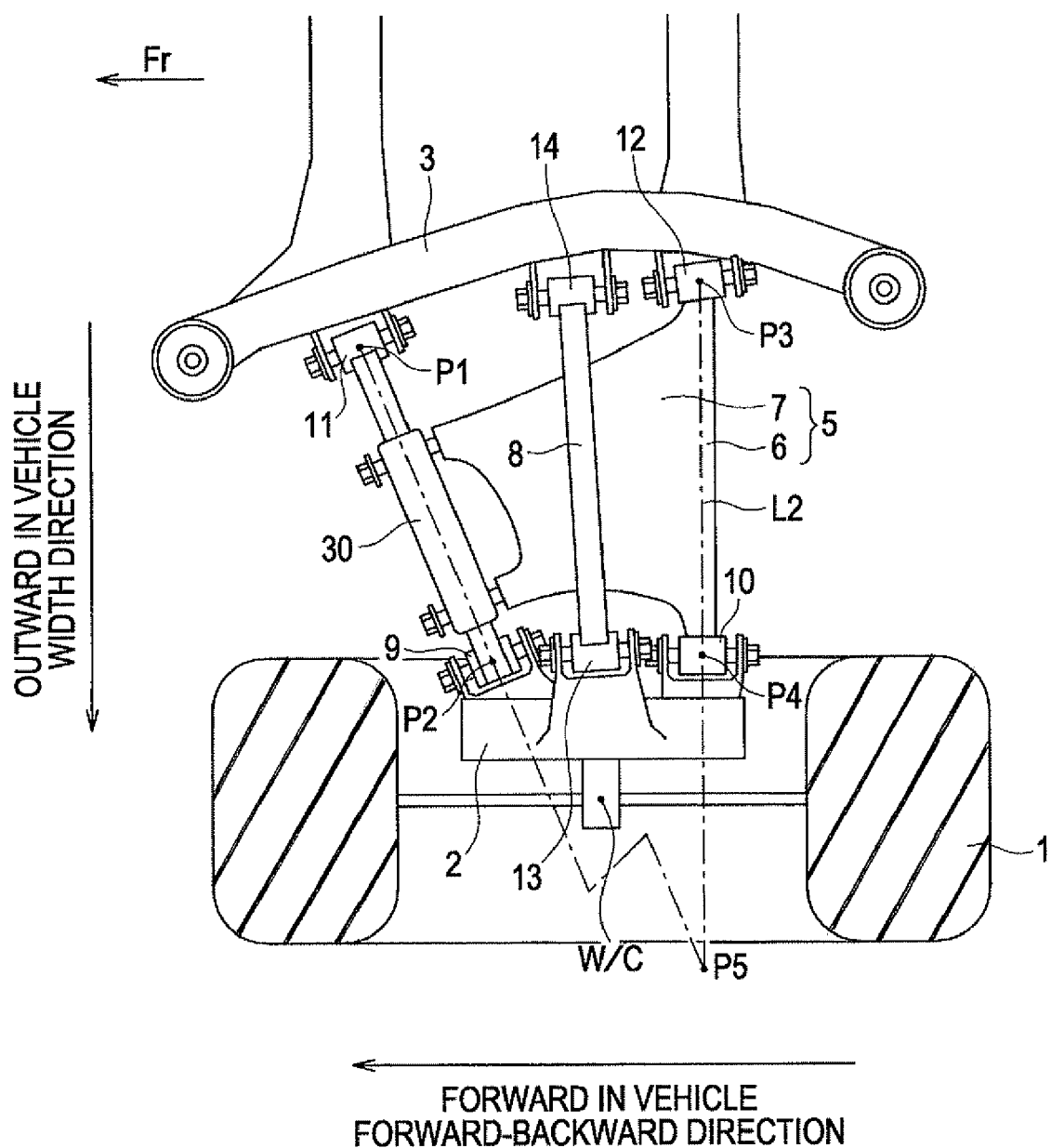
FIG. 10 is a top view illustrating a disposition of an exemplary elastic-member bush.
Figure 11:
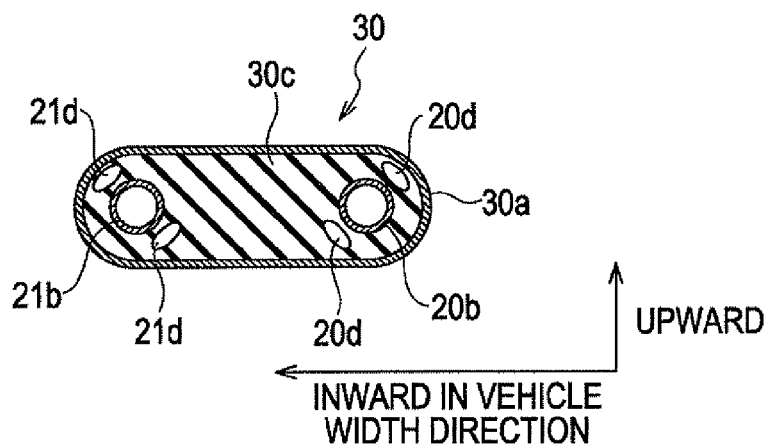
FIG. 11 is a sectional view of an example of an elastic-member bush according to FIG. 10.

Although the connect bushes 20 and 21 in the first through fifth embodiments are described as independent elastic-member bushes, the invention is not limited thereto. For example, as shown in FIGS. 10 and 11, the two connect bushes 20 and 21 may be formed by one elastic-member bush 30. The elastic-member bush 30 comprises an elliptical outer cylinder 30a surrounding the outer peripheries of two inner cylinders 20b and 21b, which are offset in the vehicle width direction. An elastic member 30c is interposed between the outer cylinder 30a and the two inner cylinders 20b and 21b, and hollows 20d are provided at the outer periphery of the inner cylinder 20b and at the outer periphery of the inner cylinder 21b. FIG. 11 shows a case in which the hollows are provided at the same positions as those in the fifth embodiment.

In this different form, one elastic-member bush 30 is used.

A sixth embodiment is initially described with reference to the suspension device of FIGS. 1 and 2.

An elastic center G1 is defined by the vehicle-body side mounting bush 12 and the wheel-side mounting bush 10 of the link body 6 of the rear lower link 5, and a reference line H is an imaginary straight line passing through the elastic center G1 and perpendicular to a rotational axial line L of a wheel 1 (i.e., the axis of the axle 2) in the top view as illustrated in FIG. 1.

In addition, a distance from the outer bush 20 to the reference line H and a distance from the inner bush 21 to the reference line H are equal to each other. That is, in top view, a center P7 between a center point P5 of the outer bush 20 and a center point P6 of the inner bush 21 is set so as to intersect the reference line H.

A vertical rigidity of the inner bush 21 is set greater than a vertical rigidity of the outer bush 20.

Figure 12:
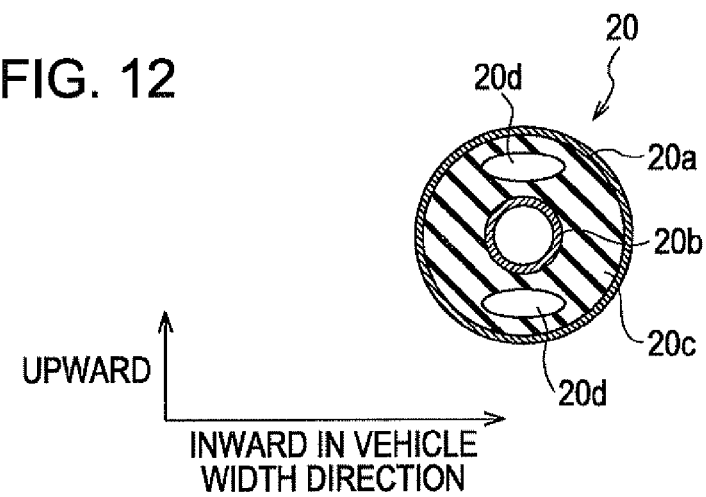
FIG. 12 is a vertical sectional view illustrating an outer bush according to a sixth embodiment.
Figure 13:
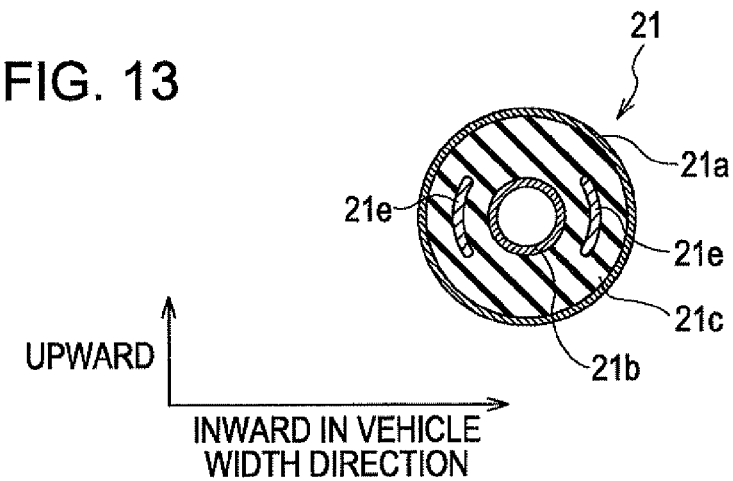
FIG. 13 is a vertical sectional view illustrating an inner bush according to a sixth embodiment.

For example, as shown in FIG. 12, hollows 20d are formed in an elastic member 20c in the outer bush 20 so as to be situated above and below an inner cylinder 20b, thereby relatively reducing the vertical rigidity of the outer bush 20. Alternatively, as shown in FIG. 13, intermediate plates 21e having a higher rigidity than an elastic member 21c are interposed in the elastic member 21c in the inner bush 21 so as to be situated above and below an inner cylinder 21b, thereby relatively increasing the vertical rigidity of the inner bush 21. Still alternatively, both of the structures shown in FIGS. 12 and 13 may be used. Structural features that relatively set the vertical rigidity of the inner bush 21 higher than the vertical rigidity of the outer bush 20 are not limited to the above. Other features, such as using a material having a relatively higher rigidity for the elastic member 21c of the inner bush 21 compared to the material used for the elastic member 20c of the outer bush 20, may be used to achieve the rigidity difference.

When the inner bush 21 has a higher vertical rigidity than the outer bush 20, an elastic center G2 defined by the two connect bushes 20 and 21 with respect to vertical forces is positioned closer to the inner bush 21 than the center P7 between the two connect bushes 20 and 21. The elastic center G2 is positioned further towards the inner side in the vehicle width direction than the reference line H.

The rigidity of the mounting bushes 9 to 12 are set higher than the rigidity of the two connect bushes 20 and 21.

Here, the axle 2 constitutes a wheel supporting member, the suspension member 3 constitutes a vehicle-body side member, the link body 6 constitutes a first link, and the front lower link 4 constitutes a second link. The elastic members of the connect bushes constitute elastic linking portions.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

The two lower links 4 and 5 are linked to each other, but can only swing within a predetermined swinging range because the connect bushes 20 and 21 prevent swinging beyond the predetermined swinging range in the vehicle width direction with respect to an input to the wheel 1 in the vehicle forward-backward direction.

The elastic members 20c and 21c of the respective connect bushes 20 and 21 flex with respect to the input to the wheel 1 in the forward-backward direction (forward-backward input to the wheel center W/C) due to an irregular road surface (such as due to traveling over a protrusion), so that, as shown in FIG. 4, the inner cylinders 20b and 21b of the connect bushes 20 and 21 are swung and displaced in the vehicle width direction while being swung slightly in the vehicle forward-backward direction relative to the outer cylinders 20a and 21a. This causes the substantially trapezoidal shape in which the four points (that is, the wheel-side mounting points P2 and P4 of the respective two lower links 4 and 5 and the vehicle-body side mounting points P1 and P3 of the respective two lower links 4 and 5) are connected to be changed as seen in the top view, so that the rigidity in the vehicle forward-backward direction of the axle 2 supported at the two linked lower links 4 and 5 is set low. Therefore, shock when moving over a protrusion is reduced, thereby improving ride quality. In FIG. 4, the behavior is illustrated in an exaggerated manner for explanatory purposes.

When the elastic members 20c and 21c flex by an amount greater than or equal to a predetermined amount, the connect bushes 20 and 21 cannot swing any further. Therefore, even if a different member is not provided, the connect bushes 20 and 21 are prevented from swinging more than necessary.

In addition, the connect bushes 20 and 21 flex with respect to a forward-backward direction input to absorb the input, thereby resulting in damping due to the characteristics of the rubber making up the connect bushes 20 and 21. Therefore, vibration with respect to the input in the forward-backward direction subsides properly. Further, even if the lower links 4 and 5 are designed so as to satisfy strength requirements, the rigidity in the forward-backward direction is determined by the rigidity of the connect bushes 20 and 21, so that the degree of design freedom can be increased.

Also, the rigidity with respect to the input in the forward-backward direction can be set low as a result of the connect bushes 20 and 21 flexing with respect to the forward-backward direction input to the wheel 1, even though the two lower links 4 and 5 are connected to each other and receive the forward-backward direction input to the wheel 1, thereby reducing shock resulting from an irregular road surface. Thus, the rigidity of the mounting bushes 9 to 12 need not be set low. That is, the rigidity of the mounting bushes 9 to 12 of the lower links 4 and 5 can be set high. Therefore, horizontal rigidity (that is, rigidity in the vehicle width direction) of the axle 2 can be made high as a result of setting the rigidity of the mounting bushes 9 to 12 of the lower links 4 and 5 high. This results in increasing the rigidity of a camber, so that steering stability can be increased. Since the horizontal input to the wheel 1 is applied to the two lower links 4 and 5 in substantially the directions of the link axial lines L1 and L2, even if the rigidity of the connect bushes 20 and 21 is set low, the horizontal rigidity of the axle 2 is not set low. As a result, the rigidity in the forward-backward direction can be set low and the horizontal rigidity can be set high, so that the ride quality can be improved and the steering stability can be increased.

In top view, the intersection P5 of the link axial lines L1 and L2 of the respective two lower links 4 and 5 is positioned behind the center of the wheel 1 (wheel center W/C) in the vehicle forward-backward direction so that the rotational center of the axle 2 is positioned behind the wheel center W/C. Therefore, with respect to an input in a tire horizontal direction (i.e., the vehicle width direction) when the vehicle is turning, a torque that causes the turning outer wheel 1 to be oriented in a toe-in direction acts so that the stability during the turning of the vehicle is increased.

Since the intersection P5 of the link axial lines L1 and L2 of the respective two linked lower links 4 and 5 is set outward of the axle 2 in the vehicle width direction, that is, since in the vehicle forward-backward direction, the span between the wheel-side mounting points P2 and P4 is set narrower than the span between the vehicle-body side mounting points P1 and P3, several advantages are provided.

First, when an input in the backward direction in the vehicle forward-backward direction is made to the ground-contact face of the wheel 1 due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction of the vehicle causes a change in toe to a toe-in direction, so that stability is increased during the braking.

In addition, in the embodiment shown in FIG. 1, the link axial line L2 at the rear lower link 5 is set substantially in the vehicle width direction. The link axial line L1 at the front lower link 4 is tilted towards the back in the vehicle forward-backward direction so that its wheel side is set towards the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled further towards the vehicle than the wheel-side mounting point P4 of the rear lower link 5, so that the wheels 1 change to the toe-in direction.

Further, the rigidity and positions of the connect bushes 20 and 21, which are disposed in an offset manner from each other in the vehicle width direction as mentioned above, result in the following operational advantages being further provided for the input to the ground-contact face of the wheel 1 in the vehicle forward-backward direction.

When an input in the backward direction in the vehicle forward-backward direction is made to the ground-contact face of the wheel 1, due to, for example, braking, the wheel-side mounting point P2 of the front lower link 4 is swung and displaced towards the back in the vehicle forward-backward direction as shown in FIG. 4. With the links 4 and 5 in the position shown in FIG. 4, the outer bush 20 is relatively disposed behind the inner bush 21 in the vehicle forward-backward direction, that is, the outer-bush side of a straight line connecting the center P6 of the inner bush 21 and the center P5 of the outer bush 20 is tilted towards the back in the vehicle forward-backward direction (in FIG. 1, in top view, the line connected center P6 to center P5 coincides with the link axial line L1 of the front lower link 4). Therefore, when the wheel-side mounting point P2 is swung and displaced towards the back in the vehicle forward-backward direction, the outer-bush side of the projecting portion 7 is pulled inward in the vehicle width direction.

When a braking force in the vehicle forward-backward direction is input to the ground-contact face of each wheel 1 due to, for example, a braking operation, a moment in a wind-up direction is generated as illustrated in FIG. 5 from the vehicle-width direction. This moment causes an upward force to act upon the link body 6 of the rear lower link 5 linked to the axle 2 and a downward force to act upon the front lower link 4 so that vertical forces are also input to the connect bushes 20 and 21 linking both the lower links 4 and 5. In addition, focusing attention upon the rear lower link 5, the center of gravity of the rear lower link 5 is positioned between the link body 6 and an end portion side of the projecting portion 7 adjacent the connect bushes 20 and 21. Therefore, an input in the wind-up direction results in an upward force that acts upon the link body 6 and a downward force that acts upon the end portion side of the projecting portion 7. Thus, the downward force acts on two connect bushes 20 and 21.

When the vertical rigidities of the two connect bushes 20 and 21 and the positions of the two connect bushes 20 and 21 in the vehicle width direction with respect to the reference line H are adjusted as described, an axis passing through the two elastic centers G1 and G2 in top view becomes an elastic principal axis R of the rear lower link 5 with respect to vertical swinging. The elastic principal axis R is tilted in the vehicle width direction with respect to the reference line H, which is orthogonal to a rotational axial line L of the wheel 1, so that the front side of the elastic principal axis R is disposed further inward in the vehicle width direction than the back side of the axis R. Therefore, the wind-up moment causes an upward force to act upon the link body 6 and a downward force to act upon the front lower link side of the projecting portion 7, causing the rear lower link 5 to rotate vertically around the elastic principal axis R or around the vicinity of the axis R. The inner bush 21 side is thus pulled inward in the vehicle width direction by the projection portion 7 while being displaced downward. Due to such displacement behavior, a rotational-direction moment, which is indicated in the top view by an arrow M in FIG. 4, acts upon the rear lower link 5. This moment causes a force in a direction towards the front in the vehicle forward-backward direction to act upon the wheel-side mounting point P4 of the rear lower link 5 with the vehicle-body side mounting point P3 as a pivot. Accordingly, the wind-up direction moment reduces the swinging amount of the wheel-side mounting point P4 of the rear lower link 5 towards the back in the vehicle forward-backward direction. Therefore, steering in a toe-in direction is increased, thereby making it possible to increase vehicle stability during braking.

The vertical rigidity of the wheel-side elastic-member bush 10 of the rear lower link 5 and the vertical rigidity of the vehicle-body side elastic-member bush 12 of the rear lower link 5 are the same or substantially the same. A geometric center defined by both of the elastic-member bushes 10 and 12 corresponds to the elastic center G1. Usually, the difference between the vertical rigidity of the wheel-side elastic-member bush 10 and that of the vehicle-body side elastic-member bush 12 is assumed to be small.

The center P7 of the two connect bushes 20 and 21 is positioned on the reference line H in the top view, but the invention is not limited thereto. For example, the distance from the inner bush 21 to the reference line H may be set greater than the distance from the outer bush 20 to the reference line H. In this case, toe-in in response to, for example, braking is increased to a greater extent when the elastic center G2 defined by the two connect bushes 20 and 21 with respect to the vertical input is disposed further inward in the vehicle width direction, that is, when the elastic principal axis R is tilted so that its front side in the vehicle forward-backward direction is disposed further inward in the vehicle width direction than its back side.

When the distance from the inner bush 21 to the reference line H is greater than the distance from the outer bush 20 to the reference line H, the vertical rigidity of the inner bush 21 and the vertical rigidity of the outer bush 20 may be the same. Even if the vertical rigidities are the same, the elastic center G2 is still positioned further towards the inner side in the vehicle width direction than the reference line H.

When the distance from the outer bush 20 to the reference line H is set greater than the distance from the inner bush 21 to the reference line H, the elastic center G2 is set to be positioned further towards the inner side in the vehicle width direction than the reference line H, and the vertical rigidity of the inner bush 21 is set to be relatively greater than the vertical rigidity of the outer bush 20.

In addition, the center P7 between the two connect bushes 20 and 21 may be set on the reference line H in top view, and the vertical rigidity of the inner bush 21 and that of the outer bush 20 may be the same. Since the outer bush 20 is disposed behind the inner bush 21 in the vehicle forward-backward direction, the above-described operational advantages can still be achieved.

Although the centers P5 and P6 of the respective two connect bushes 20 and 21 are both set on the link axial line L1 of the front lower link 4 in the top view in the previously described embodiments, the invention is not limited thereto. For example, the center P6 of the inner bush 21 may be disposed more towards the front in the vehicle forward-backward direction than the link axial line L1, and the center P5 of the outer bush 20 may be disposed more towards the front in the vehicle forward-backward direction than the link axial line L1. As a result, when the front lower link 4 swings towards the back in the vehicle forward-backward direction, the outer bush 20 side of the projecting portion 7 can be pulled inward in the vehicle width direction by a large amount.

Although the upper link 8 comprises one rod link in the described embodiments, it may comprise two or more rod links, or may be one having a different form, such as an A arm.

Also, although the link axial line L2 of the rear lower link 5 is disposed in the vehicle width direction and the link axial line L1 of the front lower link 4 is tilted towards the back in the vehicle forward-backward direction to set the intersection P5 of the link axial lines L1 and L2 of the respective two lower links 4 and 5 further outward than the axle 2 in the vehicle width direction, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point 4 is disposed more towards the front in the vehicle forward-backward direction than the vehicle-body side mounting point P3. The intersection P5 of the link axial lines L1 and L2 of the respective two lower links 4 and 5 is still further outward than the axle 2 in the vehicle width direction. Setting the intersection P5 of the link axial lines L1 and L2 can also be achieved if the center of the inner bush 21 is disposed further towards the front in the vehicle forward-backward direction than the link axial line L1 and the center of the rear bush is disposed more towards the front in the vehicle forward-backward direction than the link axial line L1.

While the axes of the connect bushes 20 and 21 are disposed so as to be oriented substantially in the vehicle forward-backward direction, the invention is not limited thereto. The axes of the connect bushes 20 and 21 may be disposed, for example, in the vehicle width direction or along the link axial lines L1 and L2.

Further, the two connect bushes 20 and 21 need not be disposed on the link axial line L1 in top view.

The number of connect bushes linking the two lower links 4 and 5 to each other is not limited to two, so that three or more bushes may be used.

Further, the span in the vehicle forward-backward direction between the mounting points P1 and P3 may be equal to the span between the mounting points P2 and P4, that is, the two lower links 4 and 5 may be set parallel to each other.

The suspension device can be used for the rear wheels and the front wheels of a vehicle. In addition, although the lower links 4 and 5 are used as two links, the links 4 and 5 can be upper links if desired.

Figure 14:
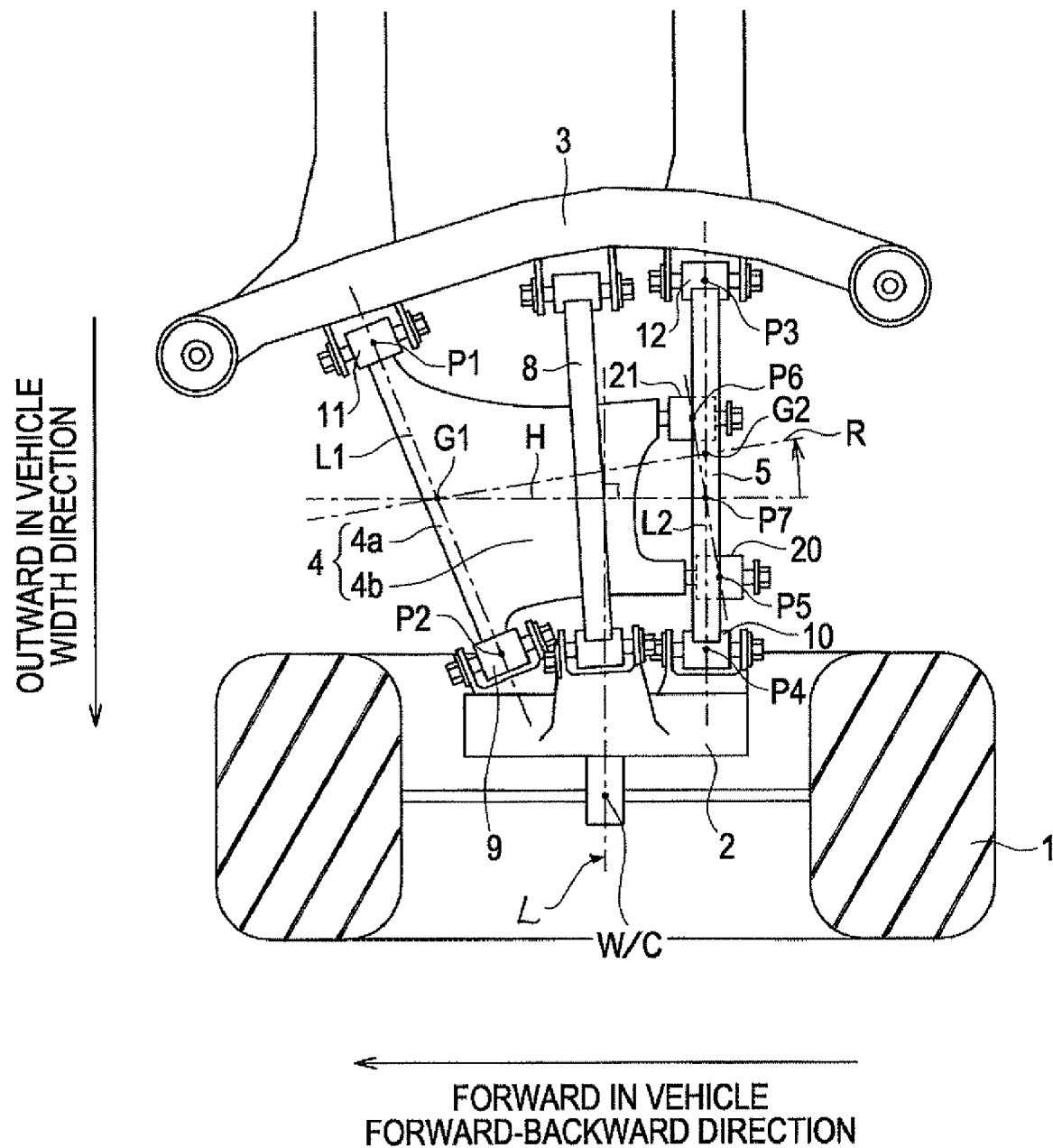
FIG. 14 is a top view illustrating a suspension device for a vehicle wheel according to a seventh embodiment.

The basic structure of the seventh embodiment as shown in FIG. 14 is similar to that of the fourth embodiment shown in FIG. 9, so the description is not repeated. The connect bushes 20 and 21 according to the sixth embodiment are used in the structure.

Even in this case, a reference line H that passes through an elastic center G1 and is perpendicular to a rotational axial line L of wheels is imagined. In addition, in top view, a distance from the outer bush 20 to the reference line H and a distance from the inner bush 21 to the reference line H are set equal to each other. That is, in top view, a center P7 between a center point P5 of the outer bush 20 and a center point P6 of the inner bush 21 is set so as to intersect the reference line H. A vertical rigidity of the inner bush 21 is set greater than a vertical rigidity of the outer bush 20.

The other structural features are similar to those of the sixth embodiment.

Here, the link body 4a constitutes the first lower link, and the rear lower link 5 constitutes the second lower link.

When an input in the backward direction in the vehicle forward-backward direction is made to a ground-contact face of the wheel 1 due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction of the vehicle causes a change in toe to a toe-in direction, so that stability is increased during the braking.

Accordingly, when a wheel-side mounting point P4 of the rear lower link 5 is swung and displaced towards the back in the vehicle forward-backward direction, the outer bush 20 is relatively disposed behind the inner bush 21 in the vehicle forward-backward direction, that is, the outer bush side of a straight line connecting the center P6 of the inner bush 21 and the center P5 of the outer bush 20 is tilted towards the back in the vehicle forward-backward direction. Therefore, the wheel-side mounting point P4 is swung and displaced towards the back in the vehicle forward-backward direction so that, in top view, the inner bush side of the projecting portion 7 is pulled inward in the vehicle width direction.

When a braking force in the vehicle forward-backward direction is input to the ground-contact face of each wheel 1 due to, for example, a braking operation, a moment in a wind-up direction is generated. This moment causes a downward force to act upon the link body 4a of the front lower link 4 linked to the axle 2 and an upward force to act upon the rear lower link 5 so that vertical forces are also input to the connect bushes 20 and 21 linking both the lower links 4 and 5. In addition, focusing attention upon the front lower link 4, the center of gravity of the front lower link 4 is positioned between the link body 4a and an end of the projecting portion mounted to the connect bushes 20 and 21 (hereinafter referred to as "the end portion side of the projecting portion 4b"). Therefore, when a downward force acts upon the link body 4a by an input in the wind-up direction, an upward force acts upon the end portion side of the projecting portion 4b.

Figure 15:
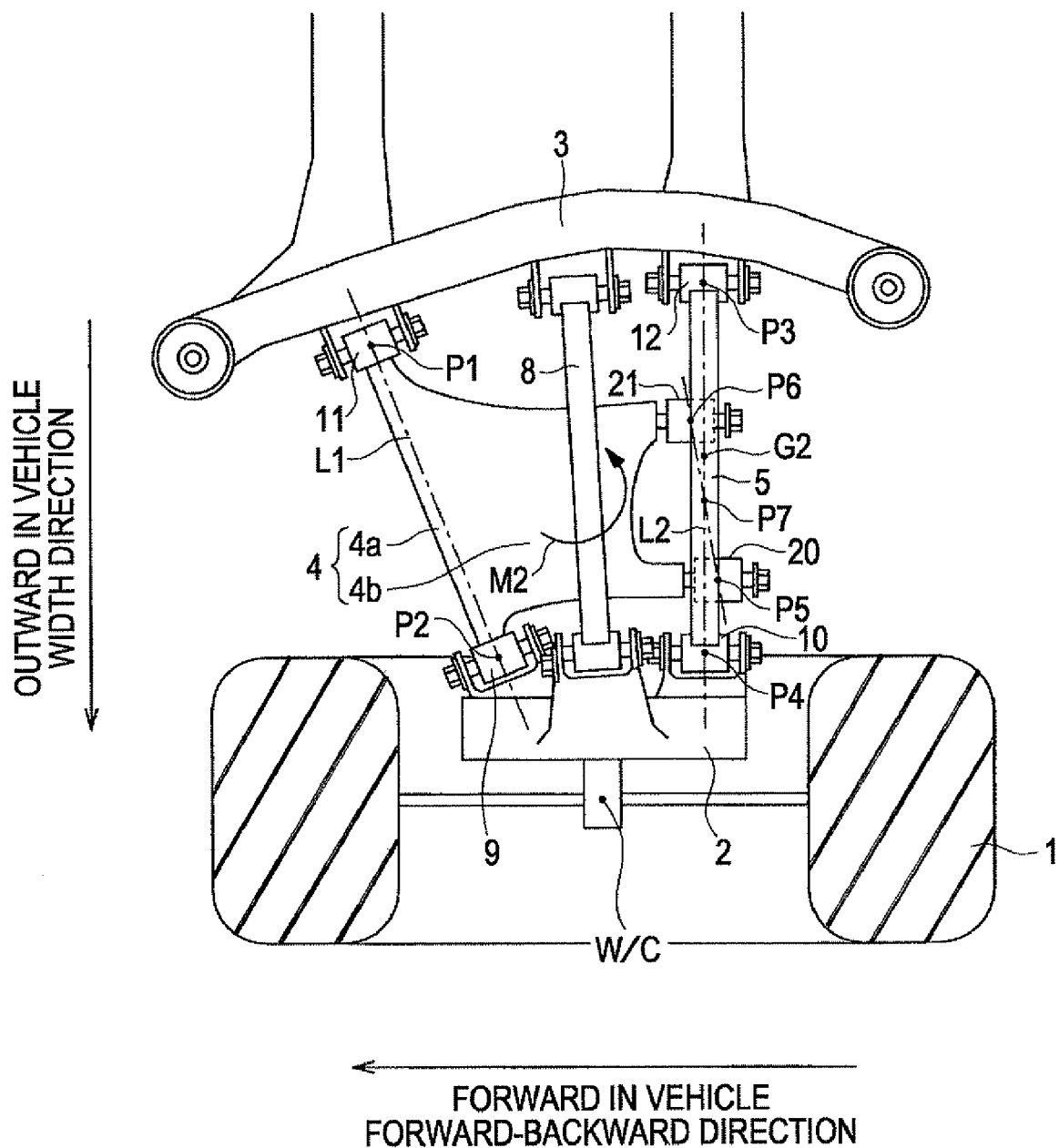
FIG. 15 is a top view for illustrating the suspension device for a vehicle wheel according to the seventh embodiment.

When the vertical rigidities of the two connect bushes 20 and 21 and the positions of the two connect bushes 20 and 21 in the vehicle width direction with respect to the reference line H are adjusted as described, an axis passing through the two elastic centers G1 and G2 in the top view becomes an elastic principal axis R of the front lower link 4 with respect to vertical swinging. The elastic principal axis R is tilted in the vehicle width direction with respect to the reference line H, which is orthogonal to a rotational axial line L of the wheel 1, so that the back side of the axis R in the vehicle width direction is disposed at the inner side in the vehicle width direction relative to the front side of the axis R. Therefore, the moment in the wind-up direction causes a downward force to act upon the link body 4a and an upward force to act upon the rear lower link side of the projecting portion 4b, which causes the front lower link 4 to rotate vertically around the elastic principal axis R or around the vicinity of the axis R. The inner bush 21 side thus is pulled inward in the vehicle width direction by the projecting portion 4b while being displaced upward. Due to such displacement behavior, a rotational-direction moment indicated in the top view by an arrow M2 in FIG. 15 acts upon the front lower link 4. This moment M2 causes a force towards the back in the vehicle forward-backward direction to act upon the wheel-side mounting point P2 of the front lower link 4 with the vehicle-body side mounting point P1, which acts as a pivot. Accordingly, the swinging amount towards the back in the vehicle forward-backward direction of the wheel-side mounting point P2 of the front lower link 4 is increased by the wind-up moment. Therefore, steering in a toe-in direction is increased, thereby making it possible to increase vehicle stability during braking.

Additional operational advantages are similar to those of the sixth embodiment.

Figure 16:
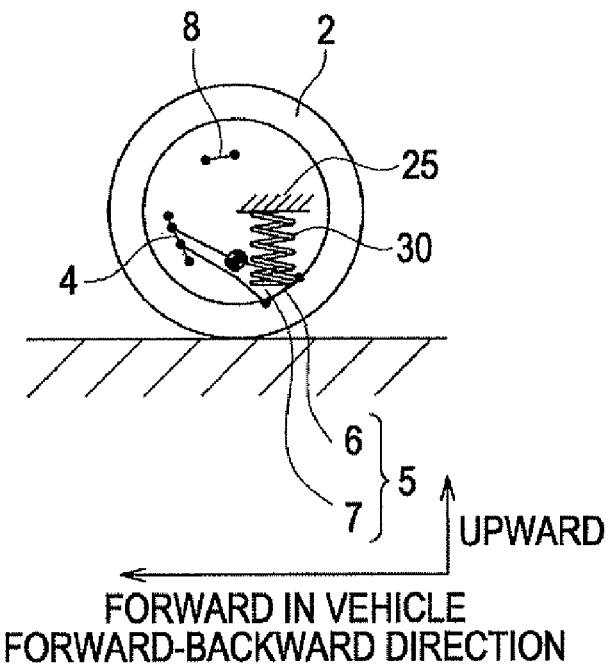
FIG. 16 illustrates, as seen from a vehicle width direction, an exemplary disposition of a suspension spring according to an eighth embodiment.
Figure 17:
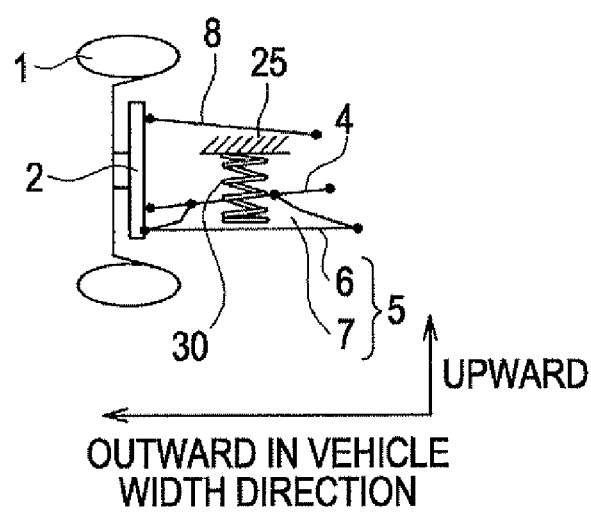
FIG. 17 illustrates, as seen from the front side of the vehicle, an exemplary disposition of the suspension spring according to the eighth embodiment.

An eighth embodiment is described initially with reference to FIGS. 1, 16 and 17. FIG. 1 is a top view of a suspension device for rear wheels according to an embodiment of the suspension device, and portions of the embodiment shown therein and previously described are not repeated. FIG. 16 is a schematic view illustrating a disposition of links as seen from the front side of a vehicle.

As shown schematically in FIGS. 16 and 17, a lower portion of a suspension spring 30 is mounted to the projecting portion 7. The suspension spring 30 is such that its axis is disposed vertically and such that its top end is mounted to a vehicle-body side member 25.

Here, the axle 2 constitutes a wheel supporting member, the suspension member 3 constitutes the vehicle-body side member, and the connect bushes 20 and 21 constitute linking portions that elastically link the two links to each other. In addition, the suspension spring 30 performs the function of changing a displacement amount, and a mounting point of the suspension spring 30 to the projecting portion 7 is an input point.

As with other embodiments, linking the two lower links 4 and 5 elastically to each other makes it possible for an input to the wheel 1 in the vehicle forward-backward direction to be received by the two lower links 4 and 5. Therefore, it is not necessary to provide a different link for receiving the input in the vehicle forward-backward direction.

The two lower links 4 and 5 are linked to each other, but can only swing within a predetermined range because the connect bushes 20 and 21 prevent swinging beyond the predetermined swinging range in the vehicle width direction with respect to an input to the wheel 1 in the vehicle forward-backward direction.

The elastic members of the connect bushes 20 and 21 (linking portions) flex with respect to the input to the wheel 1 in the forward-backward direction (forward-backward input to the wheel center W/C) due to an irregular road surface. That is, as shown in FIG. 4, the inner cylinders of the connect bushes 20 and 21 are swung and displaced in the vehicle width direction while being swung slightly in the vehicle forward-backward direction relative to the outer cylinders of the connect bushes 20 and 21. This causes the substantially trapezoidal shape in which the four points (that is, the wheel-side mounting points P2 and P4 of the respective two lower links 4 and 5 and the vehicle-body side mounting points P1 and P3 of the respective two lower links 4 and 5) are connected to be changed as seen in top view, so that the rigidity in the vehicle forward-backward direction of the axle 2 supported at the two linked lower links 4 and 5 is set low. Therefore, shock when moving over a protrusion is reduced, thereby improving ride quality.

When the elastic members 20c and 21c flex by an amount greater than or equal to a predetermined amount, the connect bushes 20 and 21 cannot swing any further. Therefore, even if a different member is not provided, the connect bushes 20 and 21 are prevented from swinging more than necessary.

In addition, the connect bushes 20 and 21 flex with respect to a forward-backward direction input to absorb the input, thereby resulting in damping due to the characteristics of the rubber making up the connect bushes 20 and 21. Therefore, vibration with respect to the input in the forward-backward direction subsides properly. Further, even if the lower links 4 and 5 are designed so as to satisfy strength requirements, the rigidity in the forward-backward direction is determined by the rigidity of the connect bushes 20 and 21, so that the degree of design freedom can be increased.

Also, the rigidity with respect to the input in the forward-backward direction can be set low as a result of the connect bushes 20 and 21 flexing with respect to the forward-backward direction input to the wheel 1, even though the two lower links 4 and 5 are connected to each other and receive the forward-backward direction input to the wheel 1, thereby reducing shock resulting from an irregular road surface. Therefore, the rigidity of the mounting bushes 9 to 12 need not be set low. That is, the rigidity of the mounting bushes 9 to 12 of the lower links 4 and 5 can set high. Therefore, horizontal rigidity (that is, rigidity in the vehicle width direction) of the axle 2 can be made high as a result of setting the rigidity of the mounting bushes 9 to 12 of the lower links 4 and 5 high. This results in increasing the rigidity of a camber, so that steering stability can be increased. Since the horizontal input to the wheel 1 is applied to the two lower links 4 and 5 in substantially the directions of the link axial lines L1 and L2, even if the rigidity of the connect bushes 20 and 21 is set low, the horizontal rigidity of the axle 2 is not set low. As a result, the rigidity in the forward-backward direction can be set low and the horizontal rigidity can be set high, so that the ride quality can be improved and the steering stability can be increased.

In top view, the intersection P5 of the link axial lines L1 and L2 of the respective two linked lower links 4 and 5 is positioned further outward than the axle 2 in the vehicle width direction. That is, the span between the wheel-side mounting points P2 and P4 is set narrower than the span between the vehicle-body side mounting points P1 and P3 in the vehicle forward-backward direction. As a result, several operational advantages are provided.

First, when an input in the backward direction in the vehicle forward-backward direction is made to the wheel 1, due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction of the vehicle causes a change in toe to a toe-in direction, so that stability is increased during the braking.

Further, in the embodiment shown in FIG. 1, the link axial line L2 at the rear lower link 5 is set substantially in the vehicle width direction. The link axial line L1 at the front lower link 4 is tilted towards the back in the vehicle forward-backward direction so that its wheel-side is set towards the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled further towards the vehicle than the wheel-side mounting point P4 of the rear lower link 5, so that the wheels 1 change to a toe-in direction.

In top view, the intersection P5 of the link axial lines L1 and L2 of the respective two lower links 4 and 5 is positioned behind the center of the wheel 1 (wheel center W/C) in the vehicle forward-backward direction so that the rotational center of the axle 2 is positioned behind the wheel center W/C. Therefore, with respect to an input in a tire horizontal direction when the vehicle is turning, a torque that causes the turning outer wheel 1 to be oriented in a toe-in direction acts so that the stability during the turning of the vehicle is increased.

Toe adjustment is thus performed on the basis of the disposition of the links 4 and 5. In addition, the setting position of the suspension spring 30 with respect to the projecting portion 7 can be changed separately from the disposition of the links 4 and 5 to perform toe adjustment. As a result, the toe can be further optimized.

More specifically, when a wheel 1 bounds, as frequently occurs when the wheel 1 is on a vehicle that is turning, the suspension spring 30 is compressed, thereby generating a reaction force in an expansion direction. As a result, a downward reaction force in a vertical direction is input by the suspension spring 30 to the input point at the projecting portion 7 in correspondence with a deformation amount of the suspension spring 30.

In contrast, when the wheel 1 rebounds, the suspension spring 30 expands, thereby generating a reaction force in a compression direction. As a result, an upward reaction force in a vertical direction that is in correspondence with a deformation amount of the suspension spring 30 is input to the input point at the projecting portion 7 from the suspension spring 30.

When a vertical reaction force is applied to the projecting portion 7 of the rear lower link 5 due to bounding/rebounding of the wheel 1, a vertical stroke displacement amount of the rear lower link 5 changes. In addition, the reaction force input to the projecting portion 7 is transmitted as a vertical force to the forward lower link 4 through the connect bushes 20 and 21, thereby changing a vertical stroke displacement amount of the front lower link 4 as well.

The amount of displacement of the front lower link 4 and the amount of displacement of the rear lower link 5 differ. Therefore, a change in the toe occurs in accordance with the difference between the amount by which a wheel-side end of the front lower link 4 is pulled inward in the vehicle width direction and the amount by which a wheel-side end of the rear lower link 5 is pulled inward in the vehicle width direction due to bounding/rebounding of the wheel 1. In addition, if the amount by which the front lower link 4 is pulled inward is set larger than the amount by which the rear lower link 5 is pulled inward, the change in toe in a toe-in direction is increased. In contrast, if the amount by which the rear lower link 5 is pulled inward is set larger than the amount by which the front lower link 4 is pulled inward, the change in toe in a toe-out direction is increased.

Several advantages can be obtained by specifying the position of a mounting point 30a (also called input point 30a) of the suspension spring 30.

Figure 18A:
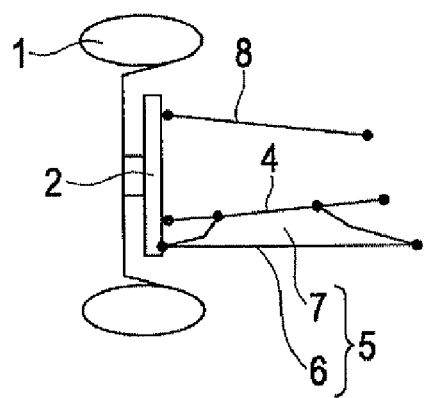
FIGS. 18A and 18B are side views illustrating a stroke path of the suspension.
Figure 18B:
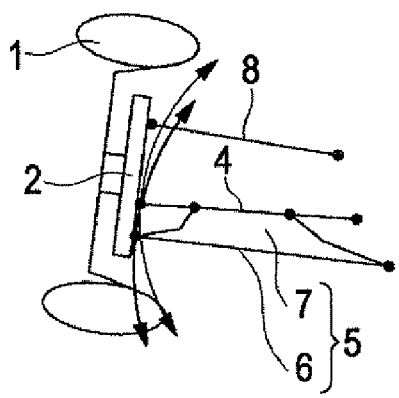

As shown in FIG. 18, if the link axial lines L1 and L2 of the two lower links 4 and 5 are disposed horizontally or substantially horizontally at a neutral position of the vehicle as viewed from a rear of the vehicle, the wheel-side mounting points P2 and P4 of the respective lower links 4 and 5 are provided at a stroke path so as to be pulled inward in the vehicle width direction as the vehicle stroke causing the lower links 4 and 5 to bound or rebound progresses. However, the invention is not limited to such a stroke path.

Figure 19:
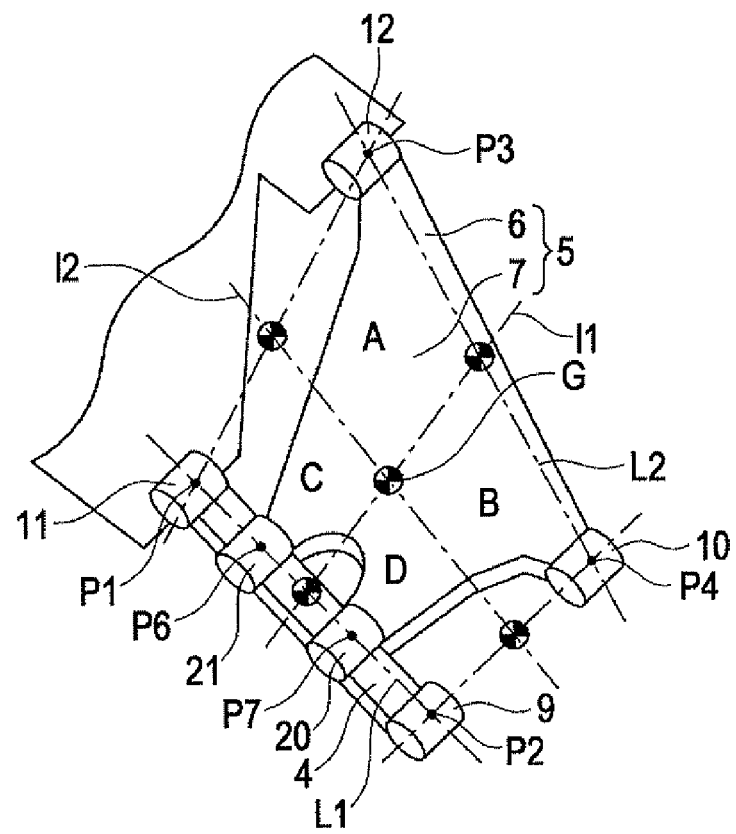
FIG. 19 is a perspective view illustrating areas of a projecting portion.

The rear lower link 5 includes the projecting portion 7 and is elastically supported by four bushes, specifically, the wheel-side mounting bush 10 and the vehicle-body side mounting bush 12 and the two connect bushes 20 and 21. As shown in FIG. 19, an elastic center G in top view of the rear lower link 5 is specified on the basis of the four bushes 10, 12, 20 and 21. Depending upon a setting position of a reaction-force input point from the suspension spring 30 with respect to the elastic center G (that is, a mounting point of a lower portion of the suspension spring 30), the amounts of displacement of the rear lower link 5 at the positions of the four bushes 10, 12, 20 and 21 differ from each other due to the reaction forces of the suspension spring 30.

The amounts of displacement differ because a reaction force R2 from the suspension spring 30 causes the rear lower link 5, which includes the projecting portion 7, to be rotationally displaced around an elastic principal axis I1 extending in the vehicle forward-backward direction and passing through the elastic center G and to be rotationally displaced around an elastic principal axis I2 extending in the vehicle width direction and passing through the elastic center G. The axis extending in the vehicle forward-backward direction and passing through the elastic center G is hereinafter called the "forward-backward-direction rotational axis I1," and the axis extending in the vehicle width direction and passing through the elastic center G is hereinafter called the "vehicle-width-direction rotational axis I2."

When the vertical rigidities of the four bushes 10, 12, 20 and 21 are substantially the same, the forward-backward-direction rotational axis I1 becomes a straight line passing through a center point between the two connect bushes 20 and 21 and a center point between the mounting bushes 10 and 12 in the top view, and the vehicle-width-direction rotational axis I2 becomes a straight line passing through a center point between the vehicle-body side connect bush 21 and the vehicle-body side mounting bush 12 and a center point between the wheel-side connect bush 20 and the wheel-side mounting bush 10 in the top view.

Several advantages are achieved by such a displacement amount changing device by setting the position of the mounting point 30a of the lower portion of the suspension spring 30 on the projecting portion 7 in one of four areas A to D divided by the two rotational axes I1 and I2 in top view.

In a first example, the mounting point 30a of the lower portion of the suspension spring 30 is disposed towards the back in the vehicle forward-backward direction and towards the outer side in the vehicle width direction with respect to the elastic center G. That is, the mounting point 30a is disposed behind the rotational axis I2 in the vehicle forward-backward direction and more towards the outer side than the rotational axis I1 in the vehicle width direction as illustrated by area B in FIG. 19.

When a wheel 1 bounds, the downward reaction force R2 of the suspension spring 30 is input to the reaction-force input point 30a at the projecting portion 7. The force R2 causes the projecting portion 7 to be rotationally displaced around the rotational axis I1 so that its wheel side is displaced downward and to be rotationally displaced around the rotational axis I2 so that its back side in the vehicle forward-backward direction is displaced downward.

Figure 20:
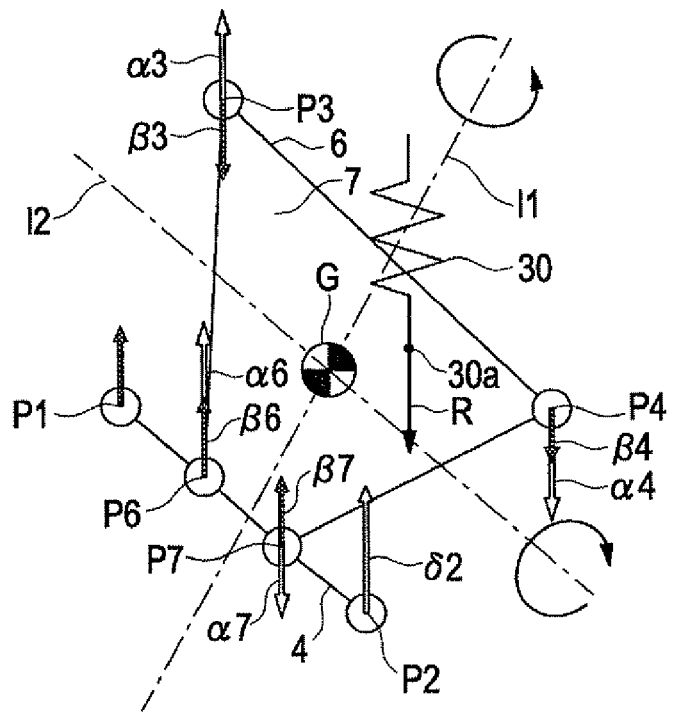
FIG. 20 illustrates an operation when a suspension spring is mounted to an area B.

Accordingly, as shown in FIG. 20, when the projecting portion 7 is displaced around the rotational axis I1, a downward displacement α4 is generated with respect to the wheel-side mounting point P4 of the rear lower link 5, and an upward displacement α3 is generated with respect to the vehicle-body side mounting point P3. In addition, a downward displacement α7 is generated at a mounting point P7 of the wheel-side connect bush 20, and an upward displacement α6 is generated at a mounting point P6 of the vehicle-body side connect bush 21.

When the projecting portion 7 is displaced around the rotational axis I2, upward displacements β6 and β7 are generated at the respective mounting points P6 and P7 of the two connect bushes 20 and 21. In addition, downward displacements β4 and β3 are generated at each of the wheel-side mounting point P4 and the vehicle-body side mounting point P3 of the rear lower link 5.

A resultant displacement in which the displacements around the two rotational axes I1 and I2 are combined is generated separately at each of the four mounting points P3, P4, P6 and P7.

For example, at the wheel-side mounting point P4 of the rear lower link 5, the displacements α4 and β4 around the two rotational axes I1 and I2 are both downward. Therefore, a downward displacement occurs at the wheel-side mounting point P4 of the rear lower link 5 due to the operation of the displacement amount changing device. This displacement reduces an upward stroke displacement amount at the wheel-side mounting point P4 of the rear lower link 5 generated by a bound stroke of the wheel 1.

At the mounting point P6 of the vehicle-body side connect bush 21, the displacements α6 and β6 around the two rotational axes I1 and I2 are both upward. Therefore, an upward force is input to the front lower link 4 through the vehicle-body side connect bush 21. In addition, at the mounting point P7 of the wheel-side connect bush 20, the displacements α7 and β7 around the two rotational axes I1 and I2 are in opposite directions. Therefore, a vertical input to the front lower link 4 from the wheel-side connect bush 20 does not exist or is small. Consequently, an input from both of the connect bushes 20 and 21 causes an upward displacement δ2 to be generated at the wheel-side mounting point P2 of the front lower link 4 by the operation of the displacement amount changing device. This displacement δ2 increases an upward stroke displacement amount at the wheel-side mounting point P2 of the front lower link 4 generated by a bounding of the wheel 1.

Accordingly, the amount of upward stroke of the front lower link 4 and the rear lower link 5 generated by a bounding of a wheel is increased at the front lower link 4 and is reduced at the rear lower link 5. In other words, the bound stroke amount at the front lower link 4 is larger than that at the rear lower link 5. As a result, when the wheel 1 bounds, the displacement amount changing device increases the amount by which the wheel-side mounting point P2 of the front lower link 4 is pulled inward in the vehicle width direction and reduces the amount by which the wheel-side mounting point P4 of the rear lower link 5 is pulled inward in the vehicle width direction. Thus, when the wheel 1 bounds, the amount of wheel 1 toe-in is increased.

As demonstrated by the above example, the suspension device increases the toe-in of a bounding wheel, such as a turning outer wheel side wheel 1.

When the wheel 1 rebounds, vertical displacements at the four mounting points P3, P4, P6 and P7 resulting from the reaction force R2 of the suspension spring 30 are vertically opposite to those that occur when the wheel 1 bounds.

That is, an upward displacement occurs at the wheel-side mounting point P4 of the rear lower link 5 by the operation of the displacement amount changing device, such as the suspension spring 30. This displacement reduces a downward stroke displacement amount at the wheel-side mounting point P4 of the rear lower link 5 generated by a rebounding of a wheel.

In addition, a downward displacement occurs at the wheel-side mounting point P2 of the front lower link 4 by the operation of the displacement amount changing device. This displacement increases a downward stroke displacement amount at the wheel-side mounting point P2 of the front lower link 4 generated by a rebounding of a wheel.

Accordingly, the amount of downward stroke of the front lower link 4 and the rear lower link 5 is increased at the front lower link 4 and reduced at the rear lower link 5. In other words, the rebound stroke amount at the front lower link 4 is larger than that at the rear lower link 5. As a result, when the wheel 1 rebounds, the displacement amount changing device increases the amount by which the wheel-side mounting point P2 of the front lower link 4 is pulled inward in the vehicle width direction and reduces the amount by which the wheel-side mounting point P4 of the rear lower link 5 is pulled inward in the vehicle width direction. Thus, when the wheel 1 rebounds, the amount of wheel 1 toe-in is increased.

As demonstrated by the above example, the suspension device increases the toe-in a rebounding wheel.

The reaction force R2 of the suspension spring 30 becomes larger as the stroke amount becomes larger. Therefore, as the suspension stroke is increased, the amount of change to the toe-in direction is increased.

In addition, the rotational displacements of the projecting portion 7 around the two rotational axes I1 and I2 become larger as the distance of the reaction-force input point 30a from each of the rotational axes I1 and I2 increases. Therefore, adjusting the position of the reaction-force input point 30a with respect to each of the rotational axes I1 and I2 makes it possible to adjust the amount of change in the toe-in direction.

The adjustment of the amount of change in toe by the displacement amount changing device, which is the suspension spring 30 in the present embodiment, can be performed separately from adjusting the rigidity of the connect bushes 20 and 21. As a result, it is possible effectively adjust toe by the operation of the displacement amount changing device while also reducing a forward-backward rigidity of the suspension device supporting the wheels by adjusting the rigidity of the connect bushes 20 and 21.

As the vertical rigidity of the connect bushes 20 and 21 is reduced, input to the front lower link 4 caused by the rotational displacement of the projecting portion 7 is reduced. As the vertical rigidity of the connect bushes 20 and 21 is increased, input to the front lower link 4 caused by the rotational displacement of the projecting portion 7 is increased. However, regardless of whether the rigidity of the connect bushes 20 and 21 is high or low, the toe-in increasing effect of the displacement amount changing device can be provided.

In a second example, the mounting point 30a of the lower portion of the suspension spring 30 is disposed towards the front in the vehicle forward-backward direction and towards the outer side in the vehicle width direction with respect to the elastic center G. That is, the mounting point 30a is disposed in front of the rotational axis I2 in the vehicle forward-backward direction and more towards the inner side than the rotational axis I1 in the vehicle width direction as illustrated by area C in FIG. 19.

When the wheel 1 bounds, the downward reaction force R2 of the suspension spring 30 is input to the reaction-force input point 30a at the projecting portion 7. The force R2 causes the projecting portion 7 to be rotationally displaced around the rotational axis I1 so that its vehicle-body side is displaced downward and to be rotationally displaced around the rotational axis I2 so that its front side in the vehicle forward-backward direction is displaced downward.

Figure 21:
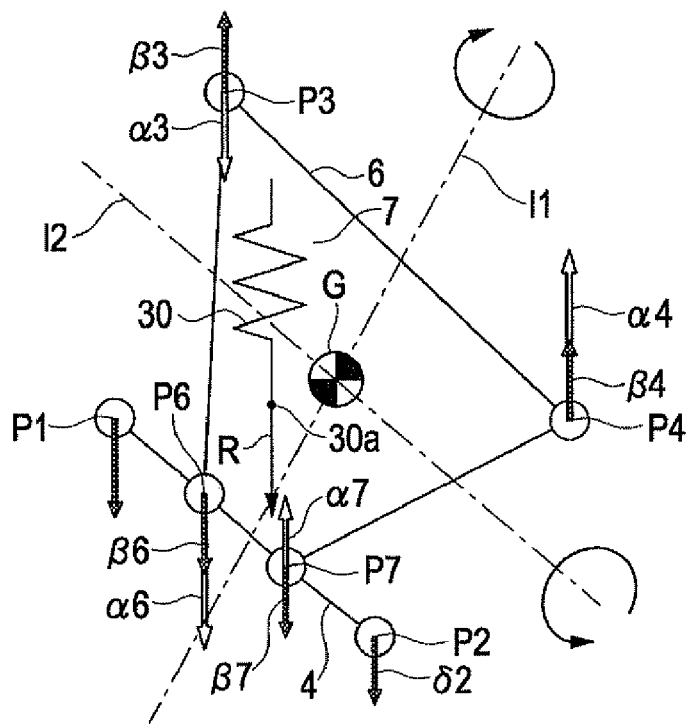
FIG. 21 illustrates an operation when a suspension spring is mounted to an area C.

Accordingly, as shown in FIG. 21, when the projecting portion 7 is displaced around the rotational axis I1, an upward displacement $\alpha 4$ is generated with respect to the wheel-side mounting point P4 of the rear lower link 5, and a downward displacement $\alpha 3$ is generated with respect to the vehicle-body side mounting point P3. In addition, an upward displacement $\alpha 7$ is generated at a mounting point P7 of the wheel-side connect bush 20, and a downward displacement $\alpha 6$ is generated at a mounting point P6 of the vehicle-body side connect bush 21.

When the projecting portion 7 is displaced around the rotational axis I2, downward displacements $\beta 6$ and $\beta 7$ are generated at the respective mounting points P6 and P7 of the two connect bushes 20 and 21. In addition, upward displacements $\beta 4$ and $\beta 3$ are generated at the wheel-side mounting point P4 and the vehicle-body side mounting point P3, respectively, of the lower link.

A resultant displacement in which the displacements around the two rotational axes I1 and I2 are combined is generated separately at each of the four mounting points P3, P4, P6 and P7.

For example, at the wheel-side mounting point P4 of the rear lower link 5, the displacements $\alpha 4$ and $\beta 4$ around the two rotational axes I1 and I2 are both upward. Therefore, an upward displacement occurs at the wheel-side mounting point P4 of the rear lower link 5 due to the operation of the displacement amount changing device. This displacement increases an upward stroke displacement amount at the wheel-side mounting point P4 of the rear lower link 5 generated by a bound stroke of the wheel 1.

At the mounting point P6 of the vehicle-body side connect bush 21, the displacements $\alpha 6$ and $\beta 6$ around the two rotational axes I1 and I2 are both downward. Therefore, a downward force is input to the front lower link 4 through the vehicle-body side connect bush 21. In addition, at the mounting point P7 of the wheel-side connect bush 20, the displacements $\alpha 7$ and $\beta 7$ around the two rotational axes I1 and I2 are in opposite directions. Therefore, a vertical input to the front lower link 4 from the wheel-side connect bush 20 does not exist or is small. Consequently, an input from both of the connect bushes 20 and 21 causes a downward displacement $\delta 2$ to be generated at the wheel-side mounting point P2 of the front lower link 4 by the operation of the displacement amount changing device. This displacement $\delta 2$ reduces an upward stroke displacement amount at the wheel-side mounting point P2 of the front lower link 4 generated by a bounding of the wheel 1.

Accordingly, the amount of upward stroke of the front lower link 4 and the rear lower link 5 generated by a bounding of a wheel is reduced at the front lower link 4 and is increased at the rear lower link 5. In other words, the bound stroke amount at the rear lower link 5 is larger than that at the front lower link 4. As a result, when the wheel 1 bounds, the displacement amount changing device reduces the amount by which the wheel-side mounting point P2 of the front lower link 4 is pulled inward in the vehicle width direction and increases the amount by which the wheel-side mounting point P4 of the rear lower link 5 is pulled inward in the vehicle width direction. Thus, when the wheel 1 bounds, the amount of wheel toe-out is increased.

As demonstrated by the above example, the suspension device increases the toe-out direction of a bounding wheel 1, such as a turning outer wheel side wheel.

When the wheel 1 rebounds, vertical displacements at the four mounting points P3, P4, P6 and P7 resulting from the reaction force R2 of the suspension spring 30 are vertically opposite to those that occur when the wheel 1 bounds.

That is, a downward displacement occurs at the wheel-side mounting point P4 of the rear lower link 5 by the operation of the displacement amount changing device. This displacement increases a downward stroke displacement amount at the wheel-side mounting point P4 of the rear lower link 5 generated by a rebounding of a wheel.

In addition, an upward displacement occurs at the wheel-side mounting point P2 of the front lower link 4 by the operation of the displacement amount changing device. This displacement reduces a downward stroke displacement amount at the wheel-side mounting point P2 of the front lower link 4 generated by a rebounding of a wheel.

Accordingly, the amount of downward stroke of the front lower link 4 and the rear lower link 5 is reduced at the front lower link 4 and increased at the rear lower link 5. In other words, the rebound stroke amount at the rear lower link 5 is larger than that at the front lower link 4. As a result, when a wheel rebounds, the displacement amount changing device reduces the amount by which the wheel-side mounting point P2 of the front lower link 4 is pulled inward in the vehicle width direction and increases the amount by which the wheel-side mounting point P4 of the rear lower link 5 is pulled inward in the vehicle width direction. This increases the amount of change in a toe-out direction.

In a third example, the mounting point 30a of the lower portion of the suspension spring 30 is disposed towards the back in the vehicle forward-backward direction and towards the inner side in the vehicle width direction with respect to the elastic center G. That is, the mounting point 30a is disposed behind the rotational axis I2 in the vehicle forward-backward direction and more towards the inner side than the rotational axis I1 in the vehicle width direction as illustrated by area A in FIG. 19.

When the wheel 1 bounds, the downward reaction force R2 of the suspension spring 30 is input to the reaction-force input point 30a at the projecting portion 7. The force R2 causes the projecting portion 7 to be rotationally displaced around the rotational axis I1 so that its vehicle-body side is displaced downward and to be rotationally displaced around the rotational axis I2 so that its back side in the vehicle forward-backward direction is displaced downward.

Figure 22:
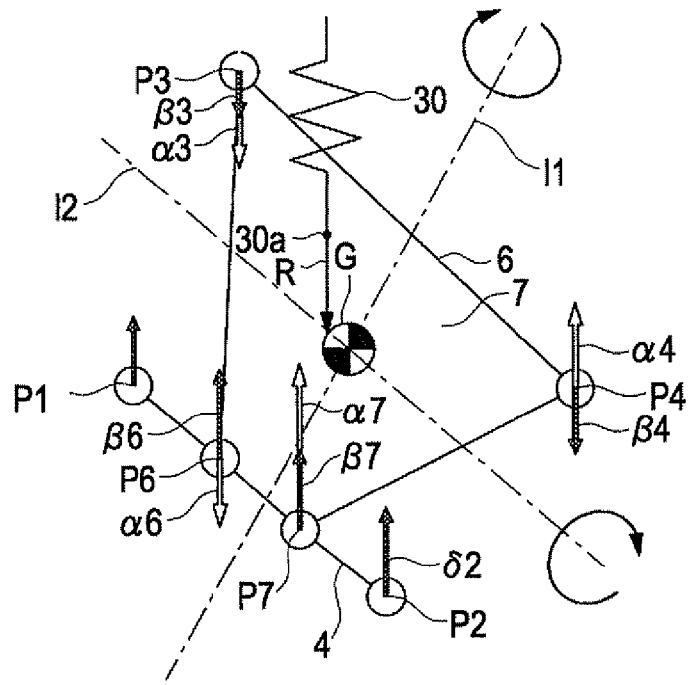
FIG. 22 illustrates an operation when a suspension spring is mounted to an area A.

Accordingly, as shown in FIG. 22, when the projecting portion 7 is displaced around the rotational axis I1, an upward displacement $\alpha 4$ is generated with respect to the wheel-side mounting point P4 of the rear lower link 5, and a downward displacement $\alpha 3$ is generated with respect to the vehicle-body side mounting point P3. In addition, an upward displacement $\alpha 7$ is generated at a mounting point P7 of the wheel-side connect bush 20, and a downward displacement $\alpha 6$ is generated at a mounting point P6 of the vehicle-body side connect bush 21.

When the projecting portion 7 is displaced around the rotational axis I2, upward displacements $\beta 6$ and $\beta 7$ are generated at the respective mounting points P6 and P7 of the two connect bushes 20 and 21. In addition, downward displacements $\beta 4$ and $\beta 3$ are generated at the wheel-side mounting point P4 and the vehicle-body side mounting point P3, respectively, of the lower link.

A resultant displacement in which the displacements around the two rotational axes I1 and I2 are combined is generated separately at each of the four mounting points P3, P4, P6, and P7.

For example, at the wheel-side mounting point P4 of the rear lower link 5, displacements $\alpha 4$ and $\beta 4$ around the two rotational axes I1 and I2 are in opposite directions. Therefore, a vertical displacement due to the displacement amount changing device does not exist or is small at the wheel-side mounting point P4 of the rear lower link 5. By adjusting the distance between the reaction-force input point 30a and the rotational axis I1 and the distance between the reaction-force input point 30a and the rotational axis I2, it is possible to adjust the vertical displacement at the wheel-side mounting point P4 of the rear lower link 5 resulting from the operation of the displacement amount changing device.

That is, it is possible to prevent a change in or reduce an upward stroke displacement amount at the wheel-side mounting point P4 of the rear lower link 5 due to the operation of the displacement amount changing device resulting from a bound stroke of the wheel 1.

At the mounting point P7 of the wheel-side connect bush 20, the displacements $\alpha 7$ and $\beta 7$ around the two rotational axes I1 and I2 are both upward. Therefore, an upward force is input to the front lower link 4 through the wheel-side connect bush 20. In addition, at the mounting point P6 of the vehicle-body side connect bush 21, the displacements $\alpha 6$ and $\beta 6$ around the two rotational axes I1 and I2 are in opposite directions. Therefore, a vertical input to the front lower link 4 from the wheel-side connect bush 20 does not exist or is small. Consequently, an input from both of the connect bushes 20 and 21 causes an upward displacement $\delta 2$ to be generated at the wheel-side mounting point P2 of the front lower link 4 by the operation of the displacement amount changing device. This displacement $\delta 2$ increases an upward stroke displacement amount at the wheel-side mounting point P2 of the front lower link 4 generated by a bounding of the wheel 1.

Accordingly, the amount of upward stroke of the front lower link 4 and the rear lower link 5 generated by a bounding of a wheel is increased at the front lower link 4 and does not exist or is small at the rear lower link 5. In other words, the bound stroke amount at the front lower link 4 is larger than that at the rear lower link 5. As a result, when the wheel 1 bounds, the displacement amount changing device increases the amount by which the wheel-side mounting point P2 of the front lower link 4 is pulled inward in the vehicle width direction and prevents the amount by which the wheel-side mounting point P4 of the rear lower link 5 is pulled inward in the vehicle width direction from changing or causes it to be small. Thus, when the wheel bounds, the amount of wheel 1 toe-out is increased.

As demonstrated by the above example, the suspension device increases the toe-in direction of a bounding wheel, such as a turning outer wheel side wheel 1.

When the wheel 1 rebounds, vertical displacements at the four mounting points P3, P4, P6 and P7 resulting from the reaction force R2 of the suspension spring 30 are vertically opposite to those that occur when the wheel 1 bounds.

That is, at the wheel-side mounting point P4 of the rear lower link 5, the displacement does not exist or is small due to the operation of the displacement amount changing device. More specifically, a downward stroke displacement amount at the wheel-side mounting point P4 of the rear lower link 5 provided due to a rebounding of a wheel does not change or is small.

In addition, a downward displacement occurs at the wheel-side mounting point P2 of the front lower link 4 by the operation of the displacement amount changing device. This displacement increases a downward stroke displacement amount at the wheel-side mounting point P2 of the front lower link 4 generated by a rebounding of a wheel.

Accordingly, the amount of downward stroke of the front lower link 4 and the rear lower link 5 is increased at the front lower link 4 and does not change or is changed by a small amount at the rear lower link 5. In other words, the rebound stroke amount at the front lower link 4 is larger than that at the rear lower link 5. As a result, when a wheel rebounds, the displacement amount changing device increases the amount by which the wheel-side mounting point P2 of the front lower link 4 is pulled inward in the vehicle width direction and prevents the amount by which the wheel-side mounting point P4 of the rear lower link 5 is pulled inward in the vehicle width direction from changing or causes it to be small. This increases the amount of change in a toe-in direction.

In a fourth example, the mounting point 30a of the lower portion of the suspension spring 30 is disposed towards the front in the vehicle forward-backward direction and towards the outer side in the vehicle width direction with respect to the elastic center G. That is, the mounting point 30a is disposed in front of the rotational axis I2 in the vehicle forward-backward direction and more towards the outer side than the rotational axis I1 in the vehicle width direction as illustrated by area D in FIG. 19.

When the wheel 1 bounds, the downward reaction force R2 of the suspension spring 30 is input to the reaction-force input point 30a at the projecting portion 7. The force R2 causes the projecting portion 7 to be rotationally displaced around the rotational axis I1 so that its wheel side is displaced downward and to be rotationally displaced around the rotational axis I2 so that its front side in the vehicle forward-backward direction is displaced downward.

Figure 23:
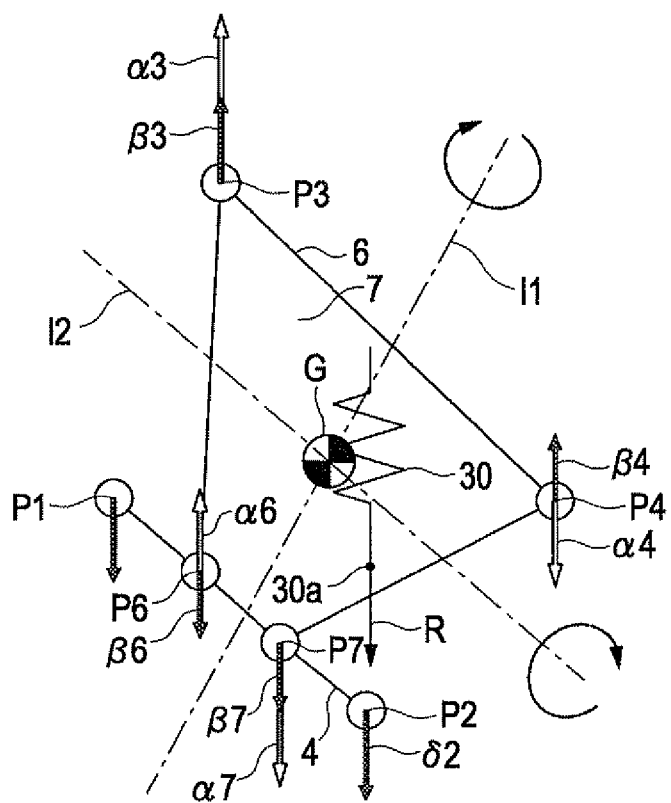
FIG. 23 illustrates an operation when a suspension spring is mounted to an area D.

Accordingly, as shown in FIG. 23, when the projecting portion 7 is displaced around the rotational axis I1, a downward displacement $\alpha 4$ is generated with respect to the wheel-side mounting point P4 of the rear lower link 5, and an upward displacement $\alpha 3$ is generated with respect to the vehicle-body side mounting point P3. In addition, a downward displacement $\alpha 7$ is generated at a mounting point P7 of the wheel-side connect bush 20, and an upward displacement $\alpha 6$ is generated at a mounting point P6 of the vehicle-body side connect bush 21.

When the projecting portion 7 is displaced around the rotational axis I2, downward displacements $\beta 6$ and $\beta 7$ are generated at the respective mounting points P6 and P7 of the two connect bushes 20 and 21. In addition, upward displacements $\beta 4$ and $\beta 3$ are generated at the wheel-side mounting point P4 and the vehicle-body side mounting point P3, respectively, of the lower link.

A resultant displacement in which the displacements around the two rotational axes I1 and I2 are combined is generated separately at each of the four mounting points P3, P4, P6 and P7.

For example, at the wheel-side mounting point P4 of the rear lower link 5, displacements $\alpha 4$ and $\beta 4$ around the two rotational axes I1 and I2 are in opposite directions. Therefore, a vertical displacement at the wheel-side mounting point P4 of the rear lower link 5 due to the displacement amount changing means does not exist or is small. By adjusting the distance between the reaction-force input point 30a and the rotational axis I1 and the distance between the reaction-force input point 30a and the rotational axis I2, it is possible to adjust the vertical displacement at the wheel-side mounting point P4 of the rear lower link 5 resulting from the operation of the displacement amount changing device.

That is, it is possible to prevent a change in or reduce an upward stroke displacement amount at the wheel-side mounting point P4 of the rear lower link 5 resulting from a bound stroke of a wheel and due to the operation of the displacement amount changing device.

At the mounting point P7 of the wheel-side connect bush 20, the displacements $\alpha 7$ and $\beta 7$ around the two rotational axes I1 and I2 are both downward. Therefore, a downward force is input to the front lower link 4 through the wheel-side connect bush 20. In addition, at the mounting point P6 of the vehicle-body side connect bush 21, the displacements $\alpha 6$ and $\beta 6$ around the two rotational axes I1 and I2 are in opposite directions. Therefore, a vertical input to the front lower link 4 from the wheel-side connect bush 20 does not exist or is small. Consequently, an input from both of the connect bushes 20 and 21 causes a downward displacement $\delta 2$ to be generated at the wheel-side mounting point P2 of the front lower link 4 by the operation of the displacement amount changing device. This displacement $\delta 2$ reduces an upward stroke displacement amount at the wheel-side mounting point P2 of the front lower link 4 generated by a bounding of the wheel 1.

Accordingly, the amount of upward stroke of the front lower link 4 and the rear lower link 5 generated by a bounding of a wheel 1 is reduced at the front lower link 4 and does not exist or is small at the rear lower link 5. In other words, the bound stroke amount at the rear lower link 5 is always larger than that at the front lower link 4. As a result, when the wheel 1 bounds, the displacement amount changing device reduces the amount by which the wheel-side mounting point P2 of the front lower link 4 is pulled inward in the vehicle width direction and prevents the amount by which the wheel-side mounting point P4 of the rear lower link 5 is pulled inward in the vehicle width direction from changing or causes it to be small. Thus, when the wheel 1 bounds, the amount of wheel toe-out is increased.

As demonstrated by the above example, the suspension device increases the toe-out of a bounding wheel, such as a turning outer wheel side wheel 1.

When the wheel 1 rebounds, vertical displacements at the four mounting points P3, P4, P6 and P7 resulting from the reaction force R2 of the suspension spring 30 are vertically opposite to those that occur when the wheel 1 bounds.

That is, the displacement does not exist or is small at the wheel-side mounting point P4 of the rear lower link 5 due to the operation of the displacement amount changing device. More specifically, a downward stroke displacement amount at the wheel-side mounting point P4 of the rear lower link 5 does not change or is small due to a rebounding of a wheel.

In addition, an upward displacement occurs at the wheel-side mounting point P2 of the front lower link 4 by the operation of the displacement amount changing device. This displacement reduces a downward stroke displacement amount at the wheel-side mounting point P2 of the front lower link 4 generated by a rebounding of a wheel.

Accordingly, the amount of downward stroke of the front lower link 4 and the rear lower link 5 is reduced at the front lower link 4 and does not change or is changed by a small amount at the rear lower link 5. In other words, the rebound stroke amount at the rear lower link 5 is larger than that at the front lower link 4. As a result, when a wheel rebounds, the displacement amount changing device reduces the amount by which the wheel-side mounting point P2 of the front lower link 4 is pulled inward in the vehicle width direction and prevents the amount by which the wheel-side mounting point P4 of the rear lower link 5 is pulled inward in the vehicle width direction from changing or causes it to be small. This increases the amount of change to a toe-out direction.

In a fifth example, the mounting point 30a of the lower portion of the suspension spring 30 is disposed at the position of the elastic center G.

When the wheel 1 bounds, the downward reaction force R2 of the suspension spring 30 is input to the reaction-force input point 30a at the projecting portion 7. Since the reaction-force input point 30a is set at the elastic center G, the four mounting points P4, P3, P6 and P7 are all displaced in the input direction of the reaction force without the projecting portion 7 being rotationally displaced around the rotational axis I1 or the rotational axis I2. Therefore, the wheel-side mounting point P4 of the rear lower link 5 is displaced downward.

A downward input from both of the connect bushes 20 and 21 causes the wheel-side mounting point P2 of the front lower link 4 to be displaced downward due to the operation of the displacement amount changing device as well.

Accordingly, the amounts of upward strokes of the front lower link 4 and the rear lower link 5 are both reduced. That is, the amounts by which the two lower links 4 and 5 are pulled toward the vehicle body are reduced. Therefore, a toe change amount is reduced. This also applies when the wheel 1 rebounds.

By setting the mounting point 30a of the lower portion of the suspension spring 30 at any one of the four areas A to D and the elastic center point G, it is possible to adjust the increase in the amount of change to a toe-in direction or to a toe-out direction when the wheel 1 bounds or rebounds. Moreover, by adjusting the position of the mounting point 30a of the lower portion with respect to each of the two rotational axes I1 and I2, the amount of the increase of the toe-in or toe-out can be adjusted.

Accordingly, by elastically linking the two lower links 4 and 5 to each other with connect bushes 20 and 21, the forward-backward rigidity supporting the wheel 1 can be reduced. In addition, the separately provided displacement amount changing device makes it possible to provide a desired toe characteristic.

Although, in the foregoing examples, a stroke path in which the wheel-side end of the lower link 4 or 5 is pulled inward in the vehicle width direction due to the suspension stroke even if the wheel 1 bounds or rebounds from the neutral position is described, the invention is not limited thereto. The setting position of the mounting point 30a of the lower portion of the suspension spring 30 may be adjusted as appropriate in accordance with a stroke path of a suspension device that is used.

While two connect bushes 20 and 21 are described in the above examples, three or more connect bushes may be used. It is also possible to set a plurality of transfer points (such as 30a) of force that is generated by a change in orientation of the projecting portion 7 of the rear lower link 5 due to the operation of the displacement amount changing device and that is transmitted from the projecting portion 7 to the front lower link 4.

As the mounting points P6 and P7 of the connect bushes 20 and 21 are moved closer to the wheel-side mounting point P2 than the vehicle-body side mounting point P1 of the front lower link 4, the displacement amount at the wheel-side mounting point P2 of the front lower link 4 provided by the displacement amount changing means increases. The further away from the vehicle-body side mounting point P1 that the mounting points P6 and P7 are positioned, the larger the effect resulting from an input through the connect bushes 20 and 21.

Accordingly, by adjusting the mounting points P6 and P7 of the connect bushes 20 and 21, the vertical displacement amount of the wheel-side mounting point P2 of the front lower link 4 can be subjected to tuning for an increase or decrease in a toe angle change during a suspension stroke caused by the displacement amount changing device.

Although the linking portions of the two lower links 4 and 5 are described as disposed on the link axial line L1 of the front lower link 4 as a result of providing the projecting portion 7 at the rear lower link 5 such that the projecting portion 7 projects towards the front in the vehicle forward-backward direction, the invention is not limited thereto. It is possible to provide a projecting portion 4b at the front lower link 4 so as to project towards the back in the vehicle forward-backward direction, and to dispose the elastic linking portions of the two lower links 4 and 5 on the link axial line L2 of the rear lower link 5 in top view.

Even in this case, the mounting point 30a of the lower portion of the suspension spring 30 may be set at the projecting portion 4b. The setting position of the mounting portion 30a alters the toe change during wheel 1 bounding and rebounding similarly to when the projecting portion 7 projects from the link 5.

In addition, it is possible to separately project a projecting portion 7 from the lower link 4 to the other lower link 5 and a projecting portion 7 from the lower link 5 to the other lower link 4, to set one elastic linking portion each on the axial lines L1 and L2 of the lower links 4 and 5, and to dispose the connect bushes 20 and 21 at the two linking portions. Even in this case, it is desirable that the two elastic linking portions are disposed apart from each other in the vehicle width direction as seen from the front side of a vehicle.

The mounting point 30a of the lower portion of the suspension spring 30 is set at one of the two projecting portions 7. The setting position 30a is determined similarly to when only one projecting portion 7 is used.

Although, the upper link 8 is described as comprising one rod link, it may comprise two or more rod links, or may be one having a different form, such as an A arm.

Although the link axial line L2 of the rear lower link 5 is described as disposed in the vehicle width direction and the link axial line L1 of the front lower link 4 is described as tilted towards the back in the vehicle forward-backward direction to set the intersection P5 of the link axial lines L1 and L2 of the respective two lower links 4 and 5 further outward than the axle 2 in the vehicle width direction, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point 4 is disposed further towards the front in the vehicle forward-backward direction than the vehicle-body side mounting point P3. With this alternative arrangement, the intersection P5 of the link axial lines L1 and L2 of the respective two lower links 4 and 5 is still further outward than the axle 2 in the vehicle width direction.

Also, although the axes of the connect bushes 20 and 21 are disposed so as to be oriented substantially in the vehicle forward-backward direction, the invention is not limited by this feature. The axes of the connect bushes 20 and 21 may be disposed, for example, in the vehicle width direction or along the link axial lines L1 and L2. However, when the axes of the connect bushes 20 and 21 are oriented vertically, it becomes difficult to set an anisotropy in which the vertical rigidity is high.

While the lower links 4 and 5 are described as two links that are disposed in parallel in the vehicle forward-backward direction, the two links 4 and 5 may comprise an upper link and another link.

The suspension device may be used for rear wheels and for front wheels.

The basic structure of the ninth embodiment is similar to that of the eighth embodiment. Parts, etc. similar to those in the eighth embodiment are given the same reference numerals and are not described in detail. The ninth embodiment differs from the eighth embodiment in that instead of mounting the lower end of the suspension spring 30 to the projecting portion 7, an end portion of a stabilizer is mounted.

Figure 24:
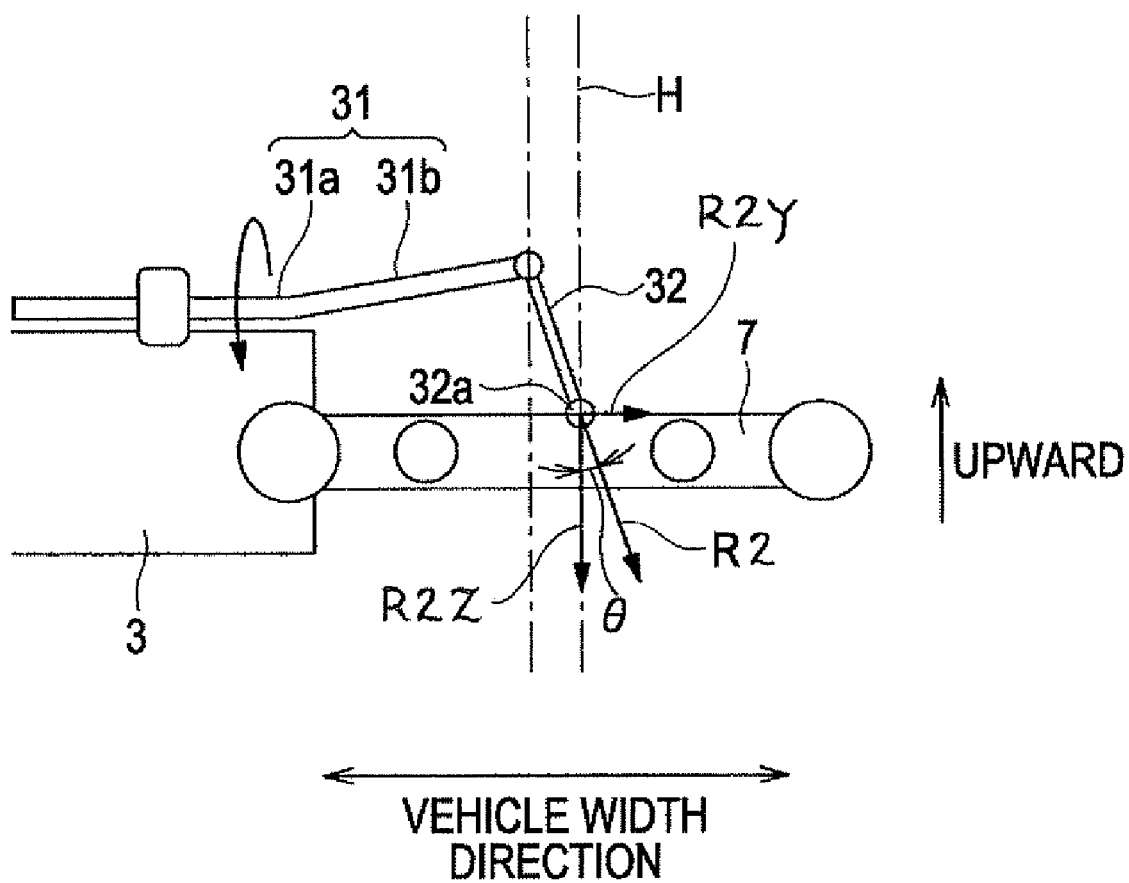
FIG. 24 is a side view illustrating a suspension device for a vehicle wheel according to a ninth embodiment.

As shown in FIG. 24, a stabilizer body 31a extending in a vehicle width direction is axially rotatably supported at a vehicle-body side member. The stabilizer body 31a is supported at a supporting point disposed above the projecting portion 7. A leg 31b is formed continuously with the stabilizer body 31a and extends obliquely in a vehicle forward-backward direction. An end portion of the leg 31b and the projecting portion 7 are linked to each other by a vertically-extending connecting rod 32.

Figure 25:
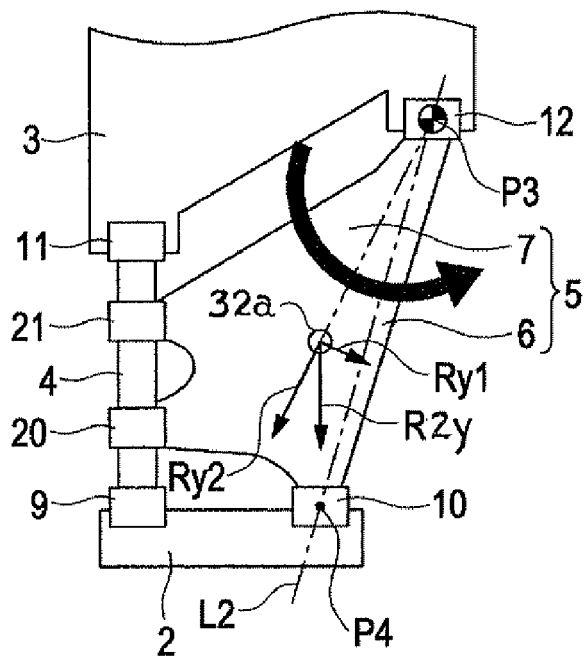
FIG. 25 is a top view illustrating an operational effect resulting from tilting an input axis.

FIG. 25 shows the connecting rod 32 vertically set in a tilted state in the vehicle width direction with respect to a vertical direction H.

Additional structural features are similar to those of the eighth embodiment.

The stabilizer 31 constitutes the displacement amount changing device in this embodiment. A mounting point 32a of the connecting rod 32 to the projecting portion 7 is a reaction-force input point.

When the left and right wheels perform a stroke in reverse phase, as occurs when the vehicle turns, a reaction force R2 is input to the projecting portions 7 on both the left and right sides of the vehicle. In addition, the projecting portion 7 of the wheel 1 that has bounded due to twisting of the stabilizer body 31 experiences a reaction force R2 oriented downward in the vertical direction. The projecting portion 7 of the wheel 1 that has rebounded experiences a reaction force R2 oriented upward in the vertical direction.

The reaction force R2 is transmitted from the stabilizer 31 to the mounting point 32a on the projecting portion 7 via the lower portion of the connecting rod 32.

Depending upon which of the four areas A to D (divided by the two rotational axes I1 and I2) the mounting point 32a of the connecting rod 32 is set, similar advantages to those achieved when the suspension spring 30 is used as the displacement amount changing device in the eighth embodiment can be provided.

However, unlike the reaction force provided by the suspension spring 30, the reaction force R2 provided by the stabilizer bar 31 is not generated when the left and right wheels rebound or bound in phase. Therefore, the stabilizer bar 31 provides the reaction force R2 only when the wheels 1 are out of phase.

The stabilizer bar 31 provides operational advantages similar to the suspension spring 30, and the application of the stabilizer 31 is similar to that of the suspension spring 30. Thus, these items are not discussed here.

The stabilizer bar also provides the following unique operational advantages.

As shown in FIG. 24, the axis of the connecting rod 32 is tilted by an angle θ with respect to the vertical direction H so as to extend outward in the vehicle width direction as it extends from the upper side to the lower side as seen from the front of the vehicle. Therefore, the reaction force R2 transmitted from the stabilizer 31 to the projecting portion 7 can be broken down into a reaction-force component R2z (equal to R2·cos θ) oriented in the vertical direction H, and a reaction-force component R2y (equal to R2·sin θ) oriented in the vehicle width direction.

The reaction force R2z acts as a reaction force similar to the suspension spring 30. In contrast, the vehicle-width-direction component R2y acts as a force that rotates the rear lower link 5 in top view.

When the vehicle is turning and the wheel 1 is bounded, the reaction force R2z input by the stabilizer 31 is oriented downward. At this time, as shown in FIG. 25, the vehicle-width-direction reaction-force component R2y acts upon the projecting portion 7 as a force that is oriented outward in the vehicle width direction. The vehicle-width-direction reaction-force component R2y can be broken down into a reaction-force component Ry1 oriented in the perpendicular direction to the line from 32a to P3, and a reaction-force component Ry2 oriented in the direction from 32a to P3.

Figure 26:
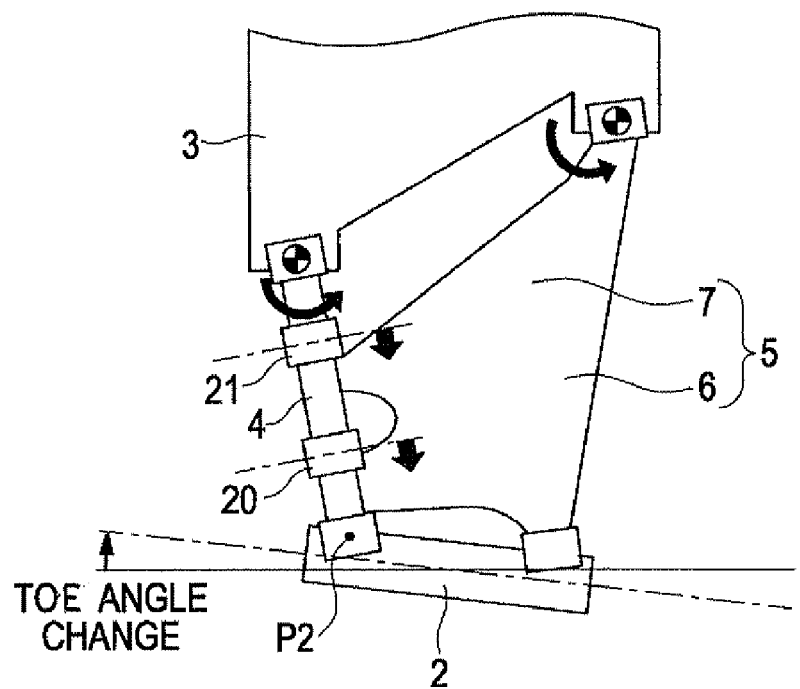
FIG. 26 is a top view illustrating an operational effect resulting from tilting the input axis.

The projecting portion 7 is positioned further towards the front in the vehicle forward-backward direction than the link axial line L2 of the rear lower link 5 (that is, a straight line L2 passing through a vehicle-body side mounting P3 point and a wheel-side mounting point P4). Therefore, when the vehicle-width-direction reaction-force component R2y is input to the projecting portion 7 as shown in FIG. 25, by the reaction-force component Ry1 a wheel-side mounting point P4 of the rear lower link 5 including the projecting portion 7 is rotationally displaced towards the back in the vehicle forward-backward direction around a vehicle-body side mounting point P3, which acts as a pivot. When the rear lower link 5 is rotationally displaced towards the back in the vehicle forward-backward direction as shown in FIG. 26, the front lower link 4 is also pulled in a rotational displacement direction of the rear lower link 5, and the two connect bushes 20 and 21 swing outward in the vehicle width direction. Therefore, a wheel-side mounting point P2 of the front lower link 4 is also rotationally displaced towards the back in the vehicle forward-backward direction.

Depending upon the layout of the two lower links 4 and 5, when the link axial lines L1 and L2 of the two lower links 4 and 5 can be disposed so as to intersect at a location on the outer side of the axle 2 in the vehicle width direction as in the link disposition shown in FIG. 25, it is possible to increase the toe-in movement caused by the vehicle-width-direction reaction-force component R2y input by the stabilizer 31.

When a wheel 1 rebounds, the vehicle-width-direction reaction-force component R2y acts upon the projecting portion 7 as a force that is oriented inward in the vehicle-width direction. Depending upon the layout of the two lower links 4 and 5, when the link axial lines L1 and L2 of the two lower links 4 and 5 can be disposed so as to intersect at a point on the outer side of the axle 2 in the vehicle width direction as illustrated in the link disposition shown in FIG. 25, it is possible to increase the toe out movement caused by the vehicle-width-direction reaction-force component R2z.

As seen in FIG. 24 from the front of the vehicle, the axis of the connecting rod 32 is tilted with respect to the vertical direction H so as to extend inward in the vehicle width direction as it extends from the upper side to the lower side. However, the tilt can be reversed such that the axis of the connecting rod 32 is tilted with respect to the vertical direction H so as to extend outward in the vehicle width direction as it extends from the upper side to the lower side. When the tilt is reversed and the link axial lines L1 and L2 of the two lower links 4 and 5 are disposed so as to intersect at a point on the outer side of the axle 2 in the vehicle width direction, the vehicle-width-direction reaction-force component R2y of the stabilizer 31 can increase the toe-out of a wheel that bounds and can increase the toe-in of a wheel that rebounds.

The direction and amount of toe change due to the vehicle-width-direction reaction force R2y of the stabilizer 31 can be adjusted by the tilt angle with respect to the vertical direction H and the mounting position of the lower portion of the connecting rod 32 to the projecting portion 7.

Accordingly, the toe can be adjusted by the tilting of the connecting rod 32 with respect to the vertical direction H.

Figure 27A:
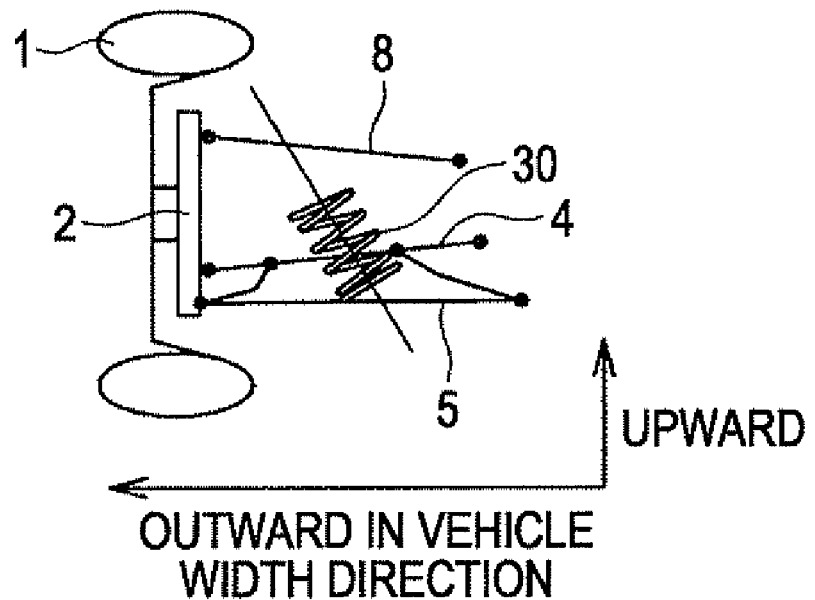
FIGS. 27A and 27B are side views illustrating an example in which an axis of the suspension spring is tilted, with FIG. 27A showing a case in which the axis extends inward in the vehicle width direction as it extends downward, and FIG. 27B showing a case in which the axis extends outward in the vehicle width direction as it extends downward.
Figure 27B:
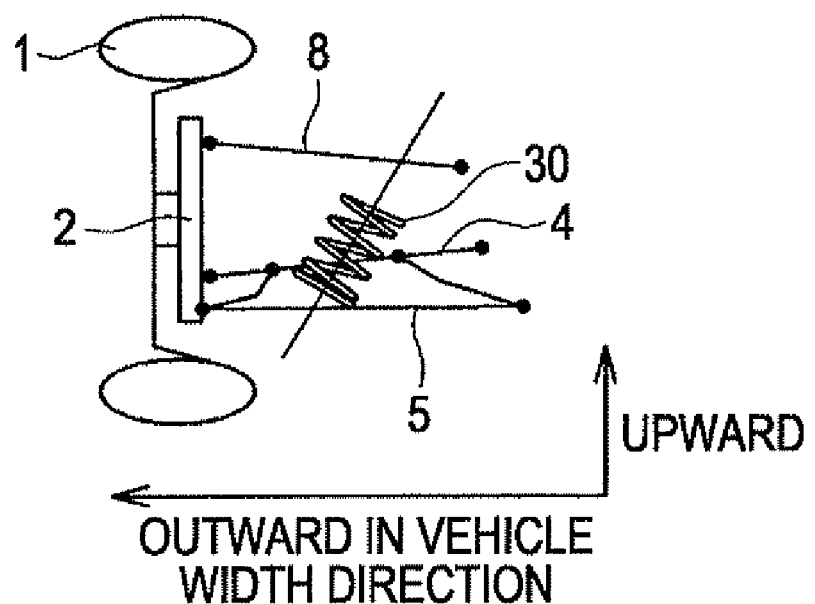

As shown in FIGS. 27A and 27B, tilting a load axis of the suspension spring 30 with respect to the vertical direction H causes the vehicle-width-direction reaction-force component R2y to be generated, so that similar operational advantages can be provided relative to when the connecting rod 32 is used.

As viewed from the front of the vehicle, the axis (reaction-force-R2 axis) of the connecting rod 32 is tilted in the vehicle width direction with respect to the vertical direction H, though the invention is not limited thereto. Instead of or in addition to the illustrated tilt, the axis (reaction-force-R2 axis) of the connecting rod 32 may be tilted in the vehicle forward-backward direction with respect to the vertical direction H as viewed in the vehicle width direction. In this case, a reaction-force component in the vehicle forward-backward direction is input to the projecting portion 7. The reaction-force component in the vehicle forward-backward direction causes the wheel-side mounting point P4 of the rear lower link 5 to be rotationally displaced around the vehicle-body side mounting point P3 as viewed from the top to change the amount of displacement in a toe direction.

While the suspension spring 30 and the stabilizer 31 are exemplified as elastic members constituting a displacement amount changing device, the invention is not limited thereto. The displacement amount changing device may also be formed by supporting the top portion of an elastic member (such as a rubber or plate spring) and mounting the lower end of the elastic member to the projecting portion 7.

The basic structure of the tenth embodiment is similar to that of the first embodiment and the eighth and ninth embodiments. The tenth embodiment differs in that an elastic member constituting the displacement amount changing device has its top portion supported by a vehicle-body side member and its lower portion mounted to a projecting portion 7. In the following description of this embodiment, a suspension spring 30 is described as an example of the displacement amount changing device.

In the tenth embodiment, connect bushes 20 and 21 that elastically link two lower links are distinctive.

That is, the rigidity of at least one of two connect bushes 20 and 21 is anisotropic in that a rigidity that is oriented either obliquely upward or downward from the center as viewed in a vehicle forward-backward direction is relatively low.

The connect bushes 20 and 21 are disposed so that their axes are oriented substantially in the vehicle forward-backward direction. As shown in FIG. 28A, the connect bushes 20 and 21 comprise elastic members 20c and 21c formed of rubber and inserted between outer cylinders 20a and 21a of the connect bushes 20 and 21 and respective inner cylinders 20b and 21b of the connect bushes 20 and 21 so that they are disposed in a nesting state.

In a first example, vehicle-body side connect bush 21 has an anisotropic rigidity so that its diametrical rigidity in a direction passing through the center of the outer cylinder 21a and oriented towards the outer side in the vehicle width direction relative to the upward vertical direction is relatively low. In FIGS. 28A and 28B, a hollow 21d is formed in the elastic member 21c of the vehicle-body side connect bush 21 so as to be situated above and further outward in the vehicle width direction than the outer cylinder 21a in order to adjust the rigidity of the bush 21 so that it becomes anisotropic.

Figure 29:
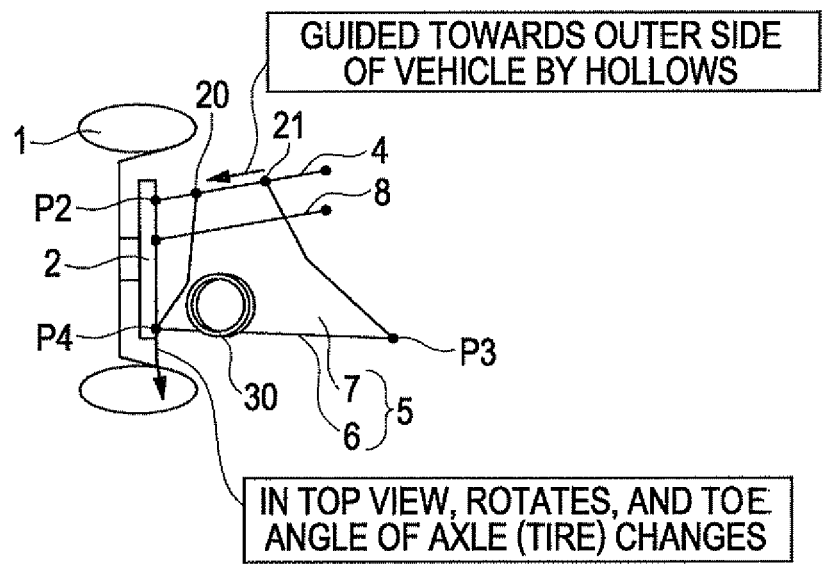
FIG. 29 is a top view of a position of a suspension spring according to FIGS. 28A and 28B.

As shown in FIG. 29, when the outer cylinder 21a of the vehicle-body side bush 21 is displaced vertically upward by an input of the reaction force R2 from the displacement amount changing device as a result of, for example, mounting the lower end portion 30a of the suspension spring 30 to the area B of the projecting portion 7, the hollow 21d guides the outer cylinder 21a of the vehicle-body side connect bush 21 towards the outer side in the vehicle width direction while moving the outer cylinder 21a upward. Accordingly, when the outer cylinder 21a is displaced outward in the vehicle width direction, the wheel-side mounting point P4 of the rear lower link 5 is rotationally displaced towards the back in the vehicle forward-backward direction around the vehicle-body side mounting point P3, which acts as a pivot. The hollow 21d thus makes it possible to further increase or decrease a change in toe angle of a wheel 1 that bounds.

Figure 30:
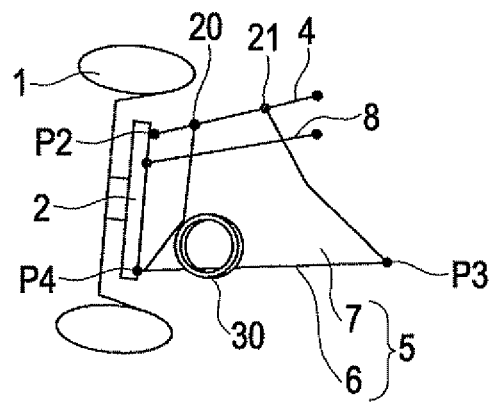
FIG. 30 is a top view of a displacement in a toe-in direction.
Figure 31:
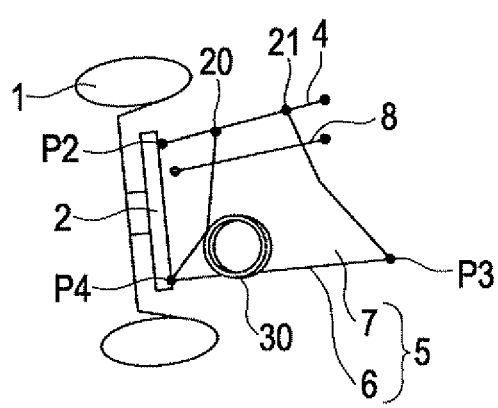
FIG. 31 is a top view of a displacement in a toe-out direction.

When the wheel-side mounting point P4 is positioned behind the vehicle-body side mounting point P3 in the vehicle forward-backward direction as shown in FIG. 29, the rear lower link 5 is rotationally displaced in top view as shown in FIG. 30 so that the toe-in is increased when the wheel 1 bounds. In contrast, when the wheel-side mounting point P4 is positioned further towards the front in the vehicle forward-backward direction than the vehicle-body side mounting point P3, the rear lower link 5 is rotationally displaced in top view as shown in FIG. 31 so that the toe-out is increased when the wheel 1 bounds.

In a second example, vehicle-body side connect bush 21 has an anisotropic rigidity so that its diametrical rigidity in a direction passing through the center of the outer cylinder 21a and oriented towards the inner side in the vehicle width direction and vertically upward is relatively low. In FIGS. 32A and 32B, a hollow 21d is formed in the elastic member 21c of the vehicle-body side connect bush 21 at a position above and further inward in the vehicle width direction than the outer cylinder 21a to adjust the rigidity of the connect bush 21.

Figure 33:
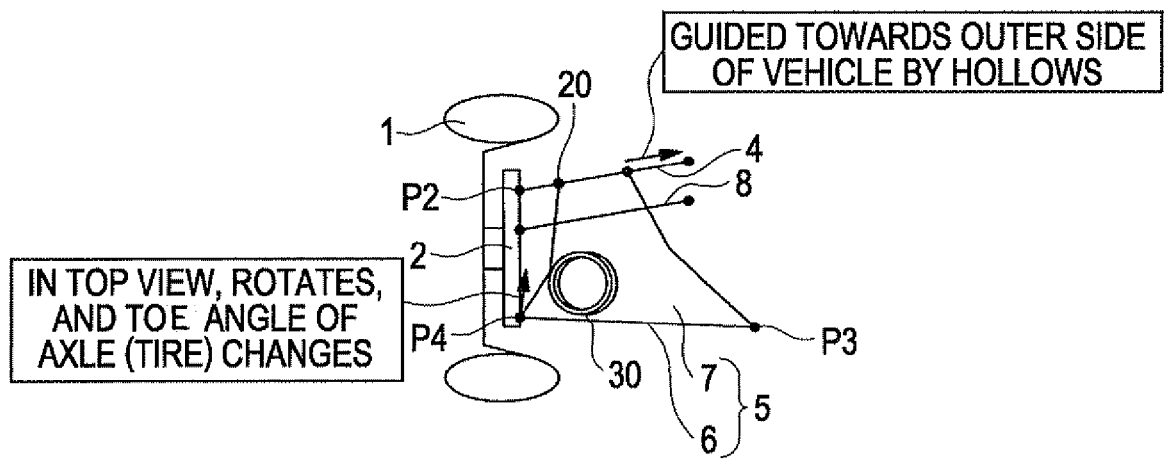
FIG. 33 is a top view of a position of a suspension spring according to FIGS. 32A and 32B.

As shown in FIG. 33, when an input of the reaction force R2 of the displacement amount changing means causes the outer cylinder 21a of the vehicle-body side bush 21 to be displaced vertically upward as a result of, for example, using a structure in which the lower end portion 30a of the suspension spring 30 is mounted to the area B of the projecting portion 7, the anisotropic rigidity of the vehicle-body side connect bush 21 causes the hollow 21d to guide the outer cylinder 21a of the connect bush 21 towards the inner side in the vehicle width direction while moving the outer cylinder 21a upward. Accordingly, when the outer cylinder 21a is displaced inward in the vehicle width direction, the wheel-side mounting point P4 of the rear lower link 5 is rotationally displaced towards the front in the vehicle forward-backward direction around the vehicle-body side mounting point P3, which acts as a pivot. The hollow 21d thus makes it possible to further increase or decrease a change in the toe angle of a bounding wheel.

When the wheel-side mounting point P4 is positioned behind the vehicle-body side mounting point P3 in the vehicle forward-backward direction, the toe-out angle of the wheel 1 increases as the wheel 1 bounds. In contrast, when the wheel-side mounting point P4 is positioned further towards the front in the vehicle forward-backward direction than the vehicle-body side mounting point P3, the toe-in angle of the wheel 1 increases as the wheel 1 bounds.

Figure 34:
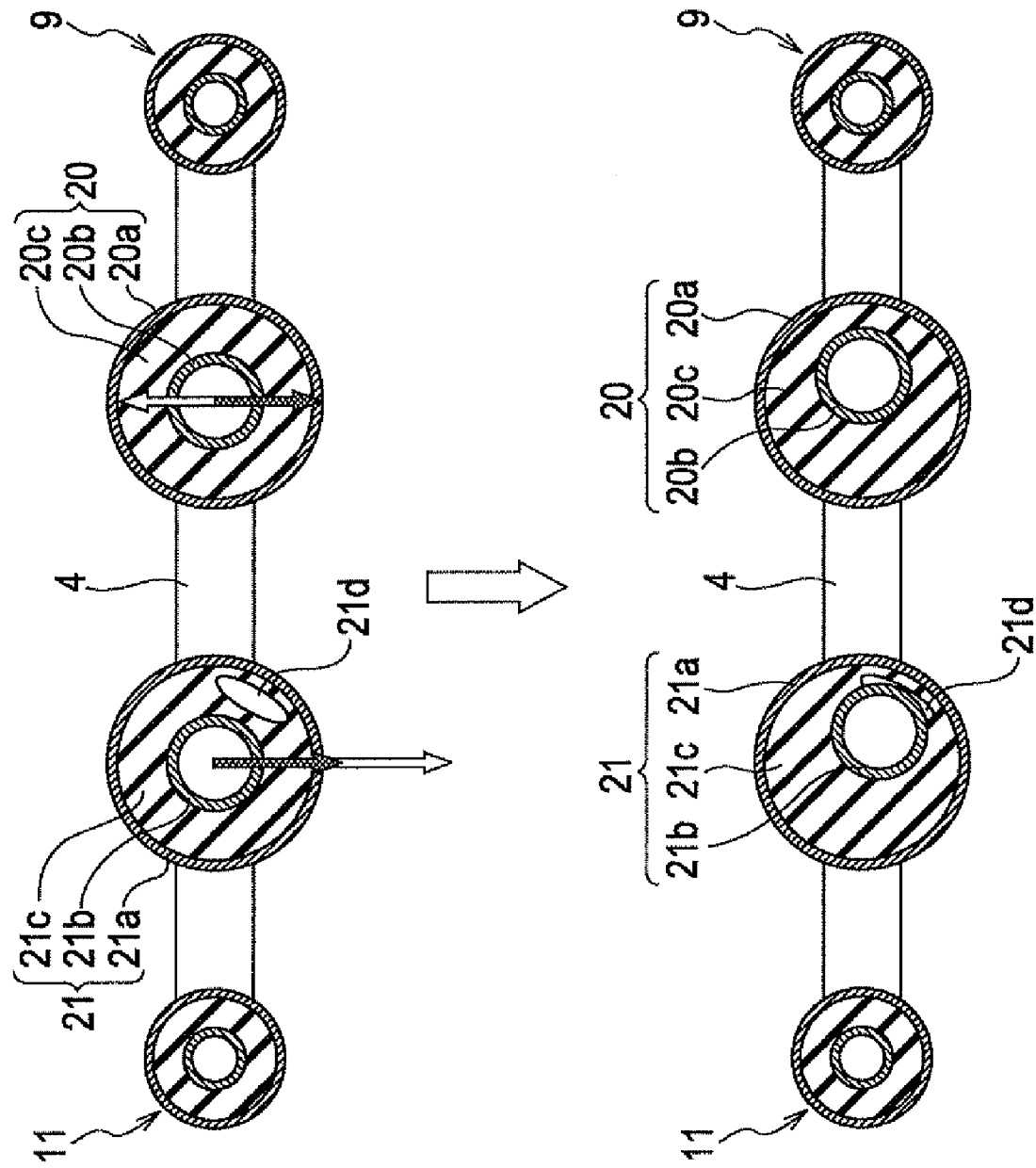
FIGS. 34A and 34B are sectional views illustrating the suspension device for a vehicle wheel according to a third example of the tenth embodiment.

In a third example, the vehicle-body side connect bush 21 has an anisotropic rigidity so that its diametrical rigidity in a direction passing through the center of the outer cylinder 21a and oriented towards the outer side in the vehicle width direction and vertically downward is relatively low. In FIGS. 34A and 34B, a hollow 21d is formed in the elastic member 21c of the vehicle-body side connect bush 21. The hollow 21d is situated below and further outward in the vehicle width direction than the outer cylinder 21a to adjust the rigidity of the connect bush 21.

Figure 35:
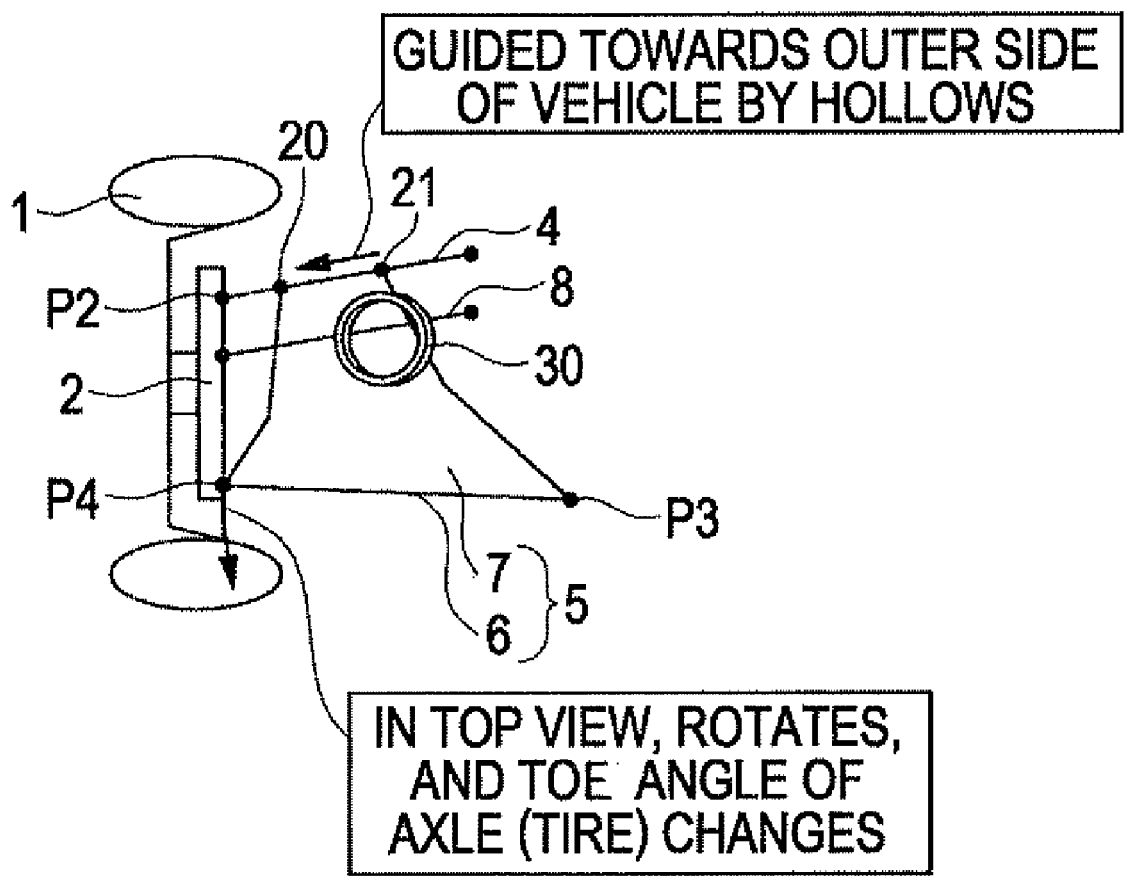
FIG. 35 is a top view of a position of a suspension spring according to FIGS. 34A and 34B.

As shown in FIG. 35, when the outer cylinder 21a of the vehicle-body side bush 21 is displaced vertically downward by an input of the reaction force R2 from the displacement amount changing device as a result of, for example, mounting the lower end portion 30a of the suspension spring 30 to the area C of the projecting portion 7, the hollow 21d guides the outer cylinder 21a of the connect bush towards the outer side in the vehicle width direction while moving the outer cylinder 21a downward. Accordingly, when the outer cylinder 21a is displaced outward in the vehicle width direction, the wheel-side mounting point P4 of the rear lower link 5 is rotationally displaced towards the back in the vehicle forward-backward direction around the vehicle-body side mounting point P3, which acts as a pivot. The hollow 21d thus makes it possible to further increase or decrease a change in toe angle of a wheel 1 that bounds.

When the wheel-side mounting point P4 is positioned behind the vehicle-body side mounting point P3 in the vehicle forward-backward direction, the toe-in angle of the wheel 1 is increased during bounding. In contrast, when the wheel-side mounting point P4 is positioned further towards the front in the vehicle forward-backward direction than the vehicle-body side mounting point P3, the toe-out angle of the wheel 1 is increased during bounding.

Figure 36:
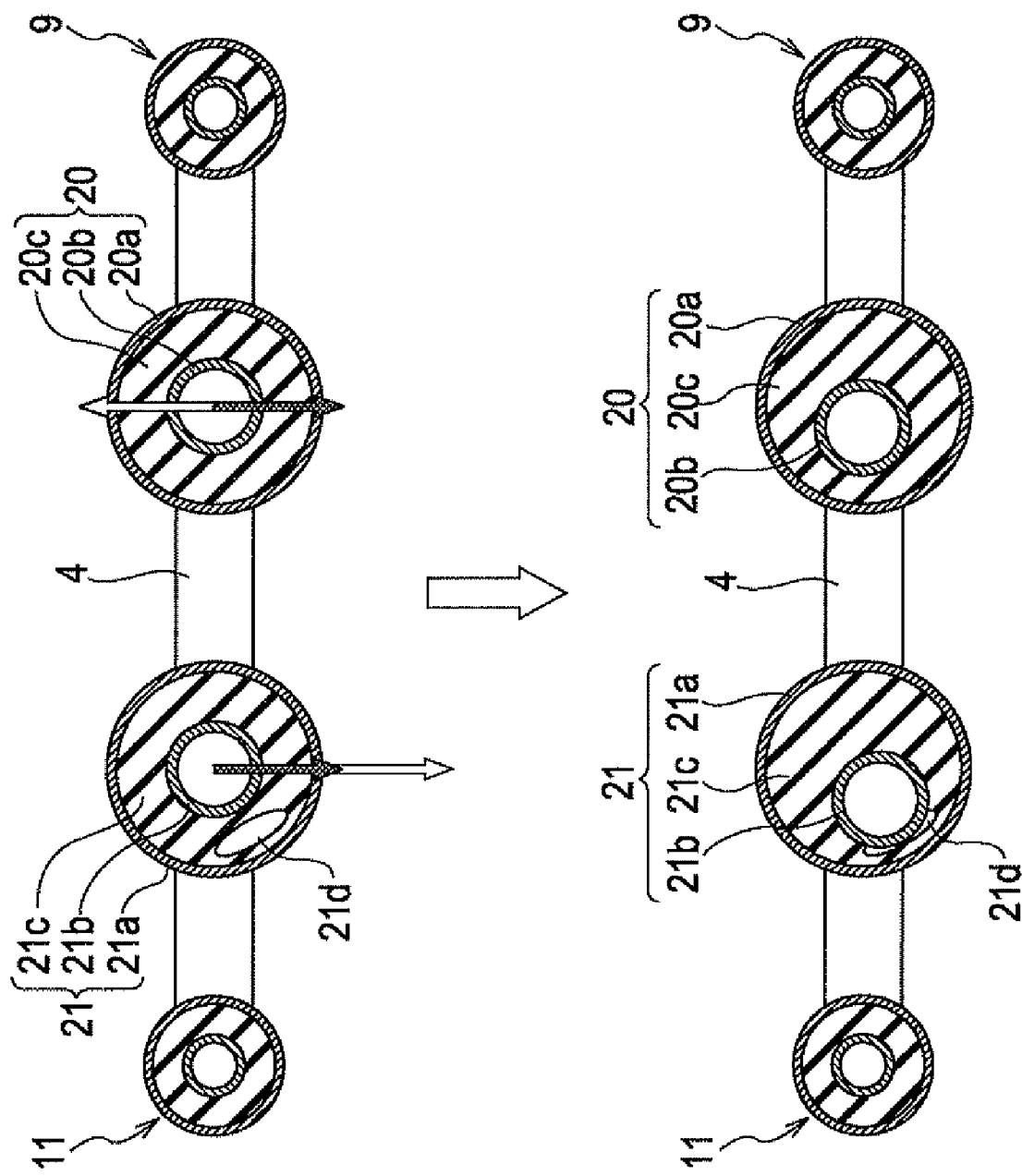
FIGS. 36A and 36B are sectional views illustrating the suspension device for a vehicle wheel according to a fourth example of the tenth embodiment.

In a fourth example, the vehicle-body side connect bush 21 has an anisotropic rigidity so that its diametrical rigidity in a direction passing through the center of the outer cylinder 21 and oriented towards the inner side in the vehicle width direction relative to the downward vertical direction is relatively low. In FIGS. 36A and 36B, a hollow 21d is formed in the elastic member 21c of the vehicle-body side connect bush 21 so as to be situated below and further inward in the vehicle width direction than the outer cylinder 21a in order to adjust the rigidity of the bush 21.

Figure 37:
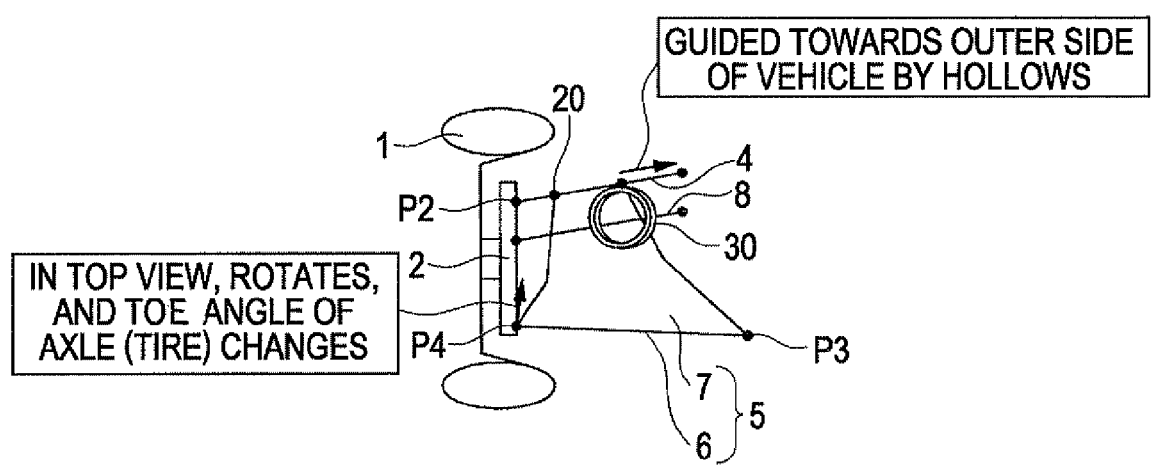
FIG. 37 is a top view of a position of a suspension spring according to FIGS. 36A and 36B.

When the outer cylinder 21a of the vehicle-body side bush 21 is displaced as shown in FIG. 37 by an input of the reaction force R2 from the displacement amount changing means as a result of, for example, mounting the lower end portion 30a of the suspension spring 30 to the area C of the projecting portion 7, the hollow 21d guides the outer cylinder 21a of the vehicle-body side connect bush 21 towards the inner side in the vehicle width direction while moving the outer cylinder 21a downward. Accordingly, when the outer cylinder 21a is displaced inward in the vehicle width direction, the wheel-side mounting point P4 of the rear lower link 5 is rotationally displaced towards the front in the vehicle forward-backward direction around the vehicle-body side mounting point P3, which acts as a pivot. The hollow 21d thus makes it possible to increase or decrease the toe angle of a wheel 1 that bounds.

When the wheel-side mounting point P4 is positioned behind the vehicle-body side mounting point P3 in the vehicle forward-backward direction, the toe-out angle of the wheel 1 is increased when the wheel 1 bounds. In contrast, when the wheel-side mounting point P4 is positioned further towards the front in the vehicle forward-backward direction than the vehicle-body side mounting point P3, the toe-in angle is increased when the wheel 1 bounds.

In a fifth example, the wheel-side connect bush 20 has an anisotropic rigidity so that its diametrical rigidity in a direction passing through the center of the outer cylinder 20a and oriented towards the outer side in the vehicle width direction and upward vertically is relatively low. In FIGS. 38A and 38B, a hollow 20d is formed in the elastic member 20c of the wheel-side connect bush 20 so as to be situated above and further outward in the vehicle width direction than the outer cylinder 20a to adjust the rigidity of the bush 20.

Figure 39:
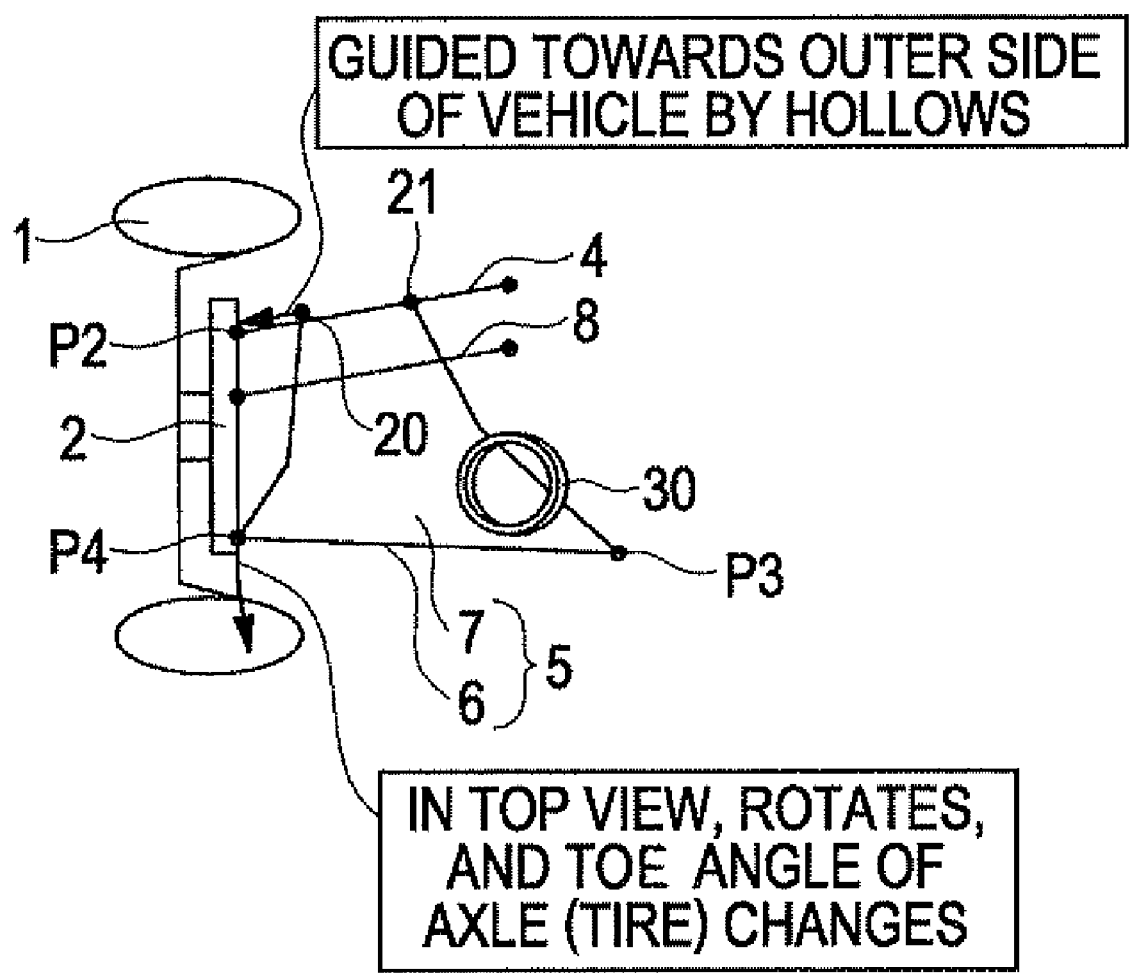
FIG. 39 is a top view of a position of a suspension spring according to FIGS. 38A and 38B.

As shown in FIG. 39, when the outer cylinder 20a of the wheel-side connect bush 20 is displaced vertically upward by an input of the reaction force R2 from the displacement amount changing device as a result of, for example, mounting the lower end portion 30a of the suspension spring 30 to the area A of the projecting portion 7, the hollow 20d guides the outer cylinder 20a of the connect bush 20 towards the outer side in the vehicle width direction while moving the outer cylinder 20a upward. Accordingly, when the outer cylinder 20a is displaced outward in the vehicle width direction, the wheel-side mounting point P4 of the rear lower link 5 is rotationally displaced towards the back in the vehicle forward-backward direction around the vehicle-body side mounting point P3, which acts as a pivot. The hollow 20d thus makes it possible to further increase or decrease the toe angle of a wheel 1 that bounds.

When the wheel-side mounting point P4 is positioned behind the vehicle-body side mounting point P3 in the vehicle forward-backward direction, the toe-in angle of the wheel 1 increases as the wheel 1 bounds. In contrast, when the wheel-side mounting point P4 is positioned further towards the front in the vehicle forward-backward direction than the vehicle-body side mounting point P3, the toe-out angle increases as the wheel 1 bounds.

In a sixth example, the wheel-side connect bush 20 has an anisotropic rigidity so that its diametrical rigidity in a direction passing through the center of the outer cylinder 20a and oriented towards the inner side in the vehicle width direction and vertically upward is relatively low. In FIGS. 40A and 40B, a hollow 20d is formed in the elastic member 20c of the wheel-side connect bush 20 so as to be situated above and further inward in the vehicle width direction than the outer cylinder 20a in order to adjust the rigidity of the bush 20.

Figure 41:
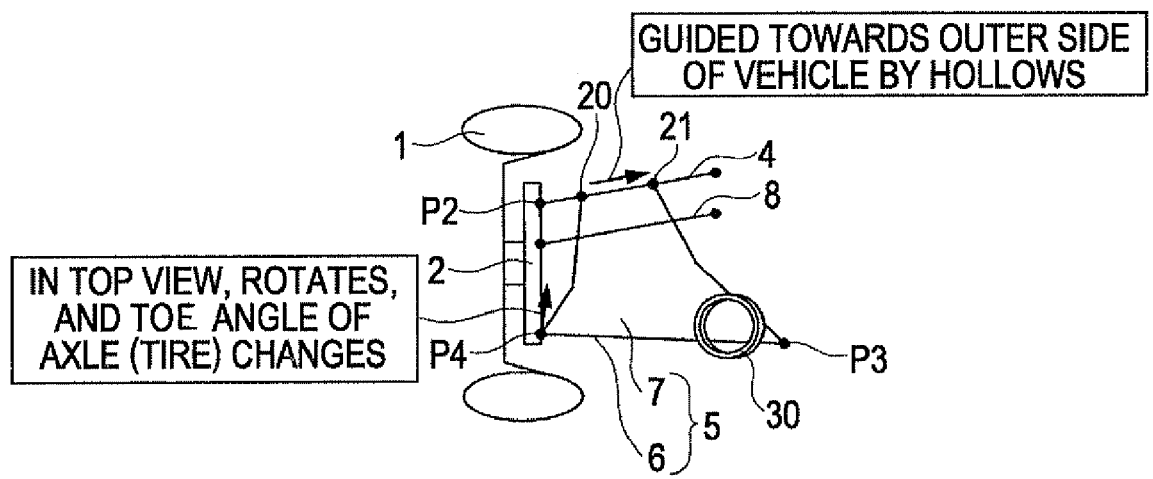
FIG. 41 is a top view of a position of a suspension spring according to FIGS. 40A and 40B.

As shown in FIG. 41, when the outer cylinder 20a of the wheel-side connect bush 20 is displaced vertically by an input of the reaction force R2 from the displacement amount changing device as a result of, for example, mounting the lower end portion 30a of the suspension spring 30 to the area A of the projecting portion 7, the hollow 20d to guides the outer cylinder 20a of the wheel-side connect bush 20 towards the inner side in the vehicle width direction while moving the outer cylinder 20a upward. Accordingly, when the outer cylinder 20a is displaced inward in the vehicle width direction, the wheel-side mounting point P4 of the rear lower link 5 is rotationally displaced towards the front in the vehicle forward-backward direction around the vehicle-body side mounting point P3, which acts as a pivot. The hollow 20d makes it possible to increase or decrease the toe angle of a wheel 1 that bounds.

When the wheel-side mounting point P4 is positioned behind the vehicle-body side mounting point P3 in the vehicle forward-backward direction, the toe-out angle of the wheel 1 is increased when the wheel 1 bounds. In contrast, when the wheel-side mounting point P4 is positioned further towards the front in the vehicle forward-backward direction than the vehicle-body side mounting point P3, the toe-in angle of the wheel 1 is increased when the wheel 1 bounds.

Figure 42:
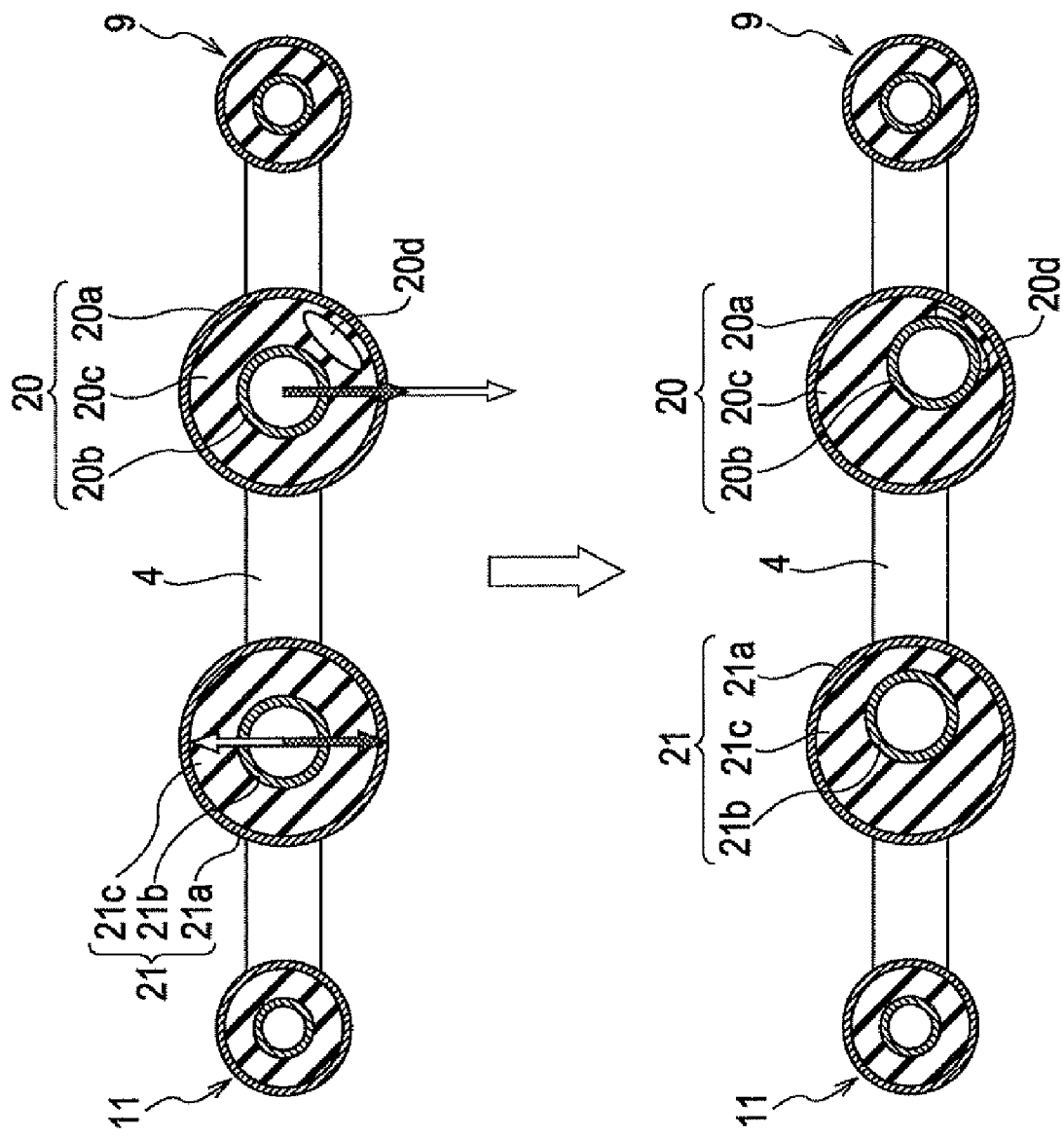
FIGS. 42A and 42B are sectional views illustrating the suspension device for a vehicle wheel according to a seventh example of the tenth embodiment.

In a seventh example, the wheel-side connect bush 20 has an anisotropic rigidity so that its diametrical rigidity in a direction passing through the center of the outer cylinder 20a and oriented towards the outer side in the vehicle width direction and vertically downward is relatively low. In FIGS. 42A and 42B, a hollow 20d is formed in the elastic member 20c of the wheel-side connect bush 20 so as to be situated below and further outward in the vehicle width direction than the outer cylinder 20a to adjust the rigidity of the bush 20.

Figure 43:
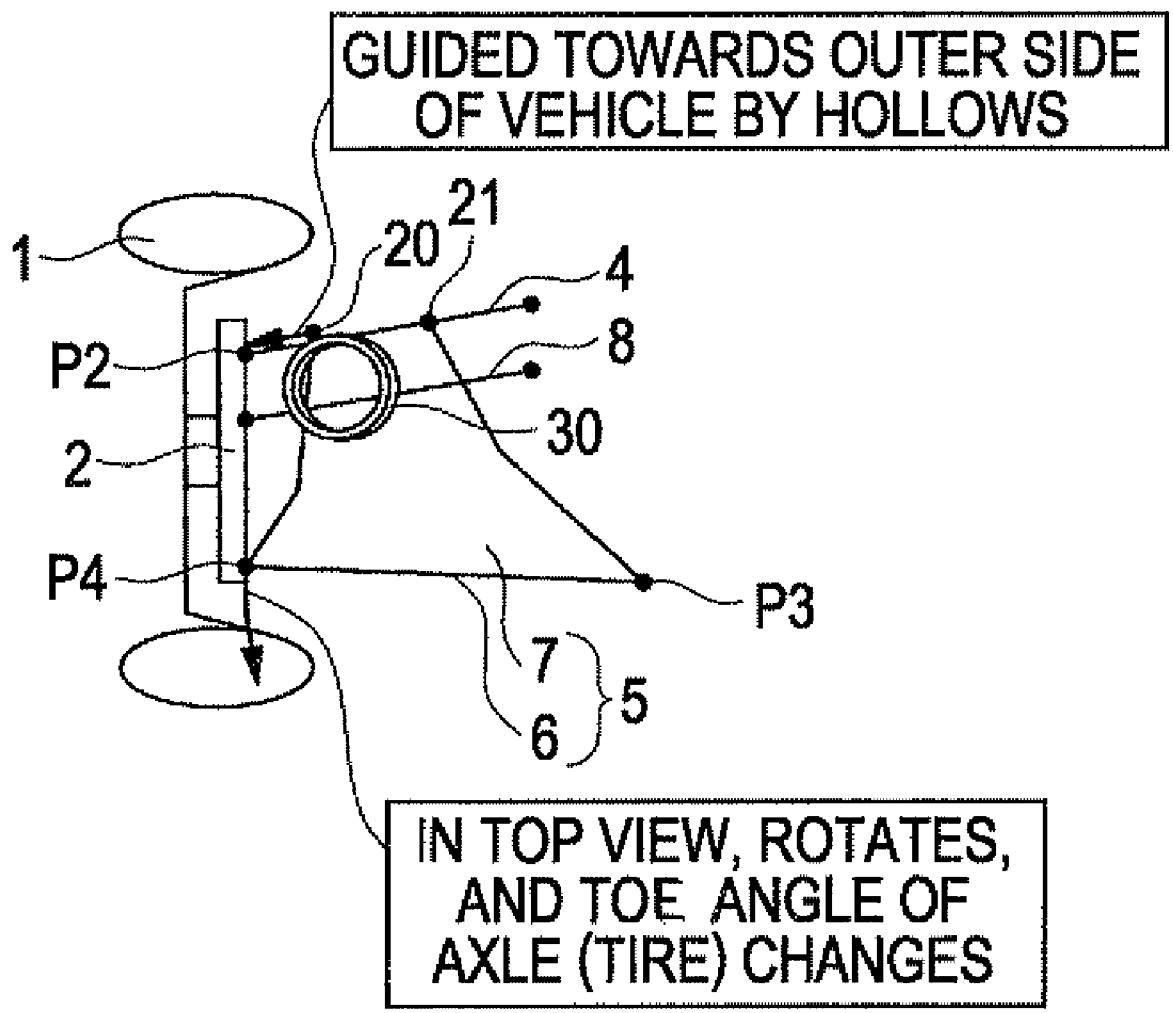
FIG. 43 is a top view of a position of a suspension spring according to FIGS. 42A and 42B.

As shown in FIG. 43, when the outer cylinder 20a of the wheel-side connect bush 20 is displaced vertically downward by an input of the reaction force R2 from the displacement amount changing device as a result of, for example, mounting the lower end portion 30a of the suspension spring 30 to the area D of the projecting portion 7, the hollow 20d guides the outer cylinder 20a of the connect bush towards the outer side in the vehicle width direction while moving the outer cylinder 20a downward. Accordingly, when the outer cylinder 20a is displaced outward in the vehicle width direction, the wheel-side mounting point P4 of the rear lower link 5 is rotationally displaced towards the back in the vehicle forward-backward direction around the vehicle-body side mounting point P3, which acts as a pivot. The hollow 20d thus makes it possible to increase or decrease the toe angle of a wheel 1 that bounds.

When the wheel-side mounting point P4 is positioned behind the vehicle-body side mounting point P3 in the vehicle forward-backward direction, the toe-in angle of the wheel 1 increases when the wheel 1 bounds. In contrast, when the wheel-side mounting point P4 is positioned further towards the front in the vehicle forward-backward direction than the vehicle-body side mounting point P3, the toe-out angle is increased when the wheel 1 bounds.

Figure 44:
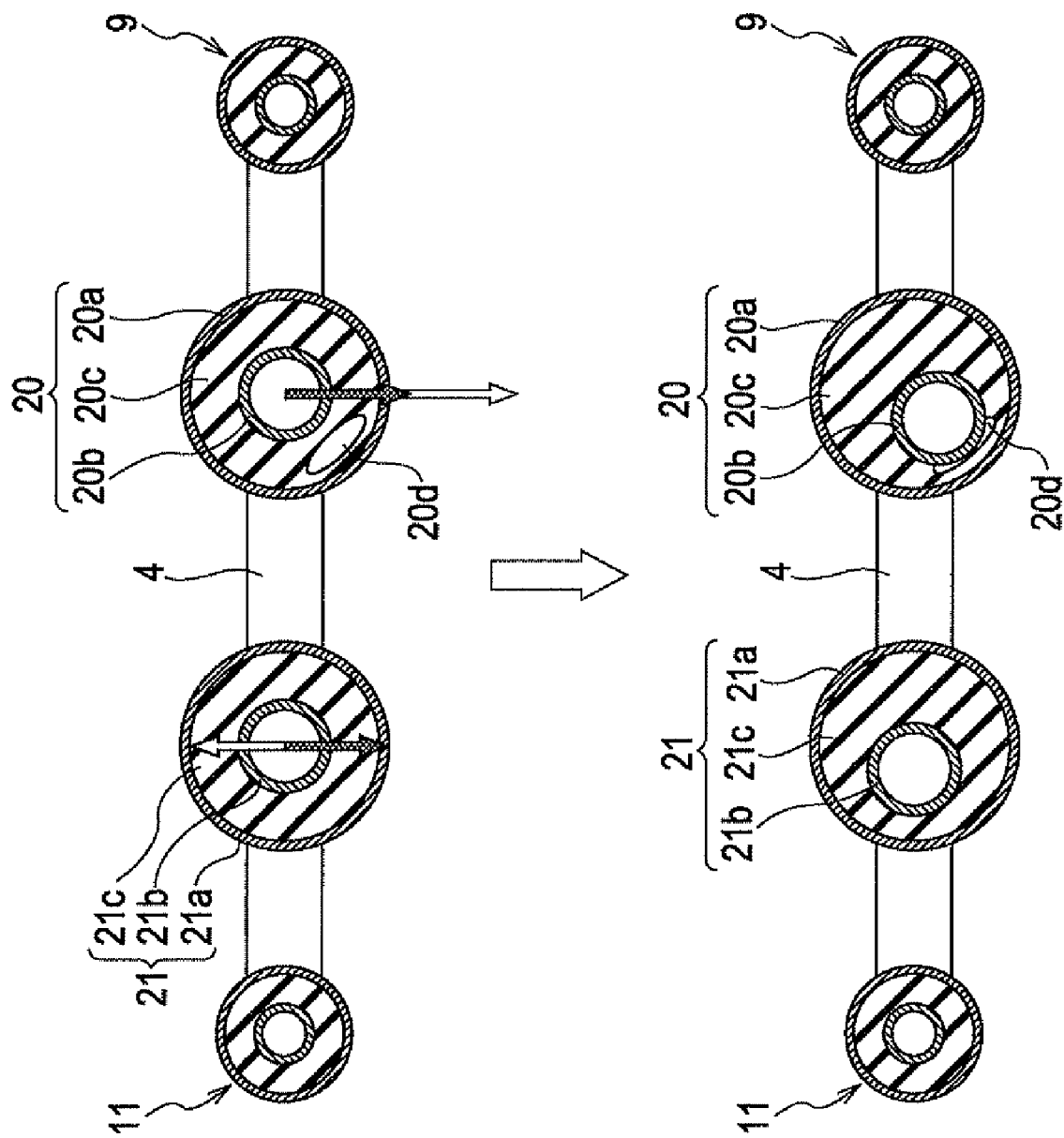
FIGS. 44A and 44B are sectional views illustrating the suspension device for a vehicle wheel according to an eighth example of the tenth embodiment.

In an eighth example, the wheel-side connect bush 20 has an anisotropic rigidity so that its diametrical rigidity in a direction passing through the center of the outer cylinder 20a and oriented towards the inner side in the vehicle width direction and vertically downward is relatively low. In FIGS. 44A and 44B, a hollow 20d is formed in the elastic member 20c of the wheel-side connect bush 20 so as to be situated below and further inward in the vehicle width direction than the outer cylinder 20a to adjust the rigidity of the bush 20.

Figure 45:
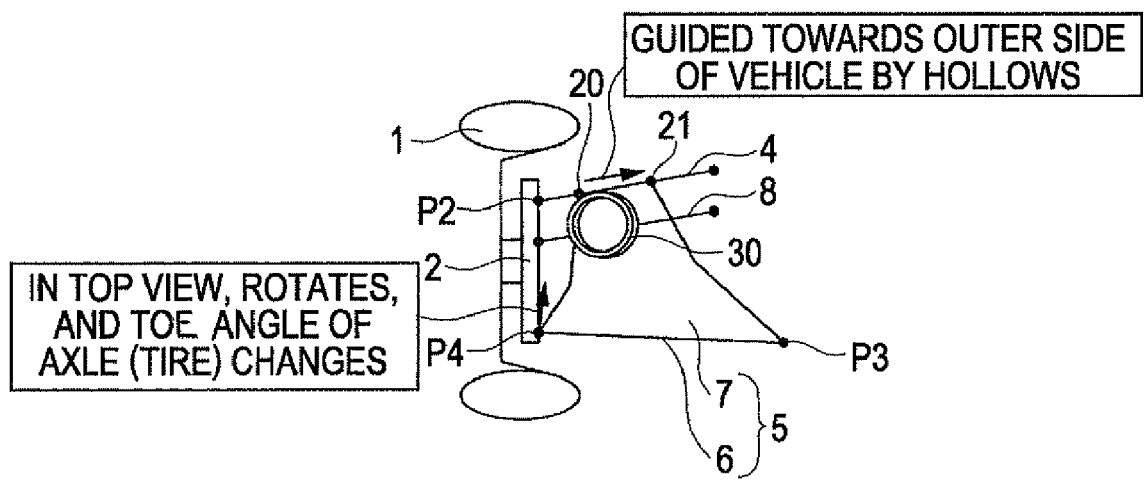
FIG. 45 is a top view of a position of a suspension spring according to FIGS. 44A and 44B.

As shown in FIG. 45, when the outer cylinder 20a of the wheel-side bush 20 is displaced vertically downward by an input of the reaction force R2 from the displacement amount changing device as a result of, for example, mounting the lower end portion 30a of the suspension spring 30 to the area D of the projecting portion 7, the hollow 20d guides the outer cylinder 20a of the connect bush towards the inner side in the vehicle width direction while moving the outer cylinder 20a downward. Accordingly, when the outer cylinder 20a is displaced inward in the vehicle width direction, the wheel-side mounting point P4 of the rear lower link 5 is rotationally displaced towards the front in the vehicle forward-backward direction around the vehicle-body side mounting point P3, which acts as a pivot. The hollow 20d thus makes it possible to increase or decrease the toe angle of a wheel 1 that bounds.

When the wheel-side mounting point P4 is positioned behind the vehicle-body side mounting point P3 in the vehicle forward-backward direction, the toe-out angle of the wheel 1 increases as the wheel 1 bounds. In contrast, when the wheel-side mounting point P4 is positioned further towards the front in the vehicle forward-backward direction than the vehicle-body side mounting point P3, the toe-in angle increases as the wheel 1 bounds.

The first to eighth examples may be applied individually or in combination.

For example, as illustrated in FIG. 46, hollows 20d and hollows 21d are formed in the respective connect bushes 20 and 21 at a first position further outward than and below the respective outer cylinders 20a and 21a in the vehicle width direction as seen from the front and at a second position further inward than and above the respective outer cylinders 20a and 21a in the vehicle width direction as seen from the front. As a result, the rigidities of the connect bushes 20 and 21 are low in respective directions passing through the centers of the outer cylinders 20a and 21a and oriented obliquely outward in the vehicle width direction and vertically downward.

In the example shown in FIGS. 46A and 46B, when at least one of the outer cylinder 20a of the connect bush 20 and the outer cylinder 21a of the connect bush 21 is displaced vertically downward by the displacement amount changing means, the hollow 20d or 21d guides the outer cylinder 20a or 21a outward in the vehicle width direction.

Although examples are described in which a low rigidity direction results from the inclusion of hollows 21d, the suspension device is not limited thereto. For example, it is possible to form the elastic members of the connect bushes 20 and 21 using materials that cause the overall rigidity of the elastic members of the connect bushes 20 and 21 to be low and to dispose an intermediate plate having a higher rigidity than the elastic members at a high-rigidity-direction position, thereby causing the rigidity to be anisotropic so that an oblique rigidity is relatively low.

Although a suspension spring 30 or a stabilizer 31 that operates due to a wheel stroke is described as the displacement amount adjusting device, the invention is not limited thereto.

For example, it is possible to link a lower end portion of an active damper to the projecting portion 7 in order to actively input a vertical force to the projecting portion 7 to displace the projecting portion 7.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A suspension device comprising:
a wheel supporting member configured to rotatably support a wheel;
two links respectively linking the wheel supporting member and a vehicle-body side member and disposed substantially in parallel in a vehicle width direction;
a projecting portion extending from a first of the two links positioned further backward in a vehicle forward-backward direction towards a second of the two links;
two or more elastic linking portions disposed apart from each other in the vehicle width direction and linking the projecting portion to the other of the two links; and
a toe angle adjusting device configured to input a force in a direction oriented backward in the vehicle forward-backward direction to the wheel supporting member to adjust a toe angle of the wheel, wherein the toe angle adjusting device is a portion of the elastic linking portions with each portion of the elastic linking devices having a different rigidity.

2. The suspension device according to claim 1 wherein the two or more elastic linking portions define an elastic center and include a first elastic linking portion positioned closer to the wheel than the elastic center and a second elastic linking portion positioned closer to a vehicle body than the elastic center, and the toe angle adjusting device configured such that a vertical rigidity of the first elastic linking portion is lower than a vertical rigidity of the second elastic linking portion.

3. The suspension device according to claim 1 wherein the toe angle adjusting device has a directional property in which a rigidity of one of the elastic linking portions positioned closer to the wheel than an elastic center defined by the two or more elastic linking portions is lower in a direction oriented obliquely downward and inward in the vehicle width direction than in a vertical direction.

4. The suspension device according to claim 1 wherein the toe angle adjusting device has a directional property in which a rigidity of one of the elastic linking portions positioned closer to the vehicle body side member than an elastic center defined by the two or more elastic linking portions is lower in a direction oriented obliquely upward and inward in the vehicle width direction than in a vertical direction.

5. The suspension device according to claim 1 wherein the toe angle adjusting device has a directional property in which a rigidity of one of the elastic linking portions positioned closer to the wheel than an elastic center defined by the two or more elastic linking portions is lower in a direction oriented obliquely upward and inward in the vehicle width direction than in a vertical direction.

6. The suspension device according to claim 1 wherein the toe angle adjusting device has a directional property in which a rigidity of one of the elastic linking portions positioned closer to a vehicle body than an elastic center defined by the two or more elastic linking portions is lower in a direction oriented obliquely downward and inward in the vehicle width direction than in a vertical direction.

7. The suspension device according to claim 1 wherein the toe angle adjusting device is configured such that a first elastic center defined by the two or more elastic linking portions is positioned further inward in the vehicle width direction than a second elastic center defined by a wheel mounting portion and a vehicle-body side member mounting portion of the link from which the projecting portion extends.

8. The suspension device according to claim 1 wherein a rigidity of one of the elastic linking portions positioned closer to the wheel than to an elastic center defined by the two or more elastic linking portions is lower than a rigidity of one of the elastic linking portions positioned closer to the vehicle-body side member than to the elastic center.

9. A suspension device comprising:
a wheel supporting member configured to rotatably support a wheel;
two links respectively linking the wheel supporting member and a vehicle-body side member and disposed substantially in parallel in a vehicle width direction;
at least one projecting portion extending from one of the two links towards the other link;
an elastic linking portion linking the projecting portion to the other link; and
a toe angle adjusting device configured to input a force in a direction oriented backward in the vehicle forward-backward direction to the wheel supporting member to adjust a toe angle of the wheel, wherein the toe angle adjusting device is a portion of the elastic linking portion and the two links are each linked to the wheel supporting member and to the vehicle-body side member through a wheel-supporting-member elastic member and a vehicle-body-side-member elastic member, respectively, and the two links are linked to each other through at least two elastic linking portions;
wherein a reference line passing through a first elastic center point defined by the wheel-supporting-member elastic members and the vehicle-body-side-member elastic members of one of the two links is orthogonal to a center axis of the wheel; and
wherein a rigidity of one of the at least two elastic linking portions is anisotropic such that a second elastic center point defined by the at least two elastic linking portions is positioned further inward in the vehicle width direction than the reference line.

10. The suspension device according to claim 9 wherein the elastic linking portion includes a wheel-side portion and a vehicle-body side portion, and the toe angle adjusting device is configured such that a vertical rigidity of the wheel-side portion is lower than a rigidity of the vehicle-body side portion.

11. The suspension device according to claim 9 wherein the two links include a first link and a second link, the first link linked to the vehicle-body side member at a first mounting point and to the wheel supporting member at a second mounting point, the second link linked to the vehicle-body side member at a third mounting point and to the wheel supporting member at a fourth mounting point; and wherein an intersection of a first axial link line passing through the first and second mounting points and a second axial link line passing through the third and fourth mounting points is further outward in the vehicle width direction than the second and fourth mounting points.

12. The suspension device according to claim 9 wherein the at least two elastic linking portions comprise an outer elastic link member and an inner elastic member disposed closer inward of the outer elastic link member in the vehicle width direction and forward of the outer elastic link member in the vehicle forward-backward direction; and
wherein an elastic center defined by the inner elastic member and the outer elastic member is positioned more towards the inner side in the vehicle width direction than the reference line based on values of at least one of rigidities and positions of the inner and outer elastic members.

13. The suspension device according to claim 9 wherein the two links are each linked to the wheel supporting member and to the vehicle-body side member through a wheel-supporting-member elastic member and a vehicle-body-side-member elastic member, respectively, and the two links are linked to each other through at least two elastic linking portions;
wherein the at least two elastic linking portions comprise an outer elastic link member and an inner elastic members disposed inward of the outer elastic link member in the vehicle width direction and forward of the outer elastic link member in the vehicle forward-backward direction;
wherein a reference line passing through an elastic center defined by the wheel-supporting-member elastic members and the vehicle-body-side member elastic members of one link is oriented orthogonal to a rotational axial line of the wheel; and
wherein a distance from the inner elastic member to the reference line is greater than a distance from the outer elastic member to the reference line, and a vertical rigidity of the inner elastic member is higher than a vertical rigidity of the outer elastic member.

14. A suspension device comprising:
a wheel supporting member configured to rotatably support a wheel;
two links respectively linking the wheel supporting member and a vehicle-body side member and disposed substantially in parallel in a vehicle width direction;
at least one projecting portion extending from one of the two links towards the other link;
an elastic linking portion linking the projecting portion to the other link; and
a toe angle adjusting device configured to input a force in a direction oriented backward in the vehicle forward-backward direction to the wheel supporting member to adjust a toe angle of the wheel, wherein the toe angle adjusting device comprises a displacement amount changing device including an elastic member having an upper portion supported by the vehicle-body side member and a lower portion supported by the one of the two links configured to displace a wheel-side portion of one of the two links in a direction oriented in at least one of a vehicle vertical direction and the vehicle forward-backward direction by applying a force to the one of the two links, wherein the elastic member includes a stabilizer or a suspension spring.

15. The suspension device according to claim 14 wherein the displacement amount changing device is configured to displace the one of the two links in a rotational-direction about an axis in a vehicle height direction.

16. The suspension device according to claim 14 wherein the displacement amount changing device is configured to vertically displace the two links when the wheel is displaced in the vehicle vertical direction.

17. The suspension device according to claim 14 wherein the displacement amount changing device is configured to apply a force to the projecting portion.

18. The suspension device according to claim 17 wherein the displacement amount changing device is attached to the one of the two links at a position on the wheel-side selected to result in a predetermined amount of displacement.

19. The suspension device according to claim 14 wherein the displacement amount changing device is configured to apply an input including a component oriented either in an outward or an inward direction in the vehicle width direction and a component oriented in a vertically downward direction.

20. The suspension device according to claim 14 wherein the displacement amount changing device is configured to input a force including a component oriented either in a forward or a backward direction in the vehicle forward-backward direction and a component oriented in a vertically downward direction.

21. The suspension device according to claim 14 wherein the elastic linking portion has a lower rigidity in a direction having a component oriented one of outward and inward in the vehicle width direction and a component oriented vertically than a rigidity in a direction oriented vertically.

22. The suspension device according to claim 21 wherein the elastic linking portion includes an elastic member interposed between an inner cylinder and an outer cylinder and disposed in a nesting state; and
wherein the elastic member defines a hollow at a position such that the elastic linking portion has the lower rigidity in the direction having a component oriented one of outward and inward in the vehicle width direction and a component oriented vertically than the rigidity in the direction oriented vertically.

23. A method of suspending a wheel rotatably supported by a wheel supporting member, the method comprising:
displacing two links relative to each other in accordance with a displacement of the wheel supporting member in a vehicle forward-backward direction, the two links linking the wheel supporting member and a vehicle-body side member to each other, and disposed substantially in parallel in a vehicle width direction with a projecting portion extending from a first of the two links positioned further backward in a vehicle forward-backward direction towards a second of the two links;
generating an elastic force in accordance with the relative displacement with two or more elastic linking portions disposed apart from each other in the vehicle width direction linking the projecting portion to the other of the two links; and
adjusting a toe angle of the wheel by applying a force oriented towards a back in the vehicle forward-backward direction to the wheel with a toe angle adjusting device to adjust a toe angle of the wheel, wherein the toe angle adjusting device is a portion of the elastic linking portions with each portion of the elastic linking devices having a different rigidity, wherein adjusting the toe angle includes applying a force to at least one of the two links to further displace the at least one of the two links in a direction oriented in at least one of a vehicle vertical direction and the vehicle forward-backward direction.

24. The method according to claim 23 wherein applying the force displaces the at least one of the two links in a rotational direction about an axis in the vehicle vertical direction.

25. The method according to claim 23 wherein adjusting the toe angle includes vertically displacing the two links when the wheel is vertically displaced.

26. The method according to claim 23 wherein vertically displacing the two links includes applying an input to the at least one of the two links, the input having a component oriented either in an outward or an inward direction with respect to the vehicle width direction and a component oriented in a vertically downward direction.

27. The method according to claim 23 wherein vertically displacing the two links includes applying an input to the at least one of the two links, the input having a component oriented either in a forward or a backward direction in the vehicle forward-backward direction and a component oriented in a vertically downward direction.

* * * * *